US012756354B2

(12) United States Patent

Wildman et al.

(10) Patent No.: US 12,756,354 B2

(45) Date of Patent: Oct. 6, 2026

(54) SOLAR MODULE FRAMES

(71) Applicant: Nextpower LLC, Fremont, CA (US)

(72) Inventors: Craig Bradley Edward Wildman, Kensington, CA (US); Madeleine Davis Kho, Oakland, CA (US); Ricardo Delgado-Nanez, San Jose, CA (US); Ning Liu, Folsom, CA (US); Matheus Martins Lopes Machado, Sorocaba (BR); Alexander W. Au, Oakland, CA (US); Lincoln Duca Silva, Sorocaba (BR)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 19/020,801

(22) Filed: Jan. 14, 2025

(65) Prior Publication Data

US 2025/0247046 A1 Jul. 31, 2025

Related U.S. Application Data

(60) Provisional application No. 63/624,816, filed on Jan. 25, 2024.

(51) Int. Cl.

*H02S 30/10* (2014.01)
*H02S 20/32* (2014.01)

(52) U.S. Cl.

CPC .............. *H02S 30/10* (2014.12); *H02S 20/32* (2014.12)

(58) Field of Classification Search

None

See application file for complete search history.

(56) References Cited

U.S. PATENT DOCUMENTS

| | | | |
|---|---|---|---|
| 7,472,876 | B2 | 1/2009 | Jones |
| D651,969 | S | 1/2012 | Turk et al. |
| D651,970 | S | 1/2012 | Turk et al. |
| 8,567,134 | B1 | 10/2013 | Grushkowitz et al. |
| D713,784 | S | 9/2014 | Wildes |
| 9,281,778 | B2 | 3/2016 | Corio et al. |
| D804,407 | S | 12/2017 | Au |
| 10,069,455 | B2 | 9/2018 | Corio et al. |
| D853,954 | S | 7/2019 | Mcpheeters |

(Continued)

FOREIGN PATENT DOCUMENTS

| | | | |
|---|---|---|---|
| AU | 2020202253 | B1 | 10/2020 |
| AU | 2019262608 | A1 | 11/2020 |

(Continued)

OTHER PUBLICATIONS

International Searching Authority, "International Search Report and Written Opinion", From Application No. PCT/US2025/011579, Mailed Apr. 8, 2025, pp. 18.

*Primary Examiner* — Eli S Mekhlin

(74) *Attorney, Agent, or Firm* — Fredrikson & Byron, P.A.

(57) ABSTRACT

A solar module frame coupling assembly includes a solar module frame and a rail. The solar module frame includes a frame side portion having a protruded guide structure. The rail includes a first rail side and a second rail side that is opposite the first rail side. The first rail side is configured to interface with a torque tube, and the second rail side includes an alignment slot. The alignment slot is configured to receive the protruded guide structure to couple the solar module frame to the rail.

12 Claims, 35 Drawing Sheets

(56) References Cited

U.S. PATENT DOCUMENTS

| | | | | |
|---|---|---|---|---|
| D862,379 | S | 10/2019 | Au | |
| 10,480,829 | B2 | 11/2019 | Matsuda et al. | |
| D905,626 | S | 12/2020 | Delgado-Nanez | |
| 11,616,467 | B2 | 3/2023 | Au | |
| 2007/0251567 | A1 | 11/2007 | Plaisted | |
| 2011/0146763 | A1 | 6/2011 | Sagayama | |
| 2012/0085394 | A1 | 4/2012 | Mcpheeters et al. | |
| 2014/0076306 | A1 | 3/2014 | Kalus et al. | |
| 2015/0000721 | A1 | 1/2015 | Au | |
| 2015/0180404 | A1 | 6/2015 | Braunstein et al. | |
| 2016/0365827 | A1 | 12/2016 | Au | |
| 2017/0040934 | A1 | 2/2017 | Xie | |
| 2017/0170779 | A1 | 6/2017 | Yamashita | |
| 2017/0294867 | A1 | 10/2017 | Pesce et al. | |
| 2019/0341878 | A1* | 11/2019 | Watson | F24S 30/40 |
| 2020/0153382 | A1 | 5/2020 | Ballentine et al. | |
| 2021/0075366 | A1 | 3/2021 | West et al. | |
| 2022/0224284 | A1 | 7/2022 | Zimmermann | |
| 2022/0271707 | A1* | 8/2022 | Reynolds | H02S 30/10 |
| 2022/0294386 | A1 | 9/2022 | Creasy et al. | |
| 2023/0291349 | A1 | 9/2023 | Ayllon Gomez et al. | |
| 2023/0327603 | A1 | 10/2023 | Taha et al. | |
| 2023/0402963 | A1 | 12/2023 | Yadlapalli et al. | |

FOREIGN PATENT DOCUMENTS

| | | | |
|---|---|---|---|
| CN | 209218014 | U | 8/2019 |
| CN | 112821859 | A | 5/2021 |
| CN | 114928320 | A | 8/2022 |
| DE | 102004055187 | A1 | 5/2006 |
| DE | 202007010999 | U1 | 2/2008 |
| EP | 3319228 | A1 | 5/2018 |
| ES | 2740049 | A2 | 2/2020 |
| WO | 2010124529 | A1 | 11/2010 |
| WO | 2014082687 | A1 | 6/2014 |
| WO | 2020076870 | A1 | 4/2020 |
| WO | 2020252091 | A1 | 12/2020 |
| WO | 2021119559 | A1 | 6/2021 |
| WO | 2023133203 | A1 | 7/2023 |

* cited by examiner

SOLAR MODULE FRAMES

RELATED APPLICATION

This disclosure claims priority to U.S. provisional patent application No. 63/624,816, filed on Jan. 25, 2024, the contents of which are hereby incorporated by reference.

TECHNICAL FIELD

This disclosure relates generally to device, system, and method embodiments of solar module frames. Solar module frame device, system, and method embodiments disclosed herein can be configured to facilitate more efficient and effective installation to a support structure, such as a torque tube of a solar tracker.

BACKGROUND

Solar modules can convert sunlight into energy using photovoltaic cells. Solar tracking systems can support a plurality of solar modules and function to rotate these solar modules amongst a variety of different angular orientations throughout a given day to optimize a solar irradiance angle and, thereby, optimize energy generation at the solar modules.

A conventional solar tracking system includes a plurality of components assembled and installed on site in the field at the location where the solar tracking system is to operate. Typical solar tracking system component installation utilizes manual labor on site in the field. For example, typical solar tracking system component installation utilizes manual labor to install rails at a torque tube for supporting one or more solar modules at the torque tube followed by additional manual labor to then install solar modules at the installed rails at the torque tube. This typically requires a high degree of tedious manual labor to both place and secure, via many connection points, the rails at the torque tube and to then place and secure the solar modules at the installed rails. Moreover, oftentimes solar tracking systems are installed in relatively remote locations and thus installation necessitates costs associated with bringing manual labor to the relatively remote site to execute manual installation over what can be a significant period of time. As such, current typical manual labor solar tracking system component installation can add significant labor and cost considerations to a solar tracking system application.

SUMMARY

This disclosure in general describes device, system, and method embodiments of solar module frames. Solar module frame device, system, and method embodiments disclosed herein can be configured to facilitate more efficient and effective installation to a support structure. For example, solar module frame device, system, and method embodiments disclosed herein can be configured to facilitate more efficient and effective installation of one or more solar module frames to a torque tube and/or to a rail at the torque tube of a solar tracking system. Such embodiments disclosed herein can, for instance, reduce the number of connection points between a solar module frame and a support structure, such as a rail or torque tube, as compared to previous solar module frames. In addition, such embodiments disclosed herein can provide one or more connection interfaces between the solar module frame embodiments disclosed herein and the support structure, such as a rail or torque tube, that are adapted for autonomous (e.g., robotic) installation. For instance, such embodiments disclosed herein can provide one or more connection interfaces between the solar module frame embodiments disclosed herein and the support structure, such as a rail or torque tube, that are adapted for common orientation autonomous (e.g., robotic) installation, such as adapted for top-down robotic coupling of the solar module frame embodiments to the support structure.

One embodiment includes a solar module frame. This solar module frame embodiment includes a coupling flange that has a first end extending out from the solar module frame (e.g., extends out from a bottom, torque tube facing side of the solar module frame radially beyond an extent of the top side of the solar module frame) and a second, opposite end that forms a free end positioned radially outward from the first end at the solar module frame. The second, free end of the coupling flange can be configured to couple to a first end portion or arm of a rail, where the first end portion or arm of the rail is opposite a second end portion of the rail that is configured to interface with a torque tube.

Another embodiment includes a solar module frame installation system. This system embodiment includes at least one solar module frame, at least one rail, and at least one frame coupling apparatus for coupling the solar module frame to a torque tube. The solar module frame can include a coupling flange that has a first end extending out from the solar module frame (e.g., extends out from a bottom, torque tube facing side of the solar module frame radially beyond an extent of the top side of the solar module frame) and a second, opposite end that forms a free end positioned radially outward from the first end at the solar module frame. The rail can be configured to couple to the solar module frame and to the torque tube such that the rail can couple the solar module to the torque tube. The rail can include a first end portion that interfaces (e.g., contacts) the torque tube and an opposite second end portion that interfaces with the coupling flange extending out from the solar module frame. The first end portion of the rail can have a profile that matches a cross-section of the torque tube such that the first end portion of the rail can be configured to sit at the torque tube. The second end portion of the rail can define a support surface (e.g., a flat support surface) that is configured to interface with the coupling flange of the solar module frame. The frame coupling apparatus can be configured to couple the solar module frame to the torque tube using one or more suitable coupling member(s) received at an interface of the coupling flange of the solar module and the support surface of the rail.

A further embodiment includes a method for coupling a solar module frame to a torque tube. This method embodiment includes the steps of: placing a first rail at a torque tube; installing a first side of a first solar module frame at the first rail; placing a second rail at the torque tube proximate to a second side of the first solar module frame; sliding the second rail along the torque tube toward the second side of the first solar module frame; and installing the second side of the first solar module frame at the second rail. In a further embodiment, these steps can then be repeated to install additional solar module frames at the torque tube.

Another embodiment includes a solar module coupling assembly. This assembly includes a solar module frame and a rail. The solar module frame includes a frame side portion, and the frame side portion includes a protruded guide structure. The rail includes a first rail side and a second rail side that is opposite the first rail side. The first rail side is configured to interface with a torque tube, and the second rail side includes an alignment slot. The alignment slot is configured to receive the protruded guide structure to couple the solar module frame to the rail.

In a further embodiment of this assembly, the protruded guide structure is a first protruded guide structure, and the frame side portion further includes a second protruded guide structure that is spaced apart from the first protruded guide structure along the frame side portion. The alignment slot is a first alignment slot configured to receive the first protruded guide structure. The rail further comprises a second alignment slot that is spaced apart from the first alignment slot along the second rail side. The first alignment slot is configured to receive the first protruded guide structure and the second alignment slot is configured to receive the second protruded guide structure to couple the solar module frame to the rail.

In one such example of this embodiment, the frame side portion further comprises a first frame coupling aperture adjacent to the first protruded guide structure and a second frame coupling aperture adjacent to the second protruded guide structure. The rail further comprises a first rail coupling aperture adjacent to the first alignment slot and a second rail coupling aperture adjacent to the second alignment slot. When the first alignment slot receives the first protruded guide structure and the second alignment slot receives the second protruded guide structure, the first frame coupling aperture is axially aligned with the first rail coupling aperture and the second frame coupling aperture is axially aligned with the second rail coupling aperture. For instance, this assembly can further include both first and second fastening members, with the first fastening member extending through the first frame coupling aperture and the first rail coupling aperture and the second fastening member extending through the second frame coupling aperture and the second rail coupling aperture.

In some such examples of this assembly embodiment, the rail further comprises a first longitudinal side extending between the first rail side and the second rail side and a second longitudinal side extending between the first rail side and the second rail side and opposite the first longitudinal side. The first longitudinal side comprises the first alignment slot and the second alignment slot, and the second longitudinal side comprises a third alignment slot and a fourth alignment slot that is spaced apart from the third alignment slot along the second rail side. The third alignment slot can be axially aligned with the first alignment slot and the fourth alignment slot can be axially aligned with the second alignment slot.

In some such examples of this assembly embodiment, the protruded guide structure comprises a locating tab that extends out from the frame side portion, and the alignment slot comprises an open inlet end and a closed terminal end, with the closed terminal end being opposite the open inlet end and the open inlet end having a greater diameter than the closed terminal end. For instance, the locating tab can extend out perpendicular to the frame side portion. The alignment slot can taper in diameter from the open inlet end to the closed terminal end.

Another embodiment includes a method for coupling at least one solar module frame to a rail at a solar tracker. This method embodiment includes the steps of: imparting relative movement, in an east-west direction, between a first solar module frame and the rail, the first solar module frame comprising a frame side portion that includes a protruded guide structure, the rail comprising a first rail side interfacing with a torque tube of the solar tracker and a second rail side that is opposite the first rail side, the second rail side comprising an alignment slot; as a result of imparting relative movement, in the east-west direction, between the first solar module frame and the rail, engaging the protruded guide structure at the frame side portion with the alignment slot at the second rail side; and, when the protruded guide structure is engaged at the alignment slot, placing a fastening member through frame side portion and the rail to fasten the first solar module frame to the rail. For example, the fastening member can be placed through frame side portion and the rail along a fastening axis that is perpendicular to the frame side portion. For some such embodiments, the rail can include similar features at an opposite longitudinal side of the rail and similar steps can be repeated to couple a second solar module frame to that opposite longitudinal side of the rail from the first solar module frame.

A further embodiment includes a solar module coupling assembly. This embodiment of a solar module frame coupling assembly includes a solar module frame and a rail. The solar module frame includes a frame side portion, and the frame side portion includes an alignment slot. The rail includes a first rail side and a second rail side that is opposite the first rail side. The first rail side is configured to interface with a torque tube, and the second rail side includes a protruded guide structure. The alignment slot is configured to receive the protruded guide structure to couple the solar module frame to the rail.

In a further embodiment of this assembly, the frame side portion includes a radial flange, and the radial flange includes the alignment slot. The rail includes a first guiding sidewall at the second rail side, a second guiding sidewall at the second rail side, and a channel at the second rail side between the first guiding sidewall and the second guiding sidewall. This channel includes the protruded guide structure between the first guiding sidewall and the second guiding sidewall. In some such embodiments, the protruded guide structure, the first guiding sidewall, and the second guiding sidewall can each extend outward from the channel in a same direction. In one example, the first guiding sidewall includes a distal guiding sidewall end and a proximal guiding sidewall end that is opposite the distal guiding sidewall end, the proximal guiding sidewall end is at the channel, and the first guiding sidewall angles inward toward the channel and the protruded guide structure in a direction from the distal guiding sidewall end toward the proximal guiding sidewall end. The second guiding sidewall can include similar features. For various embodiments, the protruded guide structure can be a first protruded guide structure, and the rail can further include a second protruded guide structure at the channel, with the second protruded guide structure spaced along the channel from the first protruded guide structure. For instance, the rail can further include a first rail coupling aperture at the channel adjacent to the first protruded guide structure, and a second rail coupling aperture at the channel adjacent to the second protruded guide structure.

In a further embodiment of this assembly, the solar module frame can be a first solar module frame, the frame side portion can be a first frame side portion, and the alignment slot can be a first alignment slot. This assembly can further include a second solar module frame which includes a second frame side portion and a second alignment slot. The first alignment slot and the second alignment slot can be overlaid at the protruded guide structure. For some such embodiments, the first solar module frame further includes a first frame coupling aperture adjacent to the first alignment slot, the second solar module frame further includes a second frame coupling aperture adjacent to the second alignment slot, and the first frame coupling aperture and the second frame coupling aperture can be overlaid at a rail coupling aperture at a channel of the rail.

An additional embodiment includes a method for coupling solar module frames to a rail at a solar tracker. This method embodiment includes the steps of: imparting relative movement, in an east-west direction, between a first solar module frame and the rail, the first solar module frame comprising a first frame side portion that includes a first alignment slot, the rail comprising a first rail side interfacing with a torque tube of the solar tracker and a second rail side that is opposite the first rail side, the second rail side comprising a protruded guide structure; as a result of imparting relative movement, in the east-west direction, between the first solar module frame and the rail, engaging the protruded guide structure with the first alignment slot; after engaging the protruded guide structure with the first alignment slot, imparting relative movement, in an east-west direction, between a second solar module frame and the rail, the second solar module frame comprising a second frame side portion that includes a second alignment slot; and as a result of imparting relative movement, in the east-west direction, between the second solar module frame and the rail, engaging the protruded guide structure with the second alignment slot to overlay the second frame side portion at the first frame side portion.

In a further embodiment of this method, the method can additional include a step of: when the protruded guide structure is engaged at the first alignment slot and the second alignment slot and when the second frame side portion overlays the first frame side portion, placing a fastening member through second frame side portion, through the first frame side portion, and into the rail to fasten the first solar module frame and the second solar module frame to the rail.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are intended for use in conjunction with the explanations in the following detailed description wherein like reference characters denote like elements. Examples of the present invention will hereinafter be described in conjunction with the appended drawings.

FIG. 2A shows an elevational view and FIG. 2B shows a perspective view of the exemplary embodiment of the solar module frame and the exemplary embodiment of the rail and associated frame coupling apparatus.

FIG. 3A shows an elevational view and FIG. 3B shows a perspective view of the another exemplary embodiment of the solar module frame and the another exemplary embodiment of the rail and associated frame coupling apparatus.

FIG. 4A shows a perspective view of the additional exemplary embodiment of a solar module frame, FIG. 4B shows a perspective view of the rail for the frame coupling apparatus, and FIG. 4C shows a pair of the solar module frames coupled to the rail for coupling the pair of solar module frames to the torque tube.

FIG. 5A shows the solar module frame with an integrated rail in a stowed position, FIG. 5B shows solar module frames each with one or more integrated rails in an installation position and coupled to the torque tube, FIG. 5C shows a close up perspective view of the integrated rail of the solar module frame in the stowed position, and FIG. 5D shows a close up perspective view of the integrated rail of the solar module frame in the installation position.

FIG. 6A shows a perspective view of the solar module frame embodiments coupled to the torque tube via the rail and associated frame coupling apparatus embodiments. FIG. 6B shows an elevational view of a pair of solar module frame embodiments coupled to the torque tube via the rail and associated frame coupling apparatus embodiment. FIG. 6C shows a flow diagram of an embodiment of a method for coupling solar module frames to a torque tube. FIG. 6D shows an example step of the method of FIG. 6C for securing a first rail at a torque tube, FIG. 6E shows an example step of the method of FIG. 6C for connecting one side of a solar module frame to the first rail, FIG. 6F shows an example step of the method of FIG. 6C for securing a second rail at a torque tube, and FIG. 6G shows an example step of the method of FIG. 6C for connecting another side of the solar module frame to the second rail.

FIG. 7A shows a perspective of the solar module frame embodiment, FIG. 7B shows an elevational view of the solar module frame embodiment, and FIG. 7C shows embodiments of the solar module frame coupled to a torque tube.

FIG. 8A shows a perspective of the solar module frame embodiment, FIG. 8B shows a perspective view of the rails coupled to the torque tube, and FIG. 8C shows a perspective view of the solar module frames coupled to the rails at the torque tube of FIG. 8B.

FIGS. 9A-9I illustrate the embodiment of the solar module frame coupling assembly. Specifically, FIG. 9A is a perspective view of a solar tracker having the solar module frame coupling assembly fastened to the torque tube, FIG. 9B is a perspective view of a protruded guide structure at a solar module frame side portion received at an alignment slot at the rail, FIGS. 9C and 9D are, respectively, perspective and elevational views of the rail in isolation, FIG. 9E is a close-up, perspective view of the alignment slot at the rail and adjacent rail coupling aperture, FIG. 9F is a perspective view of the solar module frame side portion having the protruded guide structure, FIG. 9G is a close-up, perspective view of the protruded guide structure at the solar module frame side portion, FIG. 9H is a an elevational view of a side profile of the solar module frame side portion having the protruded guide structure, and FIG. 9I is a perspective view of a fastening member being placed through the solar module frame side portion and the rail along a fastening axis that is generally perpendicular to the solar module frame side portion. FIG. 9J illustrates a flow diagram of a method for coupling at least one solar module frame to a rail at a solar tracker, for instance, using one or more of the features of the solar module frame coupling assembly illustrated at FIGS. 9A-9I.

FIGS. 10A-10L illustrate the embodiment of the solar module frame coupling assembly. Specifically, FIGS. 10A-10C are, respectively, a perspective view of the solar module frame coupling assembly at a torque tube of a solar tracker, a close-up perspective view of two overlaid frame side portions at protruded guide structures, and a close-up elevational view of the indicated region at FIG. 10B showing two overlaid frame side portions at a common protruded guide structure at the rail. FIGS. 10D-10F are, respectively, perspective, elevational, and close-up perspective views of the rail, shown at FIGS. 10A-10C, in isolation.

FIGS. 10G-J are, respectively, a perspective view of a frame side portion engaged at a pair of protruded guide structures at the rail, an exploded assembly view of a solar module frame having a pair of frame side portions and a pair of frame radial portion, an elevational view of one of the frame side portions, and an elevational view of one of the frame radial portions. FIG. 10K is a perspective view of a fastening member being placed through a pair of overlaid solar module frame side portions and the rail along a fastening axis that extends in a direction from above the torque tube and frame coupling assembly. FIG. 10L is a perspective view of a fastening member being placed through a pair of overlaid solar module frame side portions and the rail along a fastening axis that extends in a direction from below the torque tube and frame coupling assembly. FIG. 10M is a flow diagram of an embodiment of a method for coupling a pair of solar module frames to a rail at a solar tracker, for instance, using one or more of the features of the solar module frame coupling assembly illustrated at FIGS. 10A-10L.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
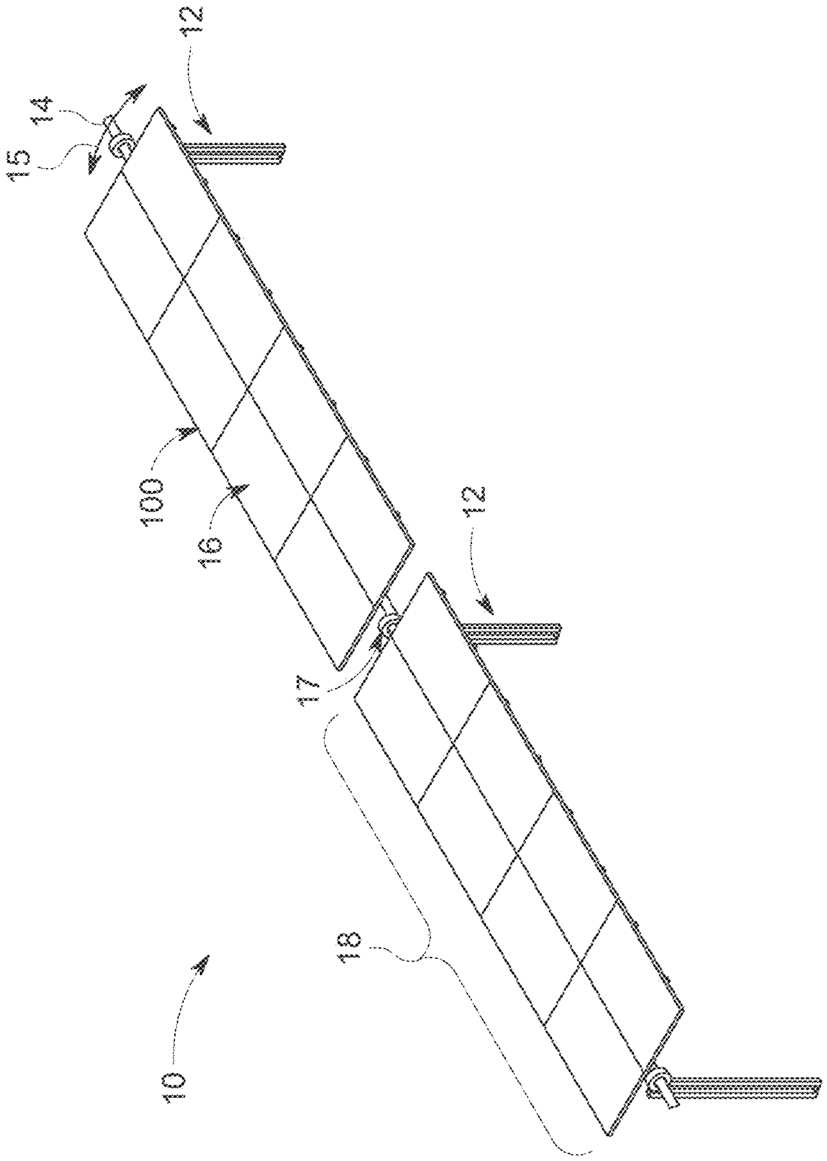
FIG. 1 illustrates a schematic, perspective view of a solar tracker apparatus.

FIG. 1 illustrates an embodiment of a solar tracker apparatus 10. The solar tracker apparatus 10 can include a plurality of piers 12 disposed in spaced relation to one another and embedded in the ground. The solar tracker apparatus 10 can include one or more torque tubes 14 that can extend between adjacent piers 12 and can be rotatably supported at each pier 12. The solar tracker apparatus 10 can further include a plurality of solar modules 16 (e.g., a plurality of photovoltaic cells bounded by a frame) supported at the respective torque tube 14. The one or more torque tubes 14 can be rotated in directions 15 so as to change an angle of the solar modules 16, such as throughout a day as the location of the sun changes relative to the solar modules 16. A bearing housing assembly 17 can be configured to rotatably connect torque tubes 14 along a span of the solar tracker apparatus 10. The span between two adjacent piers 12 can be referred to as a bay 18 and, for example, each bay 18 can be rotatably connected to an adjacent bay 18 via the bearing housing assembly 17. A plurality of solar tracker apparatus 10 rows may be arranged in a north-south longitudinal orientation to form a solar array.

Each solar module 16 can include a solar module frame 100 that is coupled to the torque tube 14. As will be described herein, in some instances, the solar module frame 100 can be directly coupled to the torque tube 14 (e.g., for embodiments of the solar module frame 100 that include an integrated rail component) and in other instances the solar module frame 100 can be indirectly coupled to the torque tube 14 by coupling the solar module frame 100 directly to a rail and coupling that rail to the torque tube 14. As will also be described herewith, in various embodiments, adjacent solar module frames 100 of adjacent solar modules 16 can be coupled together.

The following disclosure will describe various solar module frame embodiments that can be used, for instance, in a solar tracker apparatus. Such embodiments disclosed herein can, for example, be useful in facilitating more labor-efficient solar module frame installation at a solar tracker apparatus. The following description will describe a variety of solar module frame embodiments as well as associated frame coupling apparatuses for coupling one or more solar module frames to a support structure, which in the solar tracker apparatus example applications provided here is a torque tube.

Figure 2A:
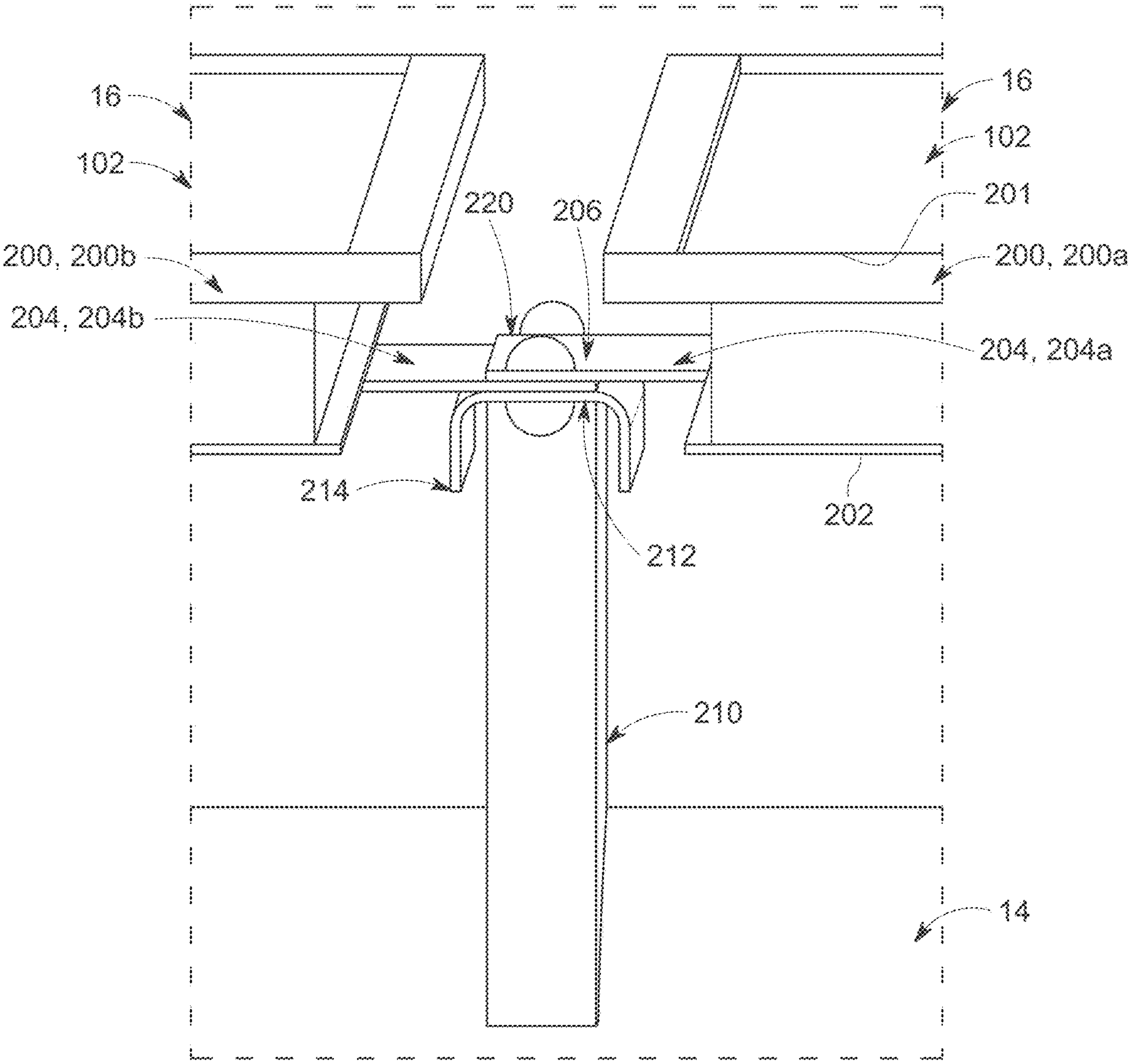
FIGS. 2A-2B illustrate one exemplary embodiment of a solar module frame and one exemplary embodiment of a rail and associated frame coupling apparatus for coupling one or more solar module frames to a torque tube.
Figure 2B:
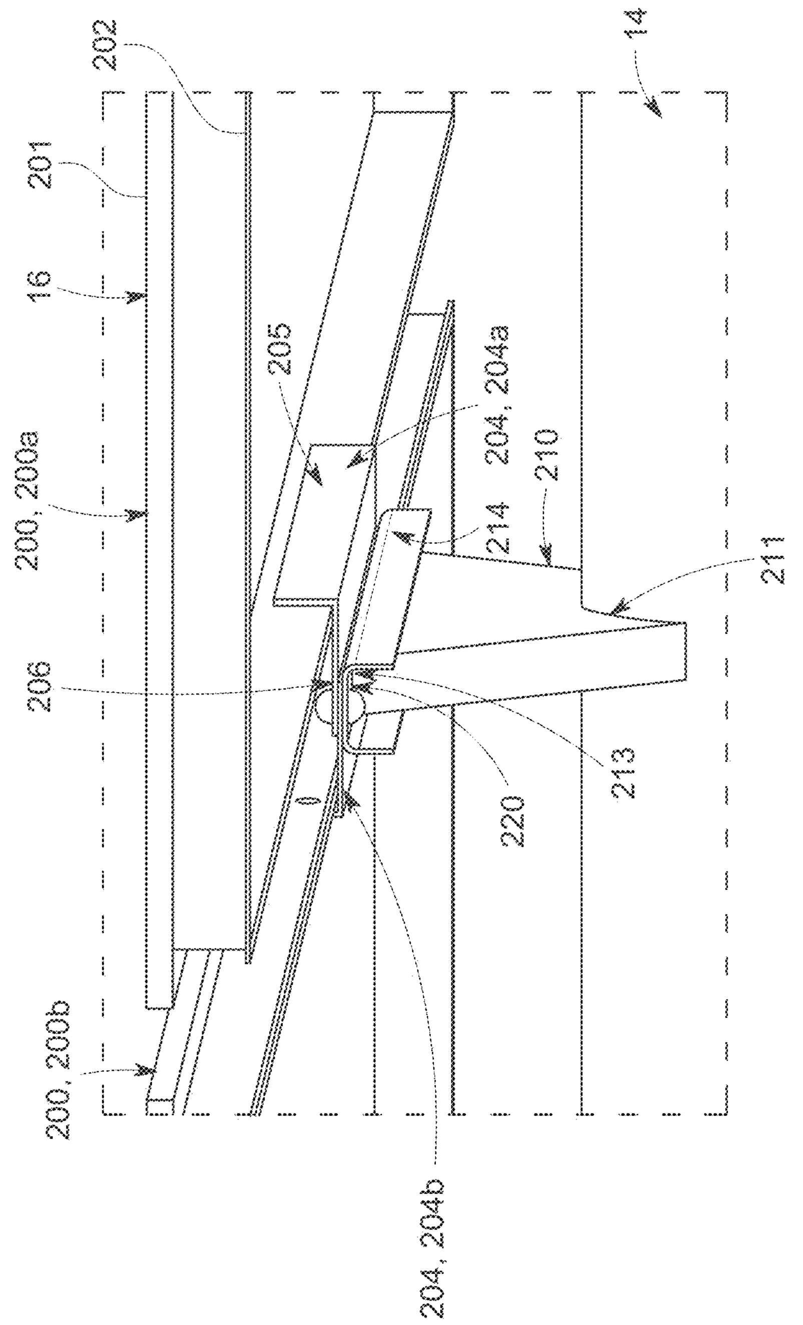

FIGS. 2A-2B illustrate one exemplary embodiment of a solar module frame 200 and one exemplary embodiment of a rail 210 and associated frame coupling apparatus 220 for coupling one or more solar module frames 200 to the torque tube 14. FIG. 2A shows an elevational view and FIG. 2B shows a perspective view of the exemplary embodiment of the solar module frame 200 and the exemplary embodiment of the rail 210 and associated frame coupling apparatus 220.

The solar module frame 200 has a top side 201 and a bottom side 202. The top side 201 of the frame 200 can bound photovoltaic cells 102 (e.g., photovoltaic cells included at a silicon laminate) and the bottom side 202 of the frame 200 can be configured to face the torque tube 14. The illustrated embodiment shows the bottom side 202 inwardly offset from the top side 201 such that the top side 201 overhangs out from the bottom side 202. In some examples, the solar module frame 200 can be a “type B” steel frame (e.g., 1.2 mm thickness) with a “type B” steel cross-section that includes the top side 201 overhand relative to the bottom side 202.

To help facilitate coupling of the solar module frame 200 to the torque tube 14, each solar module frame 200 can include a coupling flange 204. The coupling flange 204 can extend out from the solar module frame 200. For example, as shown for the illustrated embodiment, the coupling flange 204 can extend out from the bottom side 202 of the solar module frame 200 and extend radially beyond the extend of the top side 201. The coupling flange 204 can thus have a first end portion 205 that is attached to the bottom side 202 of the solar module frame and a second, opposite end portion 206 that forms a free end extending out from a side of the solar module frame 200. The first end portion 205 of the solar module frame 200 can lay in a first plane and the second end portion 206 of the solar module frame 200 can lay in a second, different plane. As one such example, the coupling flange 204, as shown here, can form an L-shaped member with the first end portion 205 in a first plane and the second end portion 206 in a second plane that is orthogonal to the first plane (e.g., and the second plane is parallel to the longitudinal axis of the torque tube 14).

The rail 210 can be configured to couple to one or more solar module frames 200 and to couple to the torque tube 14 such that the rail 210 is configured to couple one or more solar module frames 200 to the torque tube 14. The illustrated embodiment shows the rail 210 configured to couple two solar module frames 200 to the torque tube 14. As seen at FIG. 2B, the rail 210 can have a first end portion 211 that interfaces (e.g., contacts) the torque tube 14 and an opposite second end portion 212 that interfaces with one or more coupling flanges 204 of one or more solar module frames 200. The first end portion 211 of the rail 210 can have a profile that matches a cross-section of the torque tube 14, which in the illustrated example the torque tube 14 has a rounded (e.g., circular) cross-section and the first end portion 211 of the rail 210 defines a semi-circular recessed cutout. The second end portion 212 of the rail 210 can define a flat support surface 213 that is configured to interface with one or more coupling flanges 204 of one or more solar module frames 200. The illustrated embodiment shows a U-shaped frame interface member at the second end portion 212 of the rail 210, and this U-shaped frame interface member include a flat top surface that is configured to contact and support one or more coupling flanges 204 of one or more solar module frames 200.

The frame coupling apparatus 220 can be configured to couple the solar module frame 200 to the torque tube 14. As shown for the illustrated examples, the frame coupling apparatus 220 can include first and second solar module frames 200*a*, 200*b* and the rail 210. The first solar module frame 200*a* of the frame coupling apparatus 220 can include coupling flange 204*a* and the second solar module frame 200*b* of the frame coupling apparatus 220 can include coupling flange 204*b*. As illustrated, the support surface 213 of the rail 210 is configured to receive the coupling flanges 204*a*, 204*b*. For example, one coupling flange 204*b* can overlay and contact the support surface 213 of the rail 210 while another coupling flange 204*a* can overlay and contact the coupling flange 204*b*. This overlayed orientation of the coupling flanges 204*a*, 204*b* can help to provide reinforcement and added robustness for supporting the pair of solar module frames 200 at the rail 210 via the frame coupling apparatus 220. The coupling flanges 204*a*, 204*b* can be secured to the support surface 213 of the rail 210 via one or more suitable coupling members, such as one or two rivets as shown here. Thus, the frame coupling apparatus 220 can be configured to support two solar module frames 200 at one rail 210 using a small number of coupling members (e.g., a single coupling member, such as a single rivet) that need active fastening actuation to execute the coupling.

Figure 3A:
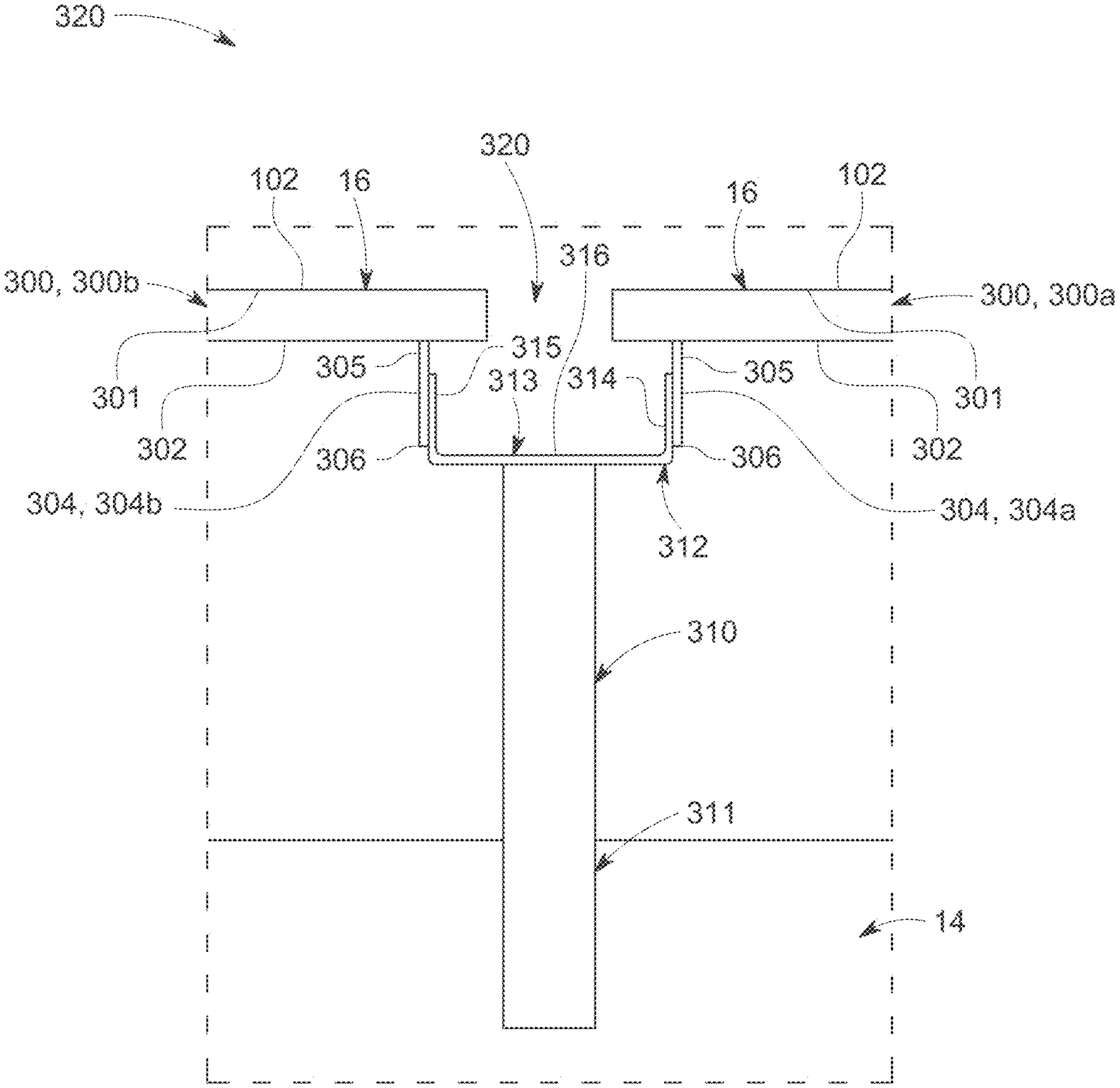
FIGS. 3A-3B illustrate another exemplary embodiment of a solar module frame and another exemplary embodiment of a rail and associated frame coupling apparatus for coupling one or more solar module frames to a torque tube.
Figure 3B:
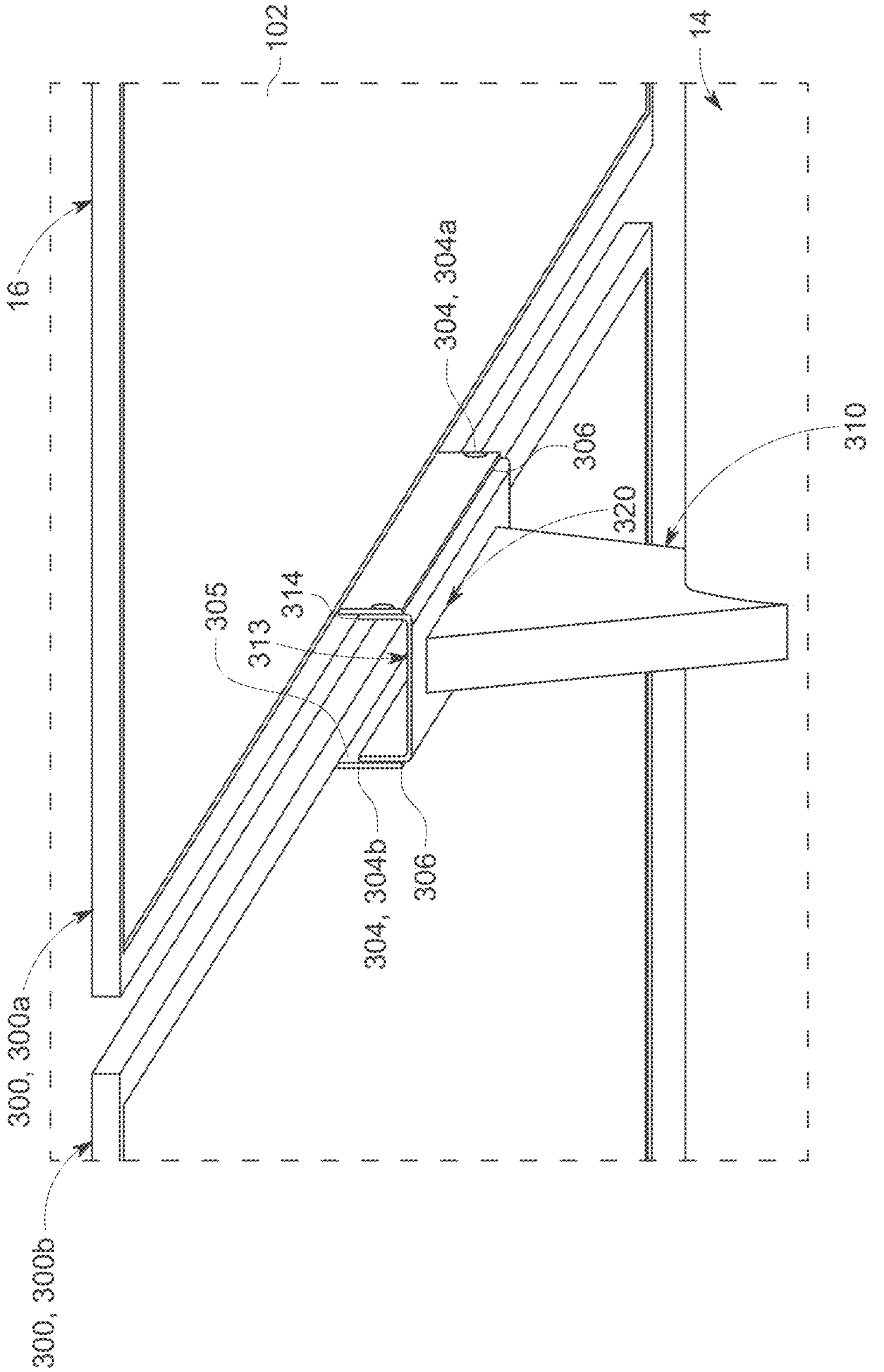

FIGS. 3A-3B illustrate another exemplary embodiment of a solar module frame 300 and one exemplary embodiment of a rail 310 and associated frame coupling apparatus 320 for coupling one or more solar module frames 300 to the torque tube 14. FIG. 3A shows an elevational view and FIG. 3B shows a perspective view of the exemplary embodiment of the solar module frame 300 and the exemplary embodiment of the rail 310 and associated frame coupling apparatus 320.

The solar module frame 300 has a top side 301 and a bottom side 302. The top side 301 of the frame 300 can bound photovoltaic cells 102 (e.g., photovoltaic cells included at a silicon laminate) and the bottom side 302 of the frame 300 can be configured to face the torque tube 14. In addition, to help facilitate coupling of the solar module frame 300 to the torque tube 14, each solar module frame 300 can include a coupling flange 304. The coupling flange 304 can extend out from the solar module frame 200. For example, as shown for the illustrated embodiment, the coupling flange 304 can extend out from the bottom side 302 of the solar module frame 300 and can form a bottom-most surface of the solar module frame 300. The coupling flange 304 can thus have a first end portion 305 that is attached to the bottom side 302 of the solar module frame and a second, opposite end portion 306 that forms a free end extending out from the bottom side 302 of the solar module frame 200 with the second end portion 306 as the bottom-most surface of the solar module frame 300. The first end portion 305 of the solar module frame 300 can lay in a first, common plane as the second end portion 306 of the solar module frame 230. As one such example, the coupling flange 304, as shown here, can form a planar member extending between the first and second end portions 305, 306.

The rail 310 can be configured to couple to one or more solar module frames 300 and to couple to the torque tube 14 such that the rail 310 is configured to couple one or more solar module frames 300 to the torque tube 14. The illustrated embodiment shows the rail 310 configured to couple two solar module frames 300 to the torque tube 14. As seen at FIG. 3A, the rail 310 can have a first end portion 311 that interfaces (e.g., contacts) the torque tube 14 and an opposite second end portion 312 that interfaces with one or more coupling flanges 304 of one or more solar module frames 300. The first end portion 311 of the rail 310 can have a profile that matches a cross-section of the torque tube 14, which in the illustrated example the torque tube 14 has a rounded (e.g., circular) cross-section and the first end portion 311 of the rail 310 defines a semi-circular recessed cutout. The second end portion 312 of the rail 310 can define a coupling flange receiver 313. The coupling flange receiver 313 can be a U-shaped coupling flange receiver 313 that can include a first vertical arm 314 at one side of the U-shaped coupling flange receiver 313, a second vertical arm 315 at another, opposite side of the U-shaped coupling flange receiver 313, and an intermediate portion 316 that connects the first and second vertical arms 314, 315. The coupling flange receiver 313 is configured to contact and support one or more coupling flanges 304 of one or more solar module frames 300.

The frame coupling apparatus 320 can be configured to couple the solar module frame 300 to the torque tube 14. As shown for the illustrated example, the frame coupling apparatus 320 can include first and second solar module frames 300*a*, 300*b* and the rail 310. The first solar module frame 300*a* of the frame coupling apparatus 320 can include coupling flange 304*a* and the second solar module frame 300*b* of the frame coupling apparatus 320 can include coupling flange 304*b*. As illustrated, the coupling flange receiver 313 of the rail 310 is configured to receive the coupling flanges 304*a*, 304*b*. For example, coupling flange 304*a* of solar module frame 300*a* can be received at (e.g., contact) the first vertical arm 314 of the coupling flange receiver 313 and coupling flange 304*b* of solar module frame 300*b* can be received at (e.g., contact) the second vertical arm 315 of the coupling flange receiver 313. Thus, the coupling flange 304*a* and one vertical arm 314 of the coupling flange receiver 313 can interface while the coupling flange 304*b* and another vertical arm 315 of the coupling flange receiver 313 can interface, for instance, at opposite sides of the coupling flange receiver 313. The coupling flanges 304*a*, 304*b* can be secured to the arms 314, 315, respectively, via a clinch joint or weld and/or one or more suitable coupling members, such as one or more rivets, bobtail fasteners, and/or bolts. The illustrated embodiment shows two fastening connections between the coupling flange 304*a* and the arm 314 and two fastening connections between the coupling flange 304*b* and the arm 315. In another example, it can be just one fastening connection between the coupling flange 304*a* and the arm 314 and just one fastening connection between the coupling flange 304*b* and the arm 315. Thus, the frame coupling apparatus 320 can be configured to support two solar module frames 300 at one rail 310 using a small number of coupling members and/or a small number of welds/clinched joints (e.g., one weld or clinch joint between the coupling flange 304*a* and the arm 314 and one weld of clinch joint between the coupling flange 304*b* and the arm 315) and thereby can create useful efficiencies in solar tracker apparatus installation.

Figure 4A:
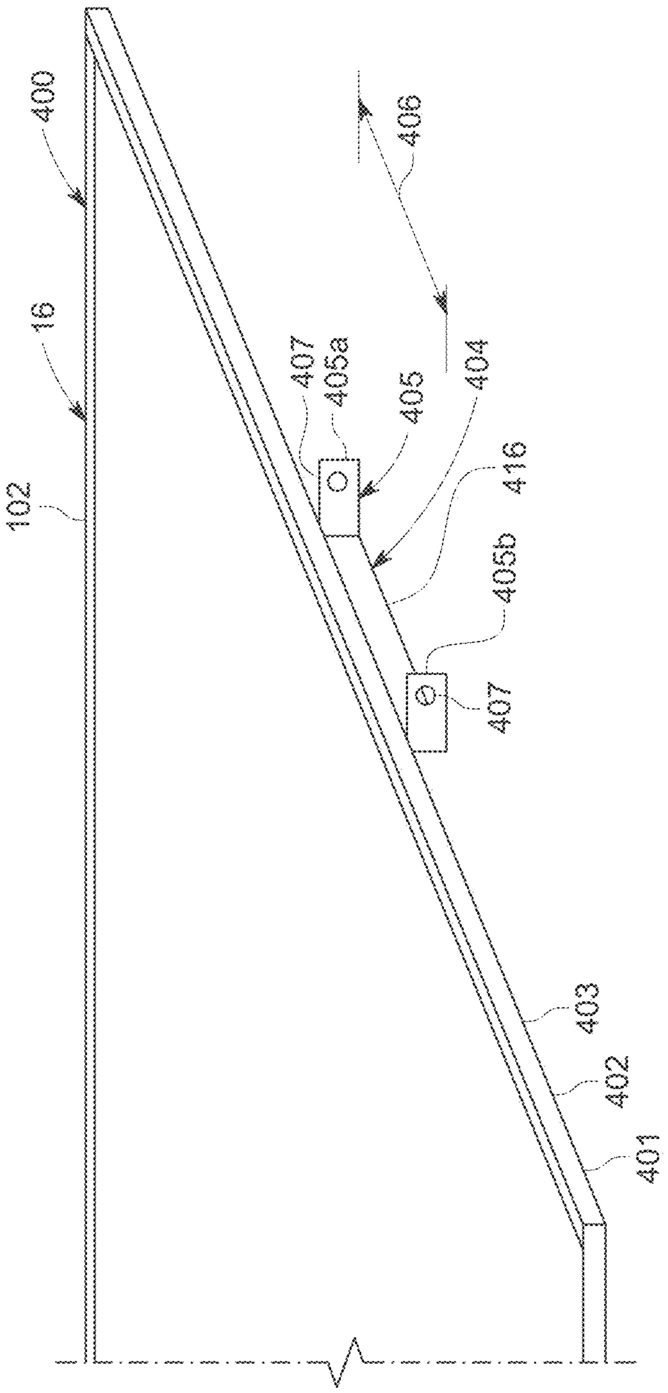
FIGS. 4A-4C illustrate an additional exemplary embodiment of a solar module frame and an additional exemplary embodiment of a rail and associated frame coupling apparatus for coupling one or more solar module frames to a torque tube.
Figure 4B:
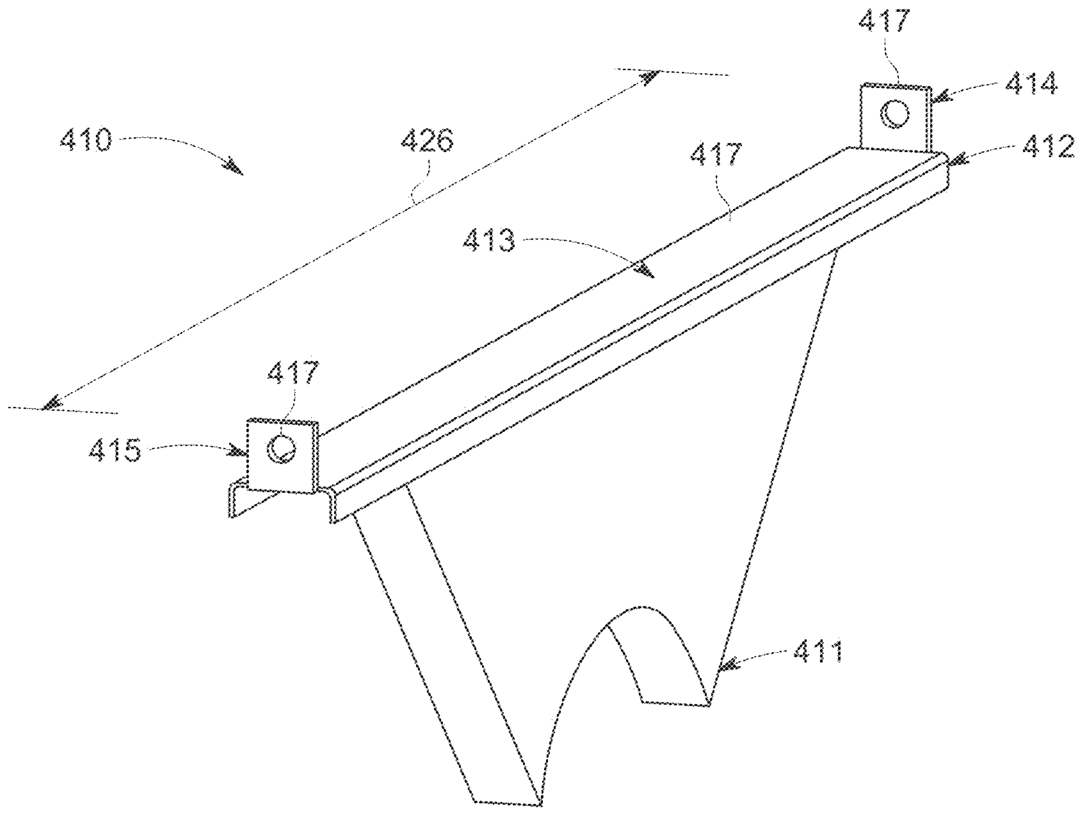
Figure 4C:
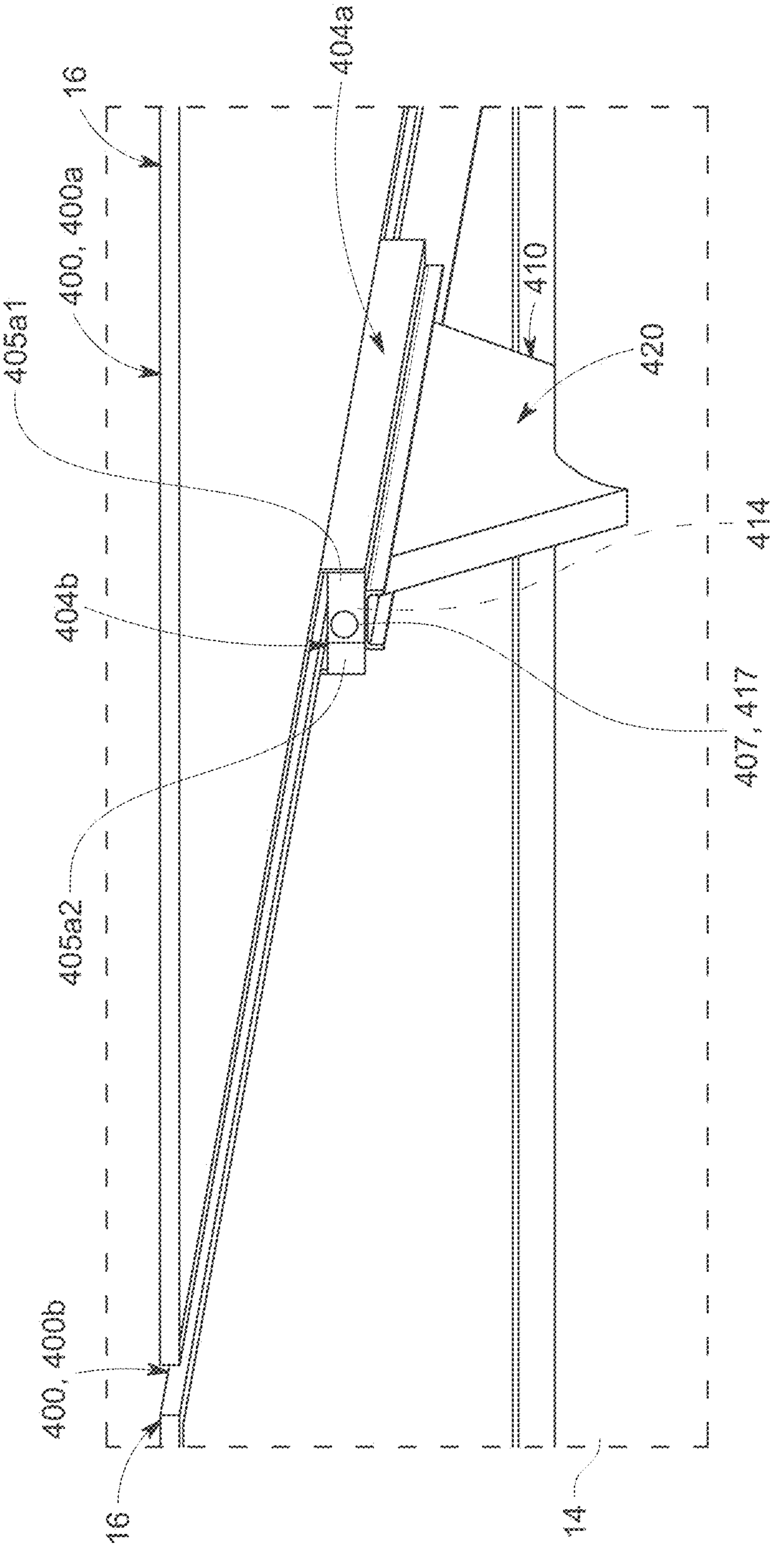

FIGS. 4A-4C illustrate a further exemplary embodiment of a solar module frame 400 and an additional exemplary embodiment of a rail 410 and associated frame coupling apparatus 420 for coupling one or more solar module frames 400 to the torque tube 14. FIG. 4A shows a perspective view of the solar module frame 400, FIG. 4B shows a perspective view of the rail 410, and FIG. 4C shows a pair of the solar module frames 400 coupled to the rail 410 for coupling the pair of solar module frames 400 to the torque tube 14.

The solar module frame 400 has a top side 401, a bottom side 402, and longitudinal sides 403 extending between the top and bottom sides 401, 402. The top side 401 of the frame 400 can bound photovoltaic cells 102 (e.g., photovoltaic cells included at a silicon laminate) and the bottom side 402 of the frame 400 can be configured to face the torque tube 14. In addition, to help facilitate coupling of the solar module frame 400 to the torque tube 14, each solar module frame 400 can include a coupling flange 404. The coupling flange 404 can extend out from the solar module frame 400. For example, the coupling flange 404 can extend out from the bottom side 402 and/or one of the longitudinal sides 403 of the solar module frame 400. The coupling flange 404 can define a pair of frame flange coupling tabs 405 that include a first frame flange coupling tab 405*a* and a second frame flange coupling tab 405*b*, and the coupling flange 404 can include an intermediate portion 416 extending between and interconnecting the pair of frame flange coupling tabs 405. One end portion of each frame flange coupling tab 405*a*, 405*b* can be connected to the intermediate portion 416 while the other, opposite end portion of each frame flange tab 405*a*, 405*b* can define a free end extending out from the intermediate portion 416. The illustrated embodiment shows each of the pair of frame flange coupling tabs 405 extending linearly out from the intermediate portion 416 as a planar member. A tab spacing 406 can be defined between the first and second frame flange coupling tabs 405*a*, 405*b*. Each of the pair of frame flange coupling tabs 405 can include a fastening aperture 407 that is configured to receive a fastening member therethrough.

The solar module frame 400 can have one coupling flange 404 at one longitudinal side 403 and another coupling flange 404 at another, opposite longitudinal side. This can be useful for coupling each of two opposite longitudinal sides of the solar module frame 400 to a respective, adjacent rail 410. In one such example, to help facilitate an installation-efficient arrangement, the tab spacing 406 for a first coupling flange 404 at a first longitudinal side of the solar module frame 400 can be a first distance while the tab spacing 406 for a second coupling flange 404 at a second, opposite longitudinal side of the solar module frame 400 can be a second, different distance. In a further such example, a plurality of solar module frames 400 can each have the tab spacing 406 for the first coupling flange 404 at the first longitudinal side of the solar module frame 400 at the first distance while the tab spacing 406 for the second coupling flange 404 at the second, opposite longitudinal side of the solar module frame 400 can be at the second, different distance to help provide a staggered reception of each of the two coupling flanges of a pair of solar frame modules 400 at a common rail 410.

The rail 410 can be configured to couple to one or more solar module frames 400 and to couple to the torque tube 14 such that the rail 410 is configured to couple one or more solar module frames 400 to the torque tube 14. The illustrated embodiment shows the rail 410 configured to couple two solar module frames 400 to the torque tube 14. As seen at FIG. 4B, the rail 410 can have a first end portion 411 that interfaces (e.g., contacts) the torque tube 14 and an opposite second end portion 412 that interfaces with one or more coupling flanges 404 of one or more solar module frames 400. The first end portion 411 of the rail 410 can have a profile that matches a cross-section of the torque tube 14, which in the illustrated example the torque tube 14 has a rounded (e.g., circular) cross-section and the first end portion 411 of the rail 410 defines a semi-circular recessed cutout. The second end portion 412 of the rail 410 can define a coupling flange receiver 413. The coupling flange receiver 413 is configured to receive and couple to one or more coupling flanges 404 of one or more solar module frames 400. The coupling flange receiver 413 can be a U-shaped coupling flange receiver 413 that can include a first arm 414 at one side of the U-shaped coupling flange receiver 413, a second vertical 415 at another, opposite side of the U-shaped coupling flange receiver 413, and an intermediate portion 416 that connects the first and second arms 414, 415. An arm spacing 426 can be defined between the first and second arms 414, 415. Each of the first and second arms 414, 415 can include a fastening aperture 417 that is configured to receive a fastening member therethrough. The arm spacing 426 defined by the rail 410 can be complimentary to the tab spacing 406 defined by each of a pair of solar module frames 400 coupled to that common rail 410. For example, as noted, the tab spacing 406 for a pair of interfacing coupling flanges 404 of a pair of solar frame modules 400 at a common rail 410 can be different from one another and further the arm spacing 426 defined by the rail 410 can be different than each of the tab spacing 406 for each of the pair of interfacing coupling flanges 404. This can allow for each of the pair of interfacing coupling flanges 404 and the interfacing, respective arms 414, 415 of the coupling flange receiver 413 to nest adjacent one another at the respective sides of the coupling flange receiver 413 at the rail 410.

The frame coupling apparatus 420 can be configured to couple the solar module frame 400 to the torque tube 14. As shown for the illustrated example, the frame coupling apparatus 420 can include first and second solar module frames 400*a*, 400*b* and the rail 410. The first solar module frame 400*a* of the frame coupling apparatus 420 can include coupling flange 404*a* and the second solar module frame 400*b* of the frame coupling apparatus 420 can include coupling flange 404*b*. As illustrated, the coupling flange receiver 413 of the rail 410 is configured to receive the coupling flanges 404*a*, 404*b* of each of the pair of solar module frames 400_a_, 400_b_. For example, coupling flange 404_a_ of solar module frame 400_a_ can be received at coupling flange receiver 413 adjacent to the first arm 414 and the second arm 415 of the coupling flange receiver 413, and coupling flange 404_b_ of solar module frame 400_b_ can be received at coupling flange receiver 413 adjacent to the first arm 414 and the second arm 415 of the coupling flange receiver 413. As shown at FIG. 4C, the coupling flange 404_a_ of solar module frame 400_a_ and the coupling flange 404_b_ of solar module frame 400_b_ can be received at the coupling flange receiver 413 adjacent to the first arm 414 and the second arm 415 such that: (i) with respect to the first arm 414 side of the rail 410 all three apertures of the fastening aperture 407 at the first frame flange coupling tab 405_a_ at each of the first and second coupling flanges 404_a_, 404_b_ and the fastening aperture 417 at the respective, interfacing first arm 414 are aligned to receive a common fastening member, such as a rivet, bolt, or bobtail or to share a common clinch or weld joint, and (ii) with respect to the second arm 415 side of the rail 410 all three apertures of the fastening aperture 407 at the second frame flange coupling tab 405_b_ at each of the first and second coupling flanges 404_a_, 404_b_ and the fastening aperture 417 at the respective, interfacing second arm 415 are aligned to receive a common fastening member, such as a rivet, bolt, or bobtail or to share a common clinch or weld joint.

Thus, the frame coupling apparatus 420 can be configured to support two solar module frames 400 at one rail 410 using first and second overlapping component orientations at opposite sides of the rail 410. This can include a first overlapping component orientation at one side of the rail 410 of: one frame flange coupling tab of one coupling flange of one solar module frame, another frame flange coupling tab of another coupling flange of another solar module frame, and one arm of the coupling flange receiver at one side of the rail; and a second overlapping component orientation at another, opposite side of the rail 410 of: the other frame flange coupling tab of the one coupling flange of the one solar module frame, the other frame flange coupling tab of the another coupling flange of the another solar module frame, and another arm of the coupling flange receiver at the another, opposite side of the rail. And the frame coupling apparatus 420 can be configured to support two solar module frames 400 at one rail 410 using a small number of fastening members and/or a small number of welds/clinched joints and thereby can create useful efficiencies in solar tracker apparatus installation.

Figure 5A:
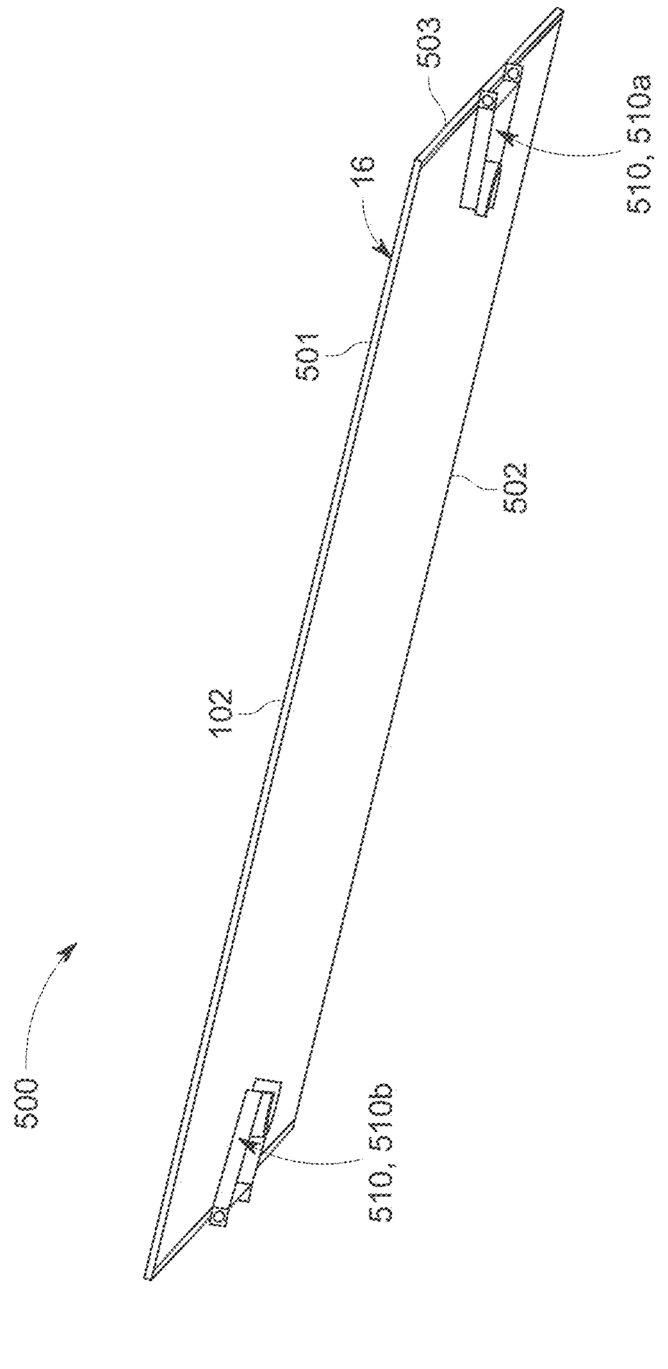
FIGS. 5A-5D illustrate a further exemplary embodiment of a solar module frame.
Figure 5B:
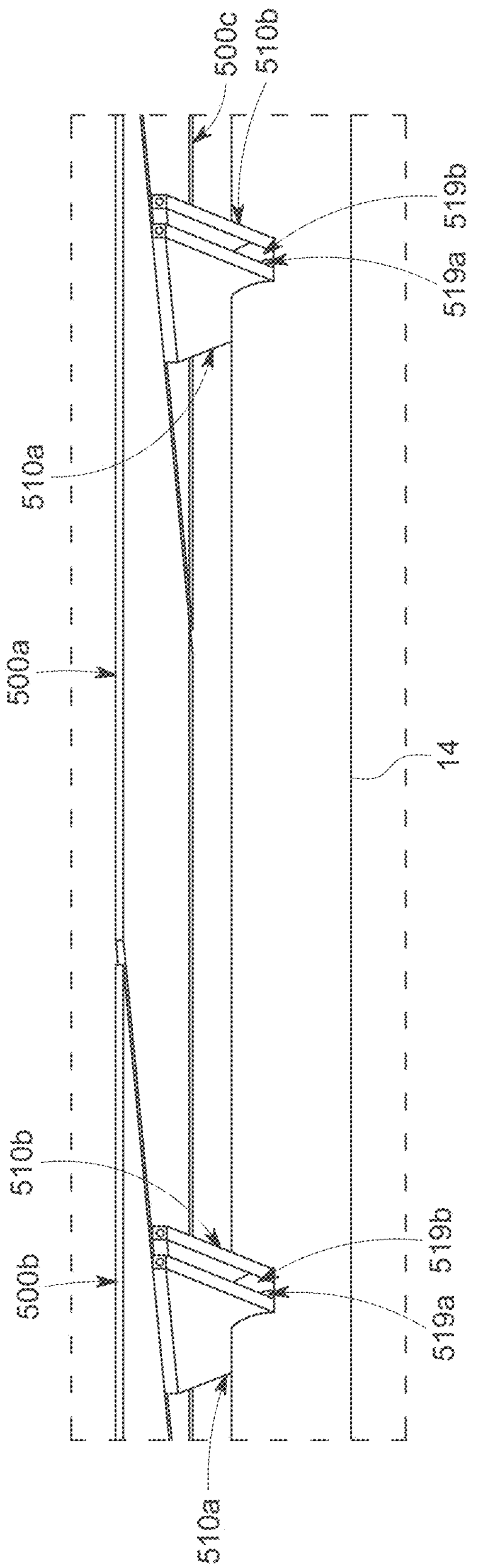
Figure 5C:
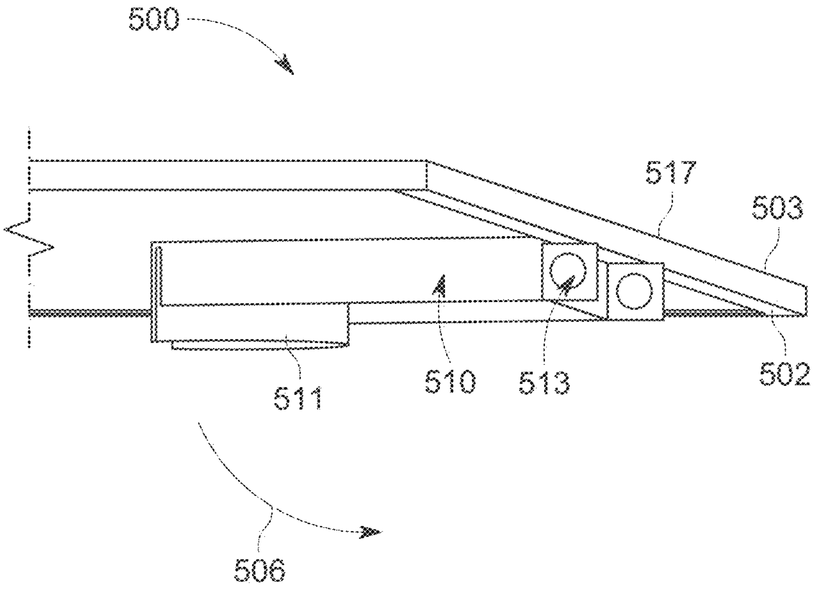
Figure 5D:
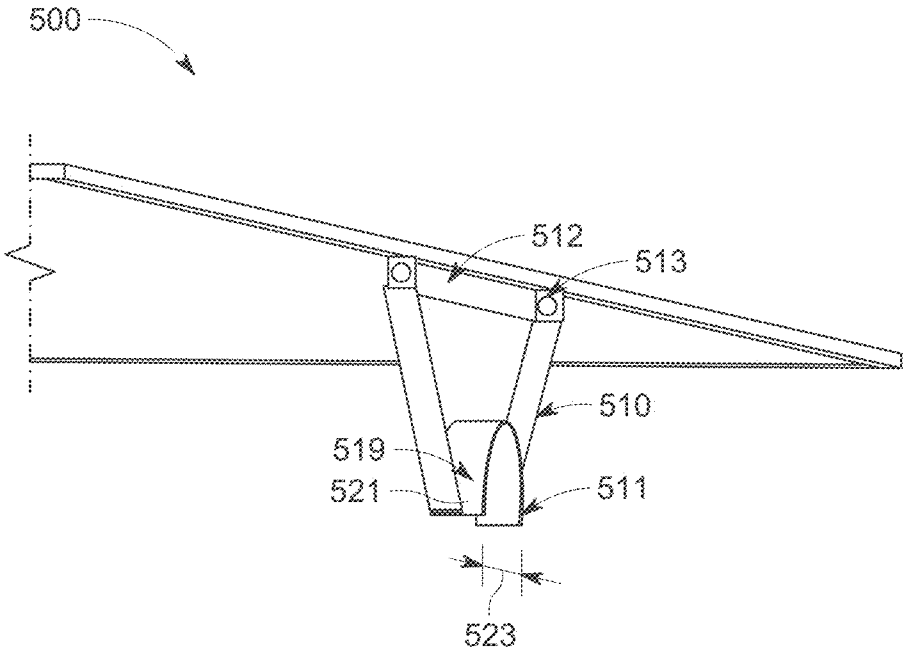

FIGS. 5A-5D illustrate an additional exemplary embodiment of a solar module frame 500. FIG. 5A shows the solar module frame 500 with integrated rails 510 each in a stowed position, FIG. 5B shows solar module frames 500 each with one or more integrated rails 510 in an installation position and coupled to the torque tube 14, FIG. 5C shows a close up perspective view of the integrated rail 510 of the solar module frame 500 in the stowed position, and FIG. 5D shows a close up perspective view of the integrated rail 510 of the solar module frame 500 in the installation position.

The solar module frame 500 has a top side 501, a bottom side 502, and longitudinal sides 503 extending between the top and bottom sides 501, 502. The top side 501 of the frame 500 can bound photovoltaic cells 102 (e.g., photovoltaic cells included at a silicon laminate) and the bottom side 502 of the frame 500 can be configured to face the torque tube 14.

To help facilitate coupling of the solar module frame 400 to the torque tube 14, each solar module frame 400 can include at least one integrated rail 510. The illustrated embodiment of the solar module frame 500 includes two integrated rails 510_a_, 510_b_ at opposite longitudinal sides 503 of the solar module frame 500. Each integrated rail 510 can be configured to couple a solar module frame 500 to the torque tube 14. As seen at FIG. 5D, the rail 510 can have a first end portion 511 that interfaces (e.g., contacts) the torque tube 14 and an opposite second end portion 512 that interfaces with the bottom side 502 and/or a longitudinal side 503 of the solar module frame 500. The first end portion 511 of the rail 510 can have a profile that matches a cross-section of the torque tube 14, which in the illustrated example the torque tube 14 has a rounded (e.g., circular) cross-section and the first end portion 511 of the rail 510 defines a semi-circular recessed cutout. The second end portion 512 of the rail 510 can include a movable attachment 513 to one or more sides of the solar module frame 500 (e.g., a movable attachment to the bottom side 502 and/or one longitudinal side 503 of the solar module frame 500). The illustrated example shows the movable attachment 513 of the integrated rail 510 to the solar module frame 500 as a rotatable, pivot connection between the second end portion 512 of the rail 510 and one or more sides of the solar module frame 500. The rotatable, pivot connection can, for instance, include one pin joint at one side of the integrated rail 510 and another pin joint at an opposite side of the integrated rail 510. Thus, the integrated rail 510 can move, relative to the solar module frame 500 (e.g., relative to one or more sides of the solar module frame 500), between various positions, such as between a stowed position (e.g., an example of which is illustrated at FIG. 5C) and an installation position (e.g., an example of which is illustrated at FIG. 5D).

To install the solar module frame 500 at the torque tube 14, a first integrated rail 510_a_ of a solar module frame 500 can be moved from a stowed position, such as shown at FIG. 5C, to an installation position, such as shown at FIG. 5D. This can include moving the first integrated rail 510_a_ in the direction 506 from the stowed position to the installation position. In some examples, the solar module frame 500 can include a stop member 517 adjacent to the movable attachment 513 of the integrated rail 510 to the solar module frame 500. The stop member 517 can be included, for instance, at the bottom and/or longitudinal sides 502, 503 of solar module frame 500 and/or at the integrated rail 510, and the stop member 517 can be configured to interfere with movement of the integrated rail beyond a present installation position. As such, when the integrated rail 510 is being moved from the stowed position to the installation position, such movement of the integrated rail 510 can be terminated when the integrated rail 510 (e.g., the movable attachment 513 of the integrated rail 510) contacts the stop member 517. For example, the stop member 517 can be configured to prevent further movement of the integrated rail from the stowed position to the installation position when the integrated rail 510 is positioned orthogonal to the bottom side 502. In a further example, the integrated rail 510 can be configured to additionally lock into installation position when the integrated rail 510 is moved to the installation positions. For instance, the integrated rail can be configured to lock into the installation position such that further movement of the integrated rail 510 beyond ninety degrees relative to the bottom side 502 is prevented.

The integrated rail 510 can be configured to interface, at the torque tube 14, with another integrated rail of another, adjacent solar module frame 500. According to some such examples, the first end portion 511 of the integrated rail 510 can include an overlap accommodating extension 519, for instance, seen at FIG. 5D. The overlap accommodating extension 519 at the first end portion 511 of the integrated rail 510 can define an exposed, free surface 521 at the first end portion 511 of the integrated rail 510. The exposed, free surface 521 defined by the overlap accommodating extension 519 can have an accommodating width 523 that is sufficient to provide an area for overlaying another overlap accommodating extension 519 of another, adjacent integrated rail 510 of another, adjacent solar module frame 500. Referring to the exemplary illustration at FIG. 5B, solar module frame 500*a* can be coupled to the torque tube 14 adjacent to both solar module frame 500*b* and solar module frame 500*c*. Solar module frame 500*a* can have a first integrated rail 510*a* at one side and another integrated rail 510*b* at another, opposite side of the solar module frame 500*a*. Likewise, adjacent solar module frame 500*b* can include integrated rail 510*a* seen at FIG. 5B and adjacent solar module frame 500*c* can include integrated rail 510*b* seen at FIG. 5B (although not shown, solar module frame 500*b* can include a second integrated rail at an opposite side and solar module frame 500*c* can include a second integrated rail at an opposite side). The integrated rails 510 at adjacent solar module frames 500*a*, 500*b*, 500*c* can be configured, in some examples, to overlap with an adjacent integrated rail 510 of an adjacent solar module frame. For example, as shown at FIG. 5B, the first integrated rail 510*a* of solar module frame 500*a* can overlap with adjacent integrated rail 510*b* of adjacent solar module frame 500*c* at a first side of solar module frame 500*a* while the second integrated rail 510*b* of the solar module frame 500*a* can overlap with adjacent integrated rail 510*a* of adjacent solar module frame 500*b* at a second, opposite side of solar module frame 500*a*. In particular, the first overlap accommodating extension 519*a* at the first integrated rail 510*a* of solar module frame 500*a* can be in an overlaid orientation with the overlap accommodating extension 519*b* at the integrated rail 510*b* of solar module frame 500*c* while the second overlap accommodating extension 519*b* at the second integrated rail 510*b* of solar module frame 500*a* can be in an overlaid orientation with the overlap accommodating extension 519*a* at the integrated rail 510*a* of solar module frame 500*b*. The overlaid orientation can include an overlaid orientation (e.g., directly contacting relationship) of the respective exposed, free surfaces 521 of the adjacent (e.g., contacting) integrated rails.

The ability of the one or more integrated rails 510 to move relative to the solar module frame 500 can provide useful advantages. As one example, the integrated nature of the rail 510 results in the rail 510 coming pre-coupled to the frame 500 such that this can eliminate a need for on-site coupling of the rail 510 to the frame 500. Yet, at the same time, the movable nature of the integrated rail 510 can allow for a plurality of solar module frames 500 to be shipped with the integrated rails 510 in the stowed position, such as shown at FIG. 5C, which can provide significant packing density and space savings which can result in cost savings associated with shipping solar module frames to an installation site.

Figure 6A:
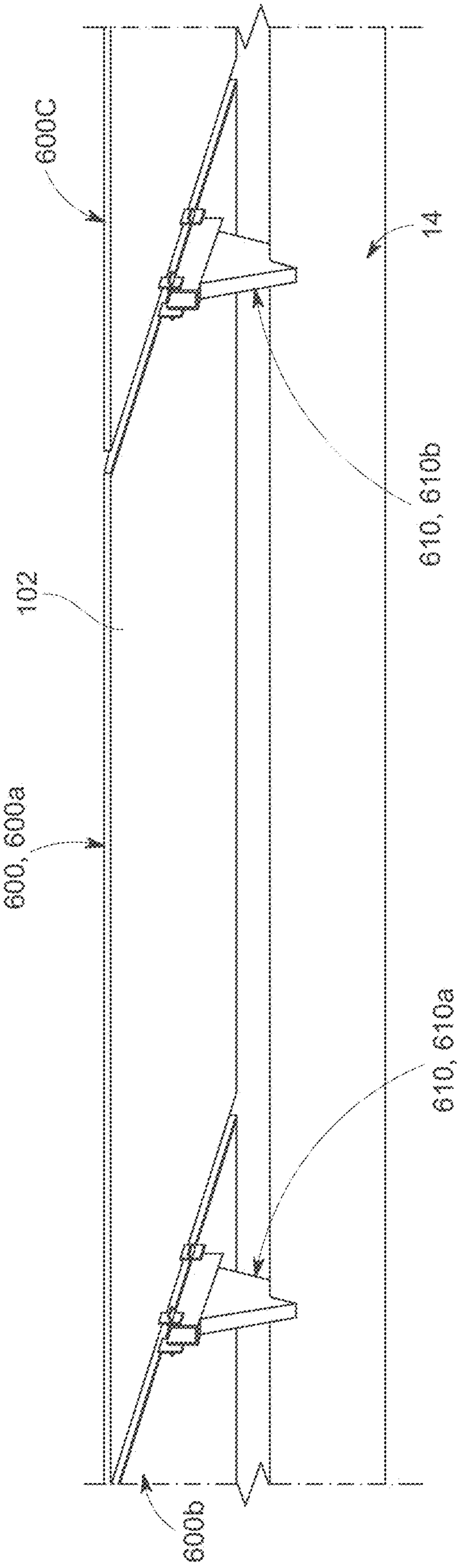
FIGS. 6A-6G illustrate another embodiment of a solar module frame and another exemplary embodiment of a rail and associated frame coupling apparatus for coupling one or more solar module frames to a torque tube.
Figure 6B:
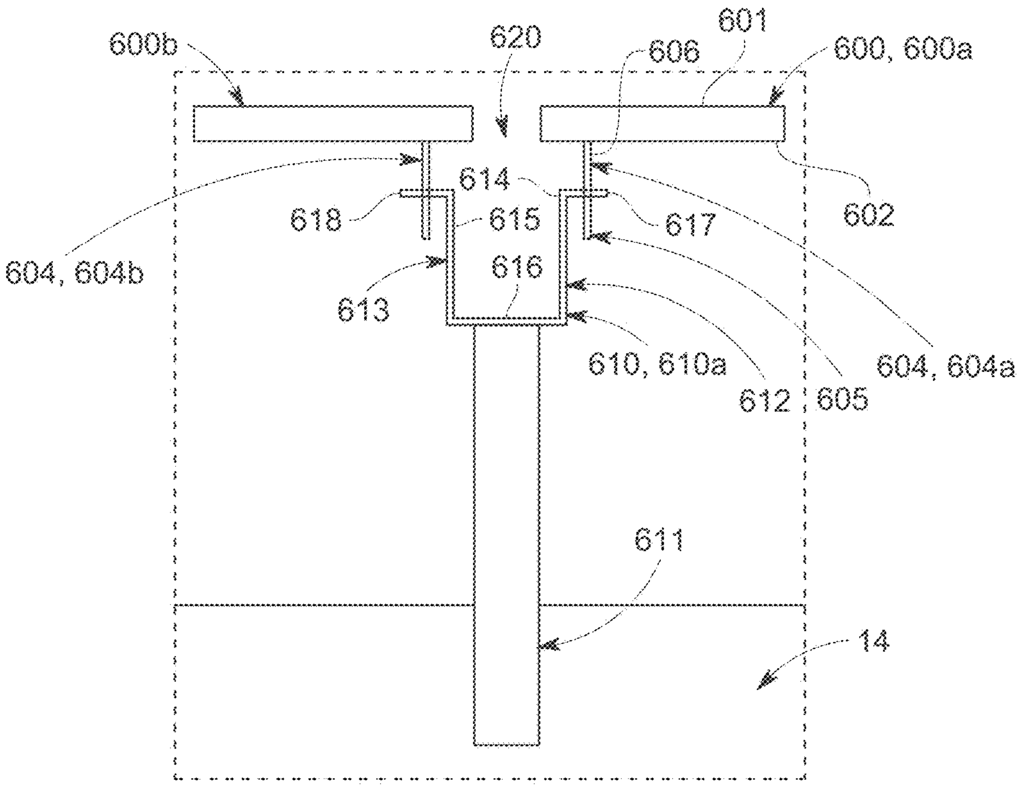
Figure 6C:
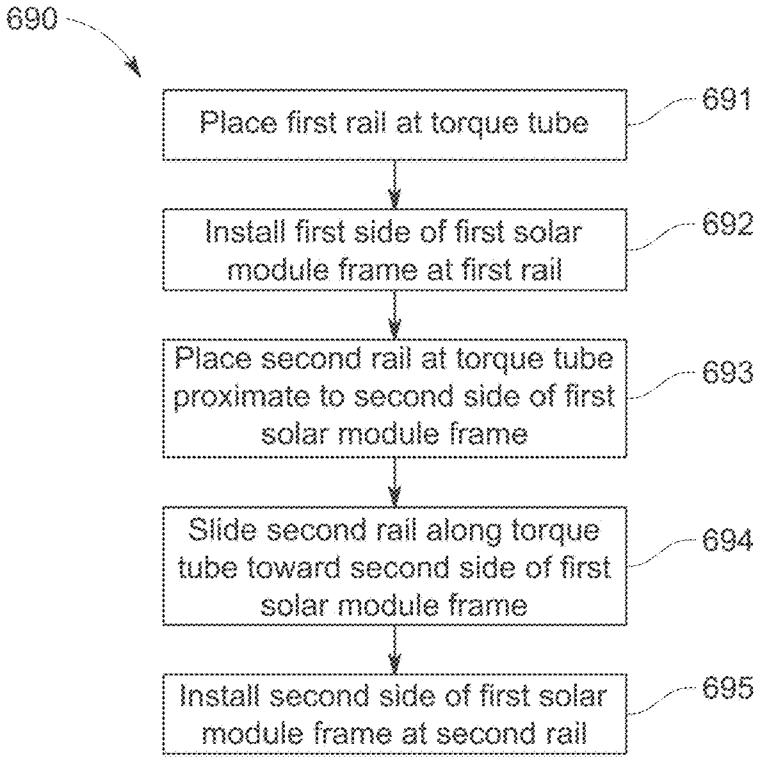
Figure 6D:
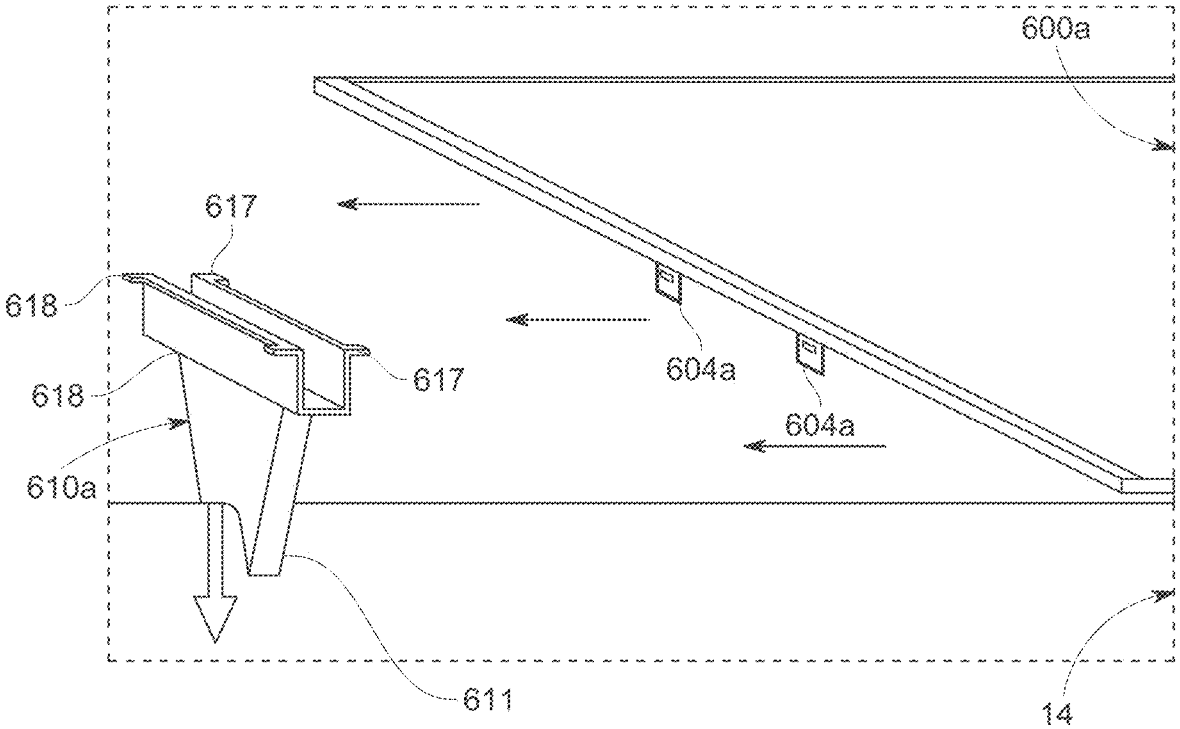
Figure 6E:
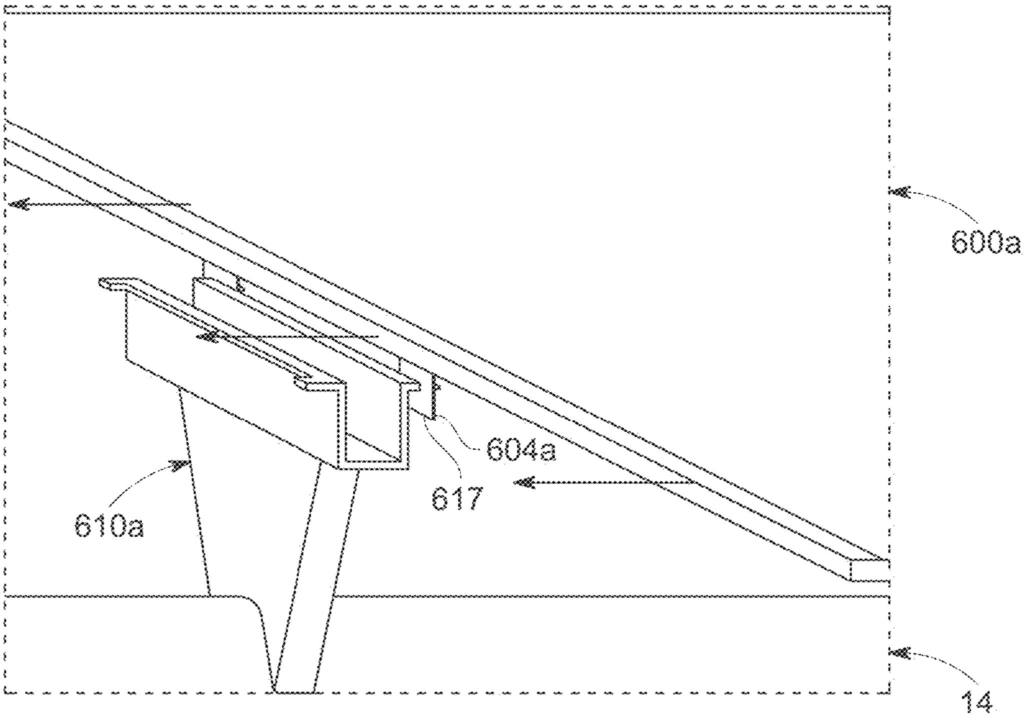
Figure 6F:
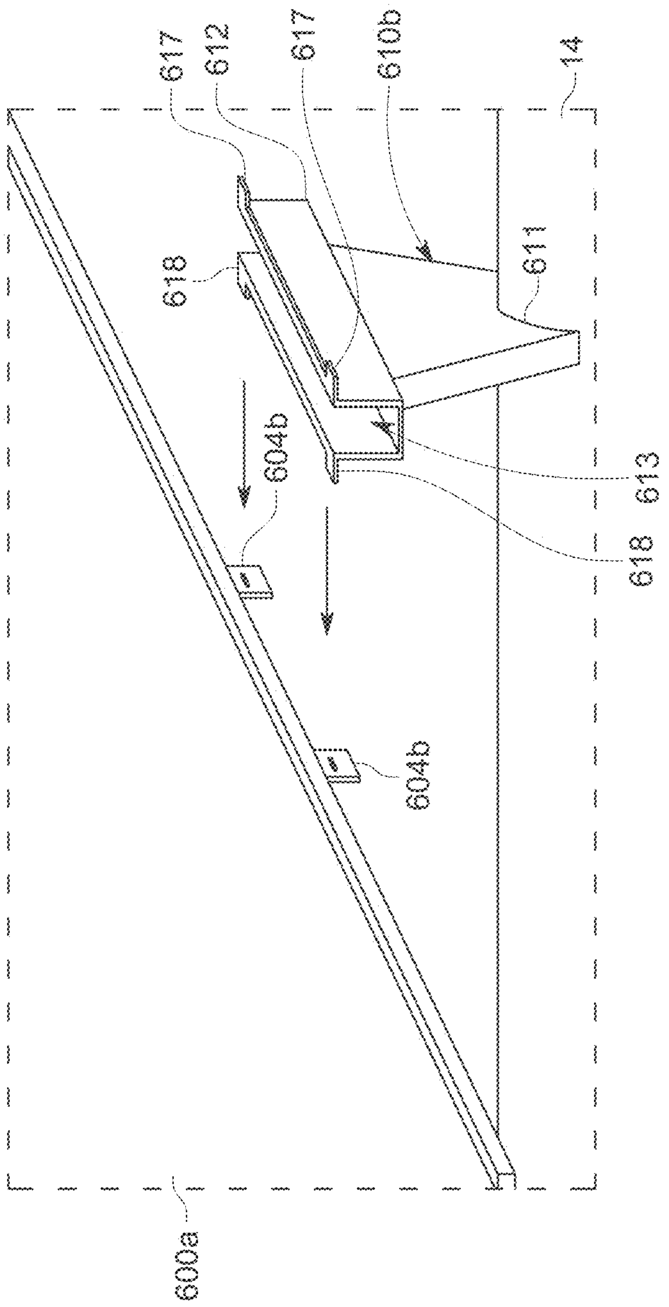
Figure 6G:
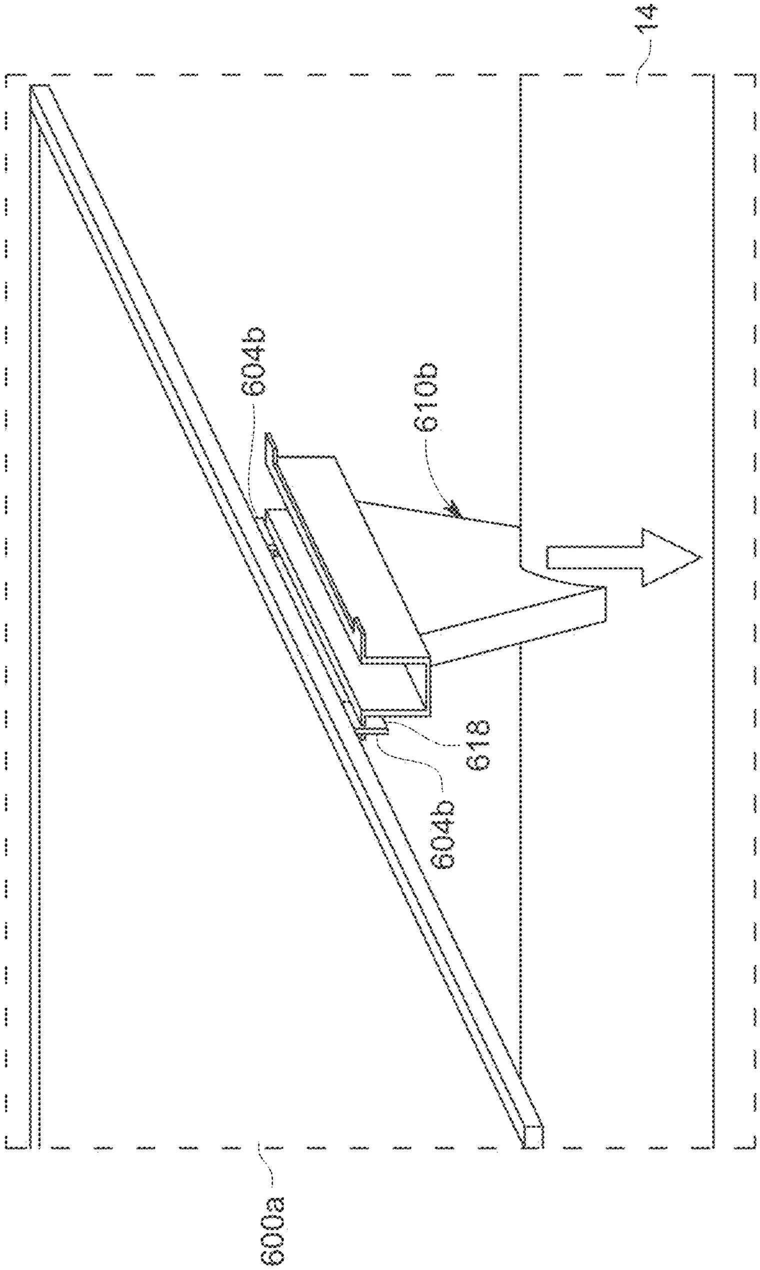

FIGS. 6A-6G illustrate another embodiment of a solar module frame 600 and another exemplary embodiment of a rail 610 and associated frame coupling apparatus 620 for coupling one or more solar module frames 600 to the torque tube 14. FIG. 6A shows a perspective view of solar module frames 600 coupled to the torque tube 14 via the rail 610 and associated frame coupling apparatus 620. FIG. 6B shows an elevational view of a pair of solar module frames 600 coupled to the torque tube 14 via the rail 610 and associated frame coupling apparatus 620. FIG. 6C shows a flow diagram of an embodiment of a method 690 for coupling solar module frames to a torque tube. FIG. 6D shows an example step of the method 690 for placing (e.g., securing) a first rail at the torque tube 14, FIG. 6E shows an example step of the method 690 for installing a first side of a first solar module frame to the first rail, FIG. 6F shows an example step of the method 690 for placing (e.g., securing) a second rail at the torque tube 14, and FIG. 6G shows example steps of the method 690 for sliding the second rail along the torque tube 14 toward a second side of the first solar module frame and installing the second side of the first solar module frame to the second rail.

Referring to FIGS. 6A and 6B, the solar module frame 600 has a top side 601 and a bottom side 602. The top side 601 of the frame 600 can bound photovoltaic cells 102 (e.g., photovoltaic cells included at a silicon laminate) and the bottom side 602 of the frame 600 can be configured to face the torque tube 14.

In addition, to help facilitate coupling of the solar module frame 600 to the torque tube 14, each solar module frame 600 can include one or more coupling flanges 604. Each coupling flange 604 can extend out from the solar module frame 600. For example, as shown for the illustrated embodiment, the coupling flange 604 can extend out from the bottom side 602 of the solar module frame 600 and can form a bottom-most surface of the solar module frame 600. The coupling flange 604 can thus have a first end portion 605 that is attached to the bottom side 602 of the solar module frame and a second, opposite end portion 606 that forms a free end extending out from the bottom side 602 of the solar module frame 600 with the second end portion 606 as the bottom-most surface of the solar module frame 600. The first end portion 605 of the solar module frame 600 can lay in a first, common plane as the second end portion 606 of the solar module frame 600. As one such example, the coupling flange 604, as shown here, can form a planar member extending between the first and second end portions 605, 606.

The rail 610 can be configured to couple to one or more solar module frames 600 and to couple to the torque tube 14 such that the rail 610 is configured to couple one or more solar module frames 600 to the torque tube 14. The illustrated embodiment shows the rail 610 configured to couple two solar module frames 600 to the torque tube 14. As seen at FIGS. 6A and 6B, the rail 610 can have a first end portion 611 that interfaces (e.g., contacts) the torque tube 14 and an opposite second end portion 612 that interfaces with one or more coupling flanges 604 of one or more solar module frames 600. The first end portion 611 of the rail 610 can have a profile that matches a cross-section of the torque tube 14, which in the illustrated example the torque tube 14 has a rounded (e.g., circular) cross-section and the first end portion 611 of the rail 610 defines a semi-circular recessed cutout. The second end portion 612 of the rail 610 can define a coupling flange receiver 613. The coupling flange receiver 613 can be generally a U-shaped coupling flange receiver that can include a first horizontal arm 617 and a first vertical arm 614 at one side of the U-shaped coupling flange receiver 613, a second horizontal arm 618 and a second vertical arm 615 at another, opposite side of the U-shaped coupling flange receiver 613, and an intermediate portion 616 that connects the first and second vertical arms 614, 615. The first horizontal arm 617 can extend from an end of the first vertical arm 614 opposite the intermediate portion 616 and the second horizontal arm 618 can extend from an end of the second vertical arm 615 opposite the intermediate portion 616. The coupling flange receiver 613 is configured to contact and support one or more coupling flanges 604 of one or more solar module frames 600.

The frame coupling apparatus 620 can be configured to couple the solar module frame 600 to the torque tube 14. Referring to FIGS. 6A and 6B, as shown for the illustrated example, the frame coupling apparatus 620 can include first and second solar module frames 600*a*, 600*b* and the rail 610*a*. The first solar module frame 600*a* of the frame coupling apparatus 620 can include coupling flange 604*a* and the second solar module frame 600*b* of the frame coupling apparatus 620 can include coupling flange 604*b*. As illustrated, the coupling flange receiver 613 of the rail 610 is configured to receive the coupling flange 604*a* as well as the coupling flange 604*b*. For example, coupling flange 604*a* of solar module frame 600*a* can be received at (e.g., contact) the first horizontal arm 617 of the coupling flange receiver 613 and coupling flange 604*b* of solar module frame 600*b* can be received at (e.g., contact) the second horizontal arm 618 of the coupling flange receiver 613. Thus, the coupling flange 604*a* and one horizontal arm 617 of the coupling flange receiver 613 can interface while the coupling flange 604*b* and another horizontal arm 618 of the coupling flange receiver 613 can interface, for instance, at opposite sides of the coupling flange receiver 613. The coupling flanges 604*a*, 604*b* can be secured to the arms 617, 618, respectively, by, for instance, imparting relative movement (e.g., relative sliding movement) between the respective coupling flanges 604*a*, 604*b* and the respective horizontal arms 617, 618. This can include, as one example, imparting such relative movement by moving at least one rail along the torque tube 14 relative to one solar module frame 600. In one such example, a single fastener connection between the torque tube 14 and the rail 610 can act to secure the solar module frame 600 to the torque tube as a result of snap-fit connections made during relative movement during installation. Thus, the frame coupling apparatus 620 can, in some cases, be configured to support two solar module frames 600 at one rail 610 using a single fastening connection made in the field directly between the torque tube 14 and the one rail 610 and thereby can create useful efficiencies in solar tracker apparatus installation.

FIG. 6C shows a flow diagram of an embodiment of a method 690 for coupling solar module frames to a torque tube. FIGS. 6D-6G shows exemplary depictions of steps of the method 690 and will be referenced as follows in the discussion of the method 690. Though it is to be noted that FIGS. 6D-6G provide illustrative examples of steps of the method 690 and other examples can be within the scope of the noted steps of the method 690.

At step 691, the method 690 includes the step of placing a first rail at a torque tube. As one example, referring to FIG. 6D, the first rail can be the rail 610*a* and the torque tube can be the torque tube 14. As shown at FIG. 6D, the first rail 610*a* can be placed at the torque tube 14, such as by placing the first end portion 611 into contact with the torque tube 14 and the second end portion 612, having the coupling flange receiver 613, opposite the torque tube 14.

At step 692, the method 690 includes the step of installing a first side of a first solar module frame at the first rail. As shown at FIG. 6E, the first side of the first solar module frame 600*a* can be installed at the first rail 610*a*. In particular, one or more coupling flanges 604*a* at the first side of the solar module frame 600*a* can be engaged with the coupling flange receiver 613 at the first rail 610*a*. The one or more coupling flanges 604*a* at the first side of the solar module frame 600*a* can be engaged with the coupling flange receiver 613 by, for instance, engaging the one or more first horizontal arms 617 and the one or more coupling flanges 604*a* at the first side of the solar module frame 600*a*. In some cases, engaging the one or more first horizontal arms 617 and the one or more coupling flanges 604*a* at the first side of the solar module frame 600*a* can act to restrain movement of the first solar module frame 600*a* in the direction above the torque tube 14, to the left, and into and out of the picture in the orientation shown at FIG. 6D.

At step 693, the method 690 includes the step of placing a second rail at the torque tube proximate to a second side of the first solar module frame. The second side of the first solar module frame can be opposite the first side of the first solar module frame at which the first rail was installed at step 692. As shown at FIG. 6F, the second rail 610*b* can be placed at the torque tube 14 proximate to a second side of the first solar module frame, such as by placing the first end portion 611 of the second rail 610*b* into contact with the torque tube 14 and the second end portion 612 of the second rail 610*b*, having the coupling flange receiver 613, opposite the torque tube 14.

At step 694, the method 690 includes the step of sliding the second rail along the torque tube toward the second side of the first solar module frame. As shown at FIGS. 6F and 6G, after placing the second rail 610*b* at the torque tube 14 proximate to the second side of the first solar module frame 600*a* at step 693, at step 694 the second rail 610*b* can be slid along the torque tube 14 toward the second side of the first solar module frame 600*a*, such as by sliding the second rail 610*b* in the direction of the arrows shown at FIG. 6F. The second rail 610*b* can be slid along the torque tube 14 toward the second side of the first solar module frame 600*a* until the one or more coupling flanges 604*b* at the second side of the first solar module frame 600*a* engage (e.g., secure to) the coupling flange receiver 613 at the second rail 610*b*, such as at step 695. As one such example, the second rail 610*b* can be slid along the torque tube 14 toward the second side of the first solar module frame 600*a* until the one or more coupling flanges 604*b* at the second side of the first solar module frame 600*a* engage (e.g., secure to) the one or more second horizontal arms 618 at the coupling flange receiver 613 at the second rail 610*b*, such as at step 695.

At step 695, the method 690 includes the step of installing the second side of the first solar module frame at the second rail. Referring to FIG. 6G, the second side of the first solar module frame 600*a* can be installed at the second rail 610*b*. In particular, one or more coupling flanges 604*b* at the second side of the solar module frame 600*a* can be engaged with the coupling flange receiver 613 at the second rail 610*b*. The one or more coupling flanges 604*b* at the second side of the solar module frame 600*a* can be engaged with the coupling flange receiver 613 at the second rail 610*b* by, for instance, engaging the one or more second horizontal arms 618 and the one or more coupling flanges 604*b* at the second side of the solar module frame 600*a*. In some applications, sliding the second rail 610*b* along the torque tube 14 at step 694 can cause the second side of the first solar module frame 600*a* to be installed at the second rail 610*b* at step 695. In some cases, engaging the one or more second horizontal arms 618 and the one or more coupling flanges 604*b* at the second side of the solar module frame 600*a* can act to restrain movement of the first solar module frame 600*a* in the direction above the torque tube 14, to the right, and into and out of the picture in the orientation shown at FIG. 6D. Thus, with the first side of the first solar module frame 600*a* installed at the first rail at step 692 and with the second side of the first solar module frame 600*a* installed at the second rail at step 695, the first solar module frame 600*a* can be restrained from movement all directions. Moreover, this securement of the first solar module frame 600*a* relative to the torque tube 14 can be accomplished with convenient coupling connections that can be efficiently, simply, and quickly executed in the field.

The steps of the method 690 can be repeated (e.g., in part) to install another second solar module frame (e.g., the solar module frame 600*c*) at the torque tube.

Figure 7A:
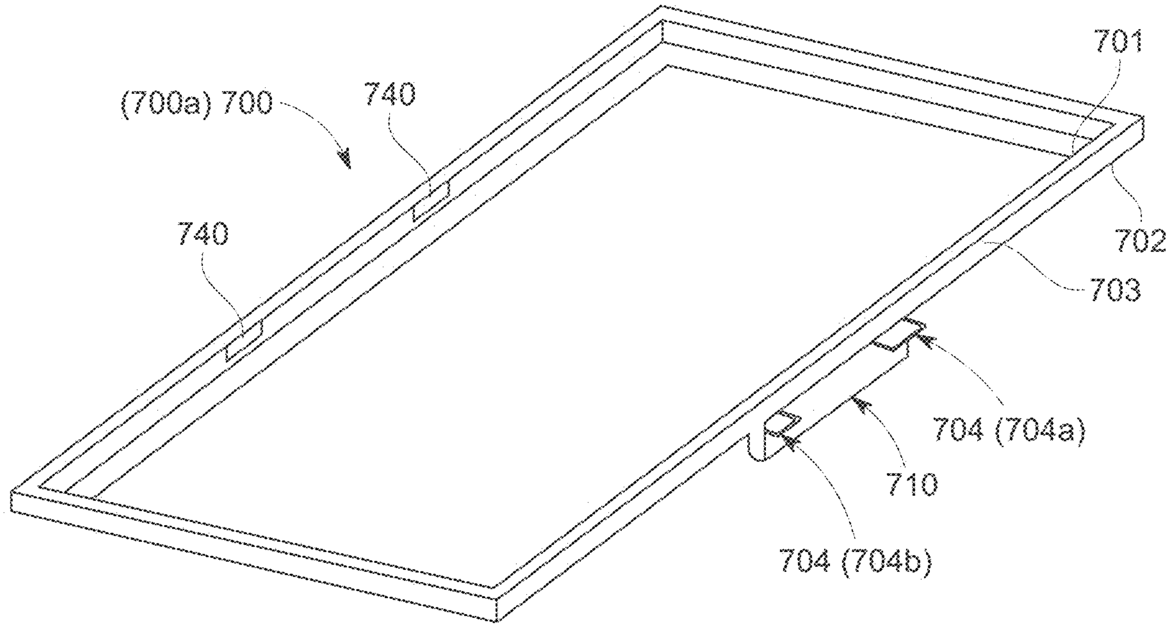
FIGS. 7A-7C illustrate an additional exemplary embodiment of a solar module frame.
Figure 7B:
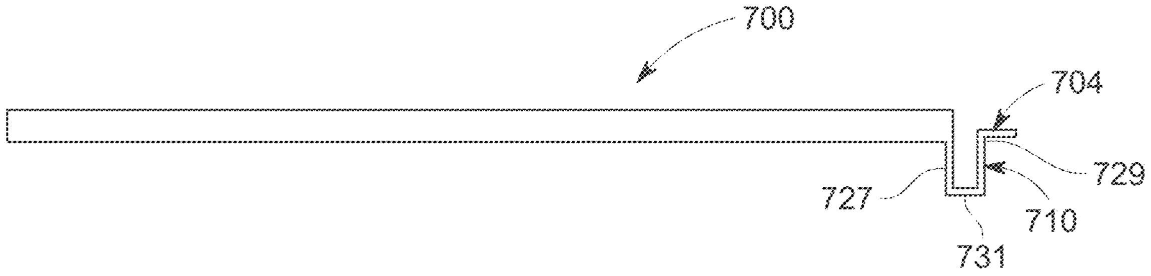
Figure 7C:
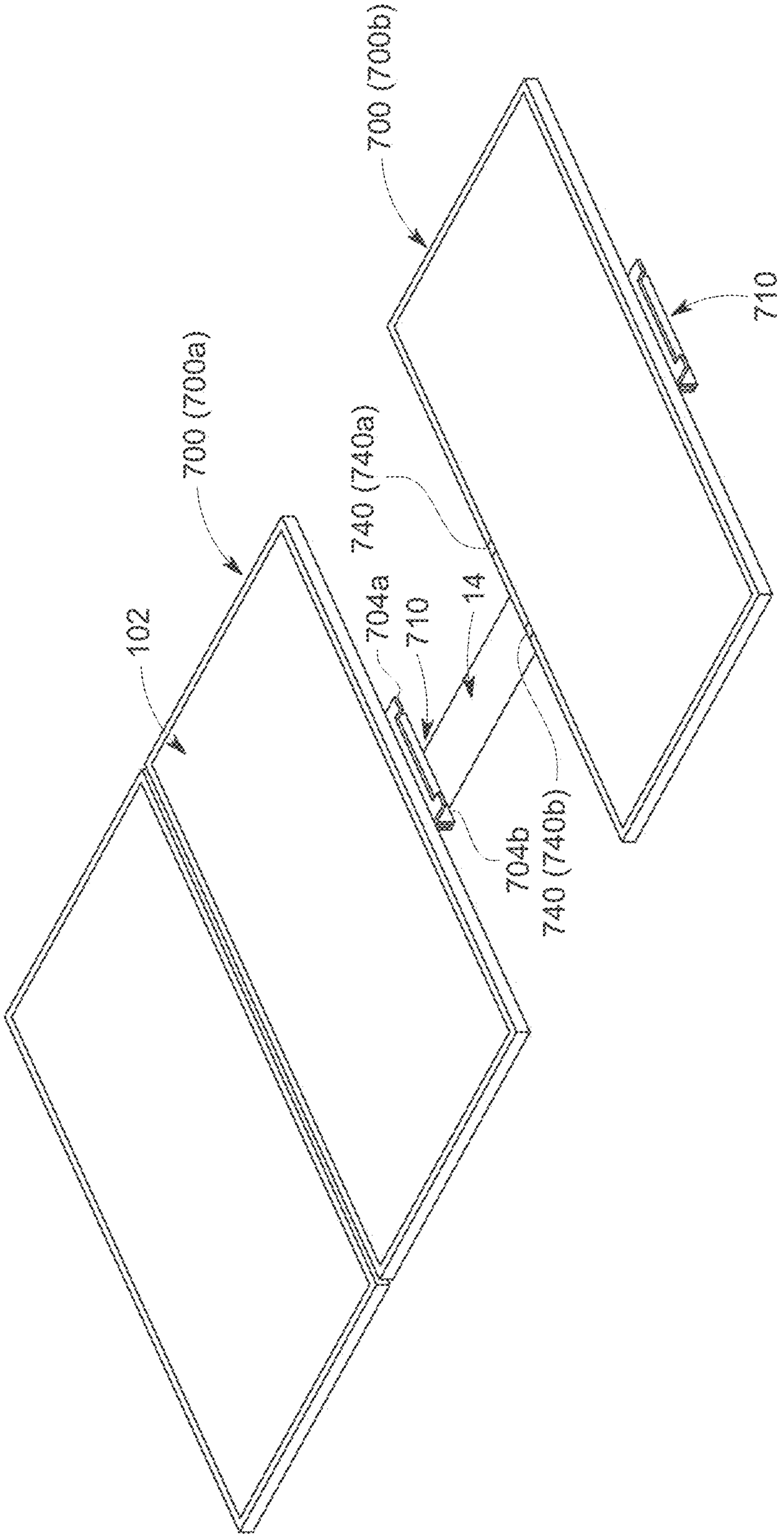

FIGS. 7A-7C illustrate another exemplary embodiment of a solar module frame 700. FIG. 7A shows a perspective of the solar module frame 700, FIG. 7B shows an elevational view of the solar module frame 700, and FIG. 7C shows multiple solar modules frames 700 coupled to the torque tube 14.

The solar module frame 700 can have a top side 701, a bottom side 702, and longitudinal sides 703 extending between the top and bottom sides 701, 702. The top side 701 of the frame 700 can bound photovoltaic cells 102 (e.g., photovoltaic cells included at a silicon laminate) and the bottom side 702 of the frame 700 can be configured to face the torque tube 14. In addition, to help facilitate coupling of the solar module frame 700 to the torque tube 14, each solar module frame 700 can include an integrated rail 710 and one or more slots 740. The integrated rail 710 can be at a first side of the solar module frame 700 and the one or more slots 740 can be at a second, opposite side of the solar module frame 700.

The integrated rail 710 can include one or more coupling flanges 704, and the one or more coupling flanges 704 at the integrated rail 710 can be configured to couple one solar module frame (e.g., solar module frame 700*a*) to another, adjacent solar module frame (e.g., solar module frame 700*b*) at the torque tube 14. The illustrated embodiment of the solar module frame 700*a* shows the integrated rail 710 as including two coupling flanges 704*a*, 704*b*. More specifically, in addition to the one or more coupling flanges 704, the integrated rail 710 can include one or more sidewalls. The illustrated embodiment shows the integrated rail 710 as including a first sidewall 727, a second sidewall 729, and a third sidewall 731. The first sidewall 727 can extend out from the bottom side 702 of the solar module frame 700 (e.g., extend out from the bottom side 702 in a direction toward and orthogonal to a central longitudinal axis of the torque tube 14), the second sidewall 729 can be spaced from the first sidewall 727 and the second sidewall 729 can extend parallel to the first sidewall 727, and the third sidewall 731 can bridge between the first and second sidewalls 727, 729 (e.g., such that the first, second, and third sidewalls 727, 729, 731 define a "U" cross-sectional shape at the integrated rail 710). The third sidewall 731 of the illustrated embodiment can form a bottom-most surface of the solar module frame 700 such that the third sidewall 731 is configured to contact and sit at the torque tube 14. The one or more coupling flanges 704 can extend out from the second sidewall 729, such as in a direction parallel to the central longitudinal axis of the torque tube 14 and toward slots 740 of an adjacent solar module to be positioned at, and coupled to, the torque tube 14. The illustrated embodiment shows that each of the one or more coupling flanges 704 can extend out from the second sidewall 729 to form a discrete tab member that defines a free end at a distal end of the discrete tab member, for instance, at an elevation above the third sidewall 731 but below the top side 701 of the solar module frame 700.

The one or more slots 740 at one solar module frame 700*a* can be configured to couple to the one or more coupling flanges 704 of an adjacent solar module frame 700*b* at the torque tube 14. For example, the illustrated embodiment shows the integrated rail 710 of a first solar module frame 700*a* as having two coupling flanges 704*a*, 704*b* and, thus, a second solar module frame 700*b* to be installed at the torque tube adjacent to the first solar module frame 700*a* has two corresponding slots 740*a*, 740*a* (e.g., slots 740*a*, 740*b* extending through a longitudinal side 703 of the solar module frame 700*b*). The two slots 740*a*, 740*b* of the second solar module frame 700*b* can be configured to receive and couple to the two coupling flanges 704*a*, 704*b* of the first solar module frame 700*a*, for instance, such that coupling flange 704*a* at solar module frame 700*a* is inserted through slot 740*a* of solar module frame 700*b* and coupling flange 704*b* at solar module frame 700*a* is inserted through slot 740*b* of solar module frame 700*b*.

The noted configuration of the solar module frame 700 including the integrated rail and one or more slots 740 can help to increase the efficiency associated with installing solar module frames at a torque tube in the field. One example installation process associated with solar module frames 700 will be described to illustrate the noted efficiencies. A first solar module frame 700*a* can be coupled to the torque tube 14, for instance, by securing the integrated rail 710 of the solar module frame 700*a* to the torque tube 14, such as by using a strap around the torque tube 14, a blind rivet, a weld, or other appropriate securing means. Then, a second solar module frame 700*b*, placed at, or near, the torque tube 14, can be moved relative to the torque tube 14 toward the first solar module frame 700*a* (e.g., which is secured to the torque tube 14 as noted). For instance, this could include sliding the second solar module frame 700*b* along the torque tube 14. The second solar module frame 700*b* can be moved as such toward the first solar module frame 700*a* until the one or more slots 740*a*, 740*b* at the second solar module frame 700*b* engage with (e.g., are inserted within) the corresponding one or more coupling flanges 704*a*, 704*b* at the integrated rail 710 of the first solar module frame 700*a*. This engagement between the coupling flange(s) 704*a*, 704*b* of the first solar module frame 700*a* with the one or more corresponding slots 740*a*, 740*b* of the second solar module frame 700*b* can act to retain the second solar module frame 700*b* in up/down directions relative to the torque tube 14 and in one or more directions transverse to the central longitudinal axis of the torque tube 14. With the coupling flange(s) 704*a*, 704*b* of the first solar module frame 700*a* engaged with the one or more corresponding slots 740*a*, 740*b* of the second solar module frame 700*b*, the integrated rail 710 of the second solar module frame 700*b* can be coupled to the torque tube 14, such as in the same manner that the first solar module frame 700*a* was coupled to the torque tube using a strap around the torque tube 14, a blind rivet, a weld, or other appropriate securing means. This process can then be repeated to install additional, adjacent solar module frames along the torque tube 14 using the complementary integrated rail 710 and slots 740 at interfacing solar module frames 700 along the torque tube 14.

Thus, the solar module frame 700 can be configured to allow the solar module frame 700 to be coupled to the torque tube 14 using a single fastener at the integrated rail 710, which can result in a significant reduction in assembly time and cost. Moreover, integrating the integrated rail 710 at the solar module frame 700 can provide a robust, repeatable, and reliable joint therebetween which can eliminate a need to perform torque checks or other quality checks in the field once the solar module 700 has be coupled to the torque tube 14, and this can eliminate the need to install a separate rail component which then necessitates a dedicated, additional one or more fastening connections between a conventional frame and such separate rail component.

Figure 8A:
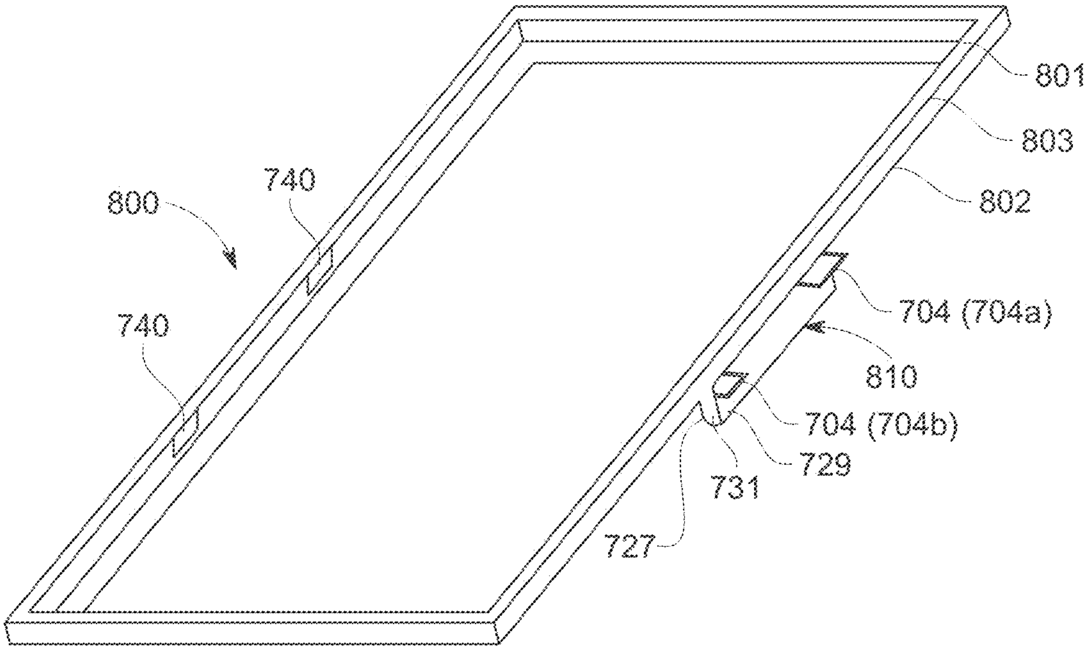
FIGS. 8A-8C illustrate a further exemplary embodiment of a solar module frame and a further exemplary embodiment of a rail and associated frame coupling apparatus for coupling one or more solar module frames to a torque tube.
Figure 8B:
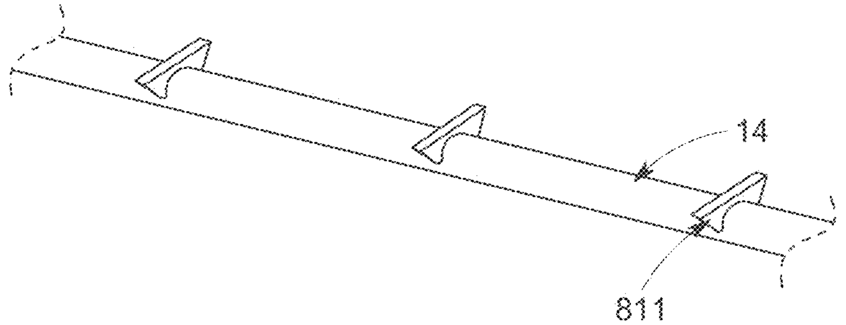
Figure 8C:
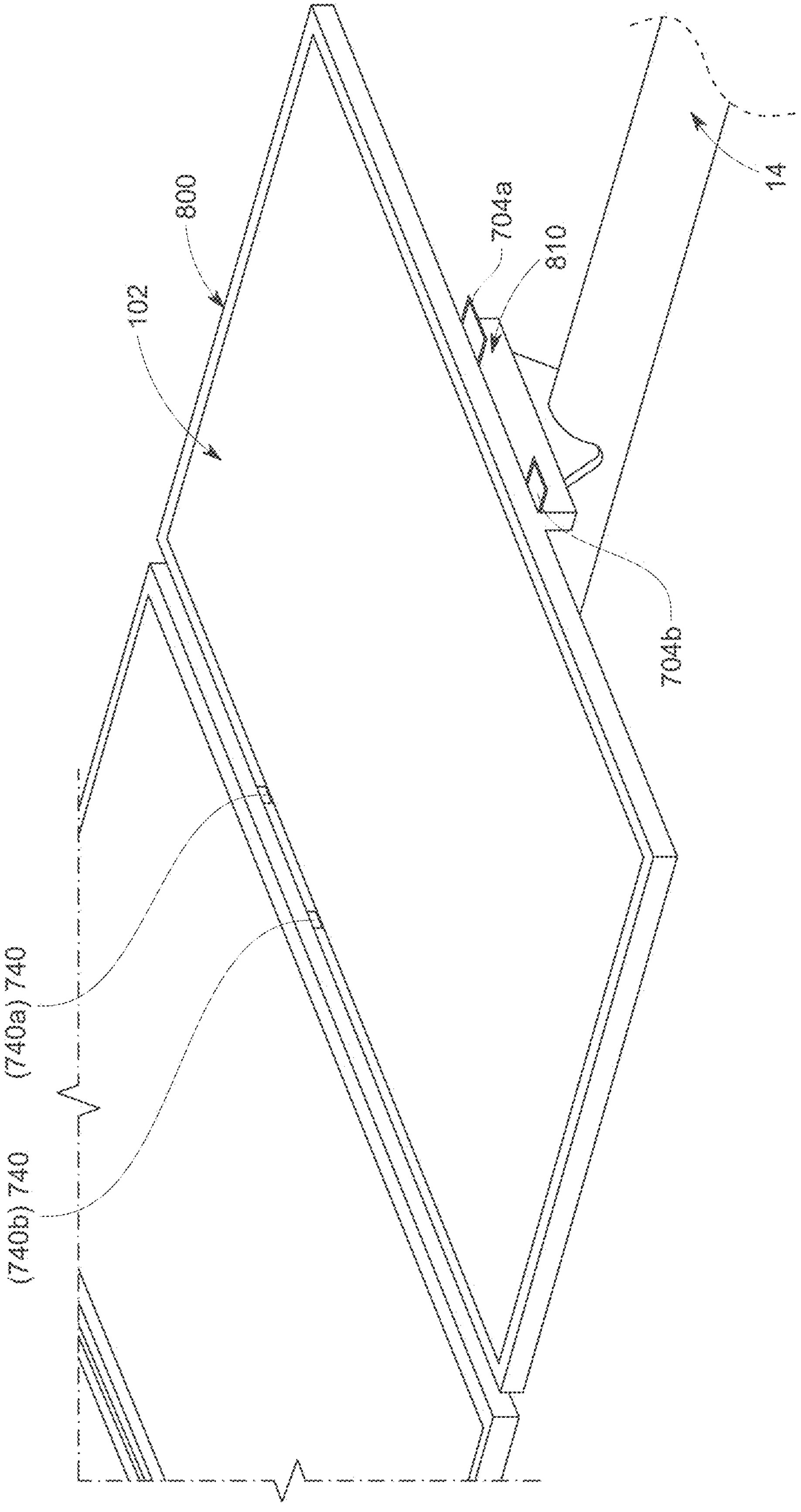

FIGS. 8A-8C illustrate a further exemplary embodiment of a solar module frame 800. The solar module frame 800 can include an integrated upper rail 810 for coupling the solar module frame 800 to the torque tube 14, for instance via a lower rail 811 that is secured to the torque tube 14. FIG. 8A shows a perspective of the solar module frame 800, FIG. 8B shows a perspective view of lower rails 811 coupled to the torque tube 14, and FIG. 8C shows a perspective view of multiple solar module frames 800 coupled to the lower rails 811 at the torque tube 14 using the integrated upper rail 810 at each of the solar module frames 800. In some embodiments, the solar module frame 800 can be similar to, or the same as, the solar module frame 700 disclosed elsewhere in this disclosure except that the solar module frame 800 can include a portion, but not all of, the integrated rail 710 of the solar module frame 700 such that the solar module frame 800 has a portion (integrated upper rail 810) of the integrated rail 710 of the solar module frame 700 integrated at the solar module frame 800 and a portion of the integrated rail 710 of the solar module frame 700 (lower rail 811) formed as a separate component independently installed at the torque tube 14.

The solar module frame 800 can have a top side 801, a bottom side 802, and longitudinal sides 803 extending between the top and bottom sides 801, 802. The top side 801 of the frame 800 can bound photovoltaic cells 102 (e.g., photovoltaic cells included at a silicon laminate) and the bottom side 802 of the frame 800 can be configured to face the torque tube 14. In addition, to help facilitate coupling of the solar module frame 800 to the torque tube 14, each solar module frame 800 can include integrated upper rail 810 and one or more slots 740. The integrated upper rail 810 can be at a first side of the solar module frame 800 and the one or more slots 740 can be at a second, opposite side of the solar module frame 800.

The integrated upper rail 810 can include one or more coupling flanges 704, and the one or more coupling flanges 804 at the integrated upper rail 810 can be configured to couple one solar module frame to another, adjacent solar module frame at the torque tube 14. The illustrated embodiment of the solar module frame 800 shows the integrated upper rail 810 as including two coupling flanges 704*a*, 704*b*. More specifically, in addition to the one or more coupling flanges 704, the integrated upper rail 810 can include one or more sidewalls, such as first sidewall 727, the second sidewall 729, and the third sidewall 731. The third sidewall 731 of the illustrated embodiment can form a lower rail contact surface at the solar module frame 800 such that the third sidewall 731 is configured to contact and sit at the lower rail 811 which is coupled to the torque tube 14. As disclosed previously, the one or more coupling flanges 704 can extend out from the second sidewall 729, such as in a direction parallel to the central longitudinal axis of the torque tube 14 and toward slots 740 of an adjacent solar module to be positioned at, and coupled to, the torque tube 14.

The noted configuration of the solar module frame 800 including the integrated upper rail 810 and one or more slots 740 can help to increase the efficiency associated with installing solar module frames at a torque tube in the field. One example installation process associated with solar modules frames 800 will be described to illustrate the noted efficiencies. One or more lower rails 811, including a first lower rail 811, can be installed at the torque tube 14, such as by securing one or more lower rails 811 to the torque tube 14 using a strap around the torque tube 14, a blind rivet, a weld, or other appropriate securing means. Then, a first solar module frame 800 can be coupled to the torque tube 14, for instance, by securing the integrated upper rail 810 of the first solar module frame 800 to the first lower rail 811 at the torque tube 14, for instance, such that the third sidewall 731 is placed at the lower rail 811 at the torque tube 14 (e.g., with the third sidewall 731 contacting an upper landing surface defined at the first lower rail 811). The integrated upper rail 810 of the first solar module frame 800 can be secured to the first lower rail 811 at the torque tube 14, for instance, using a suitable fastening mechanism, such as a blind rivet, a bobtail fastener, nut a blot, clinch joint, weld joint, or other appropriate securing means. Then, a second solar module frame 800, placed at, or near, the torque tube 14, can be moved relative to the torque tube 14 toward the first solar module frame 800. The second solar module frame 800 can be moved (e.g., slid) as such toward the first solar module frame 800 until the one or more slots 740 at the second solar module frame 800 engage with (e.g., are inserted within) the corresponding one or more coupling flanges 704*a*, 704*b* at the integrated upper rail 810 of the first solar module frame 800. With the coupling flange(s) 704*a*, 704*b* of the first solar module frame 800 engaged with the one or more corresponding slots 740 of the second solar module frame 800 and the integrated upper rail 810 supported at the upper landing surface (e.g., third sidewall 731) defined at the lower rail 811, the lower rail 811, which now acts to support the integrated upper rail 810 at the torque tube 14, the lower rail 811 and the integrated upper rail 810 at the solar module frame 800 can be secured together, using a suitable fastening mechanism, such as a blind rivet, a bobtail fastener, nut a blot, clinch joint, weld joint, or other appropriate securing means. This process can then be repeated to install additional, adjacent solar module frames along the torque tube 14 using the complementary integrated upper rail 810 and slots 740 at interfacing solar module frames 800 along with lower rails 811 placed separately at and along the torque tube 14.

Thus, the solar module frame 800 can be configured to allow the solar module frame 800 to be coupled to the torque tube 14 in a manner that can provide reduced assembly time and cost. For example, in addition to the useful installation-related advantages noted previously with respect to the solar module frame 700, the solar module frame 800 can help to increase shipping efficiencies associated with procuring solar tracking apparatus components on site. This can result, for instance, from the better packing density associated with the integrated upper rail 810 and separated lower rail 811 component. Thus, as compared to the integrated rail 710 of the solar module frame 700, the integrated upper rail 810 of the solar module frame 800 can a relatively lesser extent below the bottom side 802 of the solar module frame 800 such that a bottom-most surface of the solar module frame 800 (e.g., at the third sidewall 731) can be closer to the top side 802 of the solar module frame 800 than a bottom-most surface of the solar module frame 700 (e.g., at the third sidewall 731) is to the top side 702 of the solar module frame 700.

FIGS. 9A-9I illustrate an embodiment of a solar module frame coupling assembly 900 having engageable protruded guide structure 901 and alignment slot 902. Protruded guide structure 901 and alignment slot 902 can be complementary and together be configured to guide placement of solar module frame 908 in east-west direction 919 at rail 904. When the protruded guide structure 901 at the frame 908 is at the alignment slot 902 at the rail 904, the solar module frame 908 can be fastened to rail 904. The engageable protruded guide structure 901 and alignment slot 902 can be useful in both providing for east-west direction 919 alignment between frame 908 and rail 904 in an efficient manner that can reduce installation time and reduce a number of fastening connections needing to be made between the frame 908 and the rail 904 once the frame 908 is landed at the rail 904 (e.g., when the protruded guide structure 901 is at the alignment slot 902).

Figure 9A:
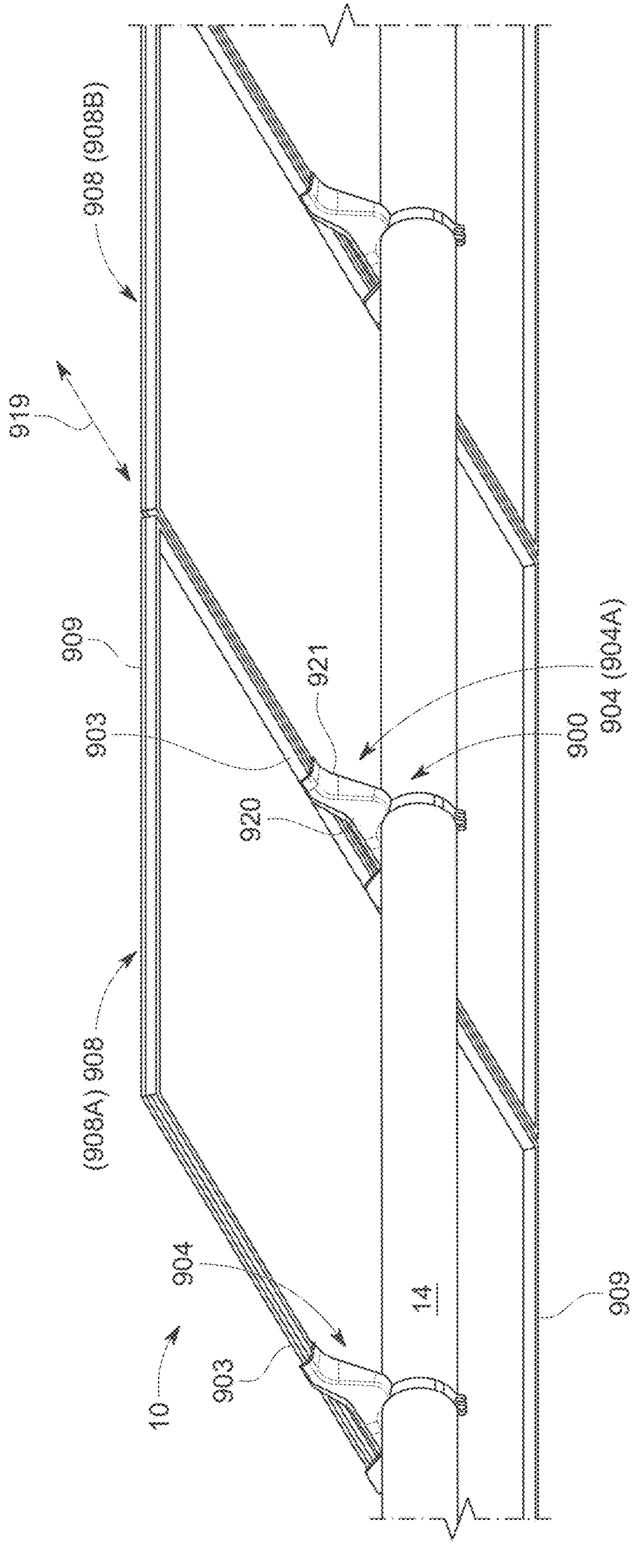
FIGS. 9A-9J illustrate an embodiment of a solar module frame coupling assembly having engageable protruded guide structure(s) and alignment slot(s).
Figure 9B:
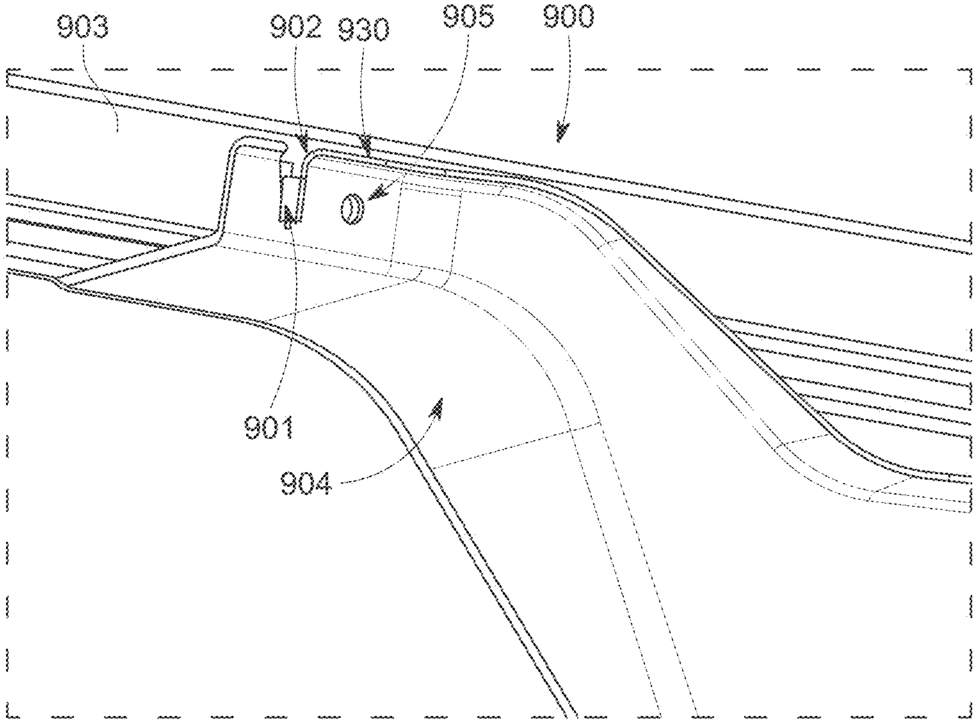

FIG. 9A is a perspective view of solar tracker 10 having the solar module frame coupling assembly 900 fastened to the torque tube 14, and FIG. 9B is a perspective view of protruded guide structure 901, at a solar module frame side portion 903, received at alignment slot 902 at rail 904.

The solar module frame coupling assembly 900 can include at least one solar module frame 908 and at least one rail 904. FIG. 9A shows that one rail 904A can receive each of a first solar module frame 908A and a second solar module frame 908B. In particular, the rail 904A can: (i) receive and engage with the first solar module frame 908A at a first longitudinal side 920 of the rail 904A, and (ii) receive and engage with the second solar module frame 908B at a second, opposite longitudinal side 921 of the rail 904A. As shown at FIG. 9A, this coupling assembly 900 can be placed at locations spaced apart along the torque tube 14 to secure solar module frames 908 to the torque tube 14.

The solar module frame 908 can include frame side portion 903. The frame side portion 903 illustrated here is a longitudinal perimeter portion of the solar module frame 908 (e.g., which is longer than two radial perimeter portions that extend normal to the longitudinal perimeter portion of the solar module frame 908). Thus, solar module frame 908 can be rectangular and include two, longer longitudinal frame side portions 903 and two, shorter radial frame side portions 909.

As seen at the example of FIG. 9B, one or both of the frame side portions 903 of the solar module frame 908 can include protruded guide structure 901. Protruded guide structure 901 can be configured to engage with alignment slot 902 at rail 904. For example, when relative movement is imparted between solar module frame 908, having protruded guide structure 901 at frame side portion 903, and rail 904, the protruded guide structure 901 can be moved into engagement with the alignment slot 902 at the rail 904. As one specific such example, solar module frame 908 can be moved in east-west direction 919 relative to torque tube 14 and rail 904 at torque tube 14, to cause the protruded guide structure 901 at the frame side portion 903 to engage with the alignment slot 902 at the rail 904. As the alignment slot 902 receives and engages the protruded guide structure 901, solar module frame 908 can be coupled to the rail 904 which itself can be coupled to the torque tube 14. Such relative movement can be imparted between the rail 904 and another solar module frame 908 to engage a protruded guide structure at that frame to another, opposite longitudinal side of the rail 904.

Figure 9C:
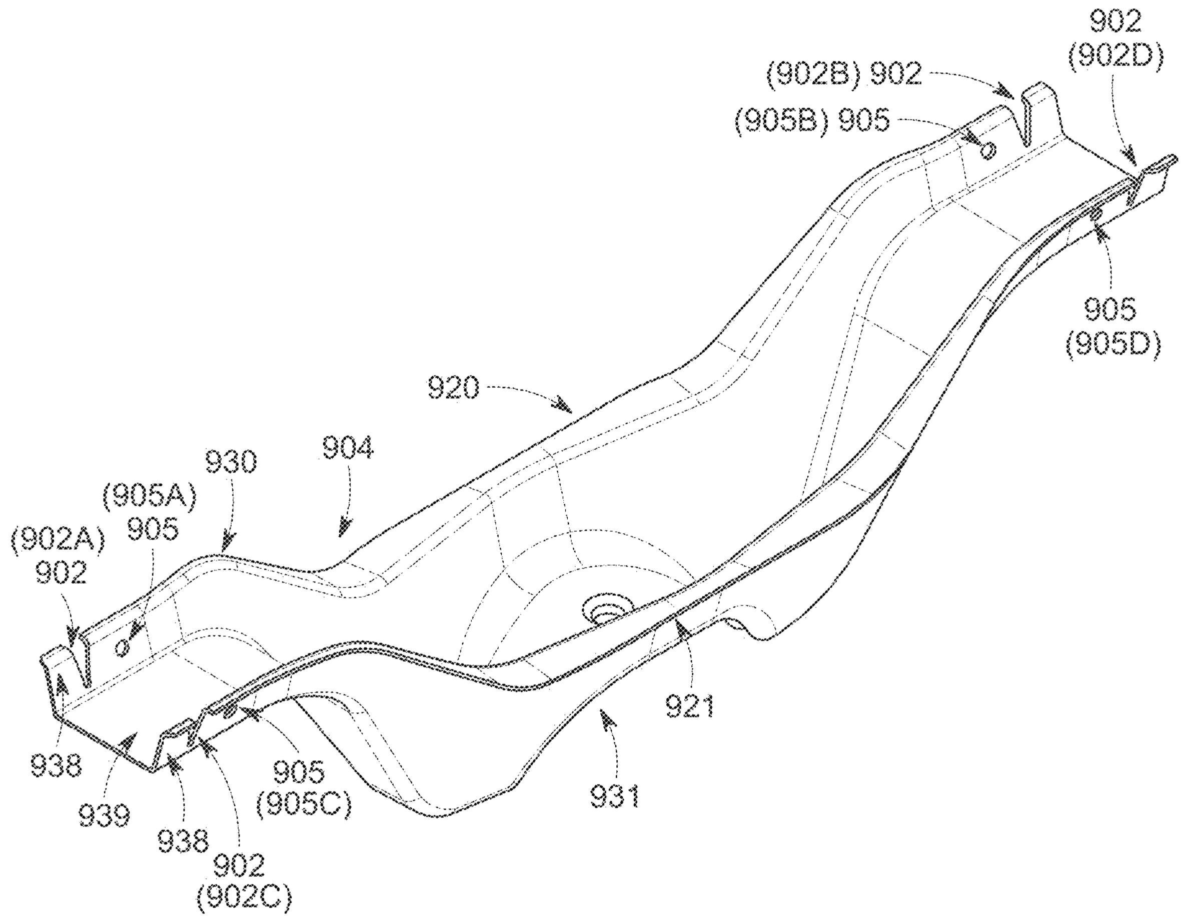
Figure 9D:
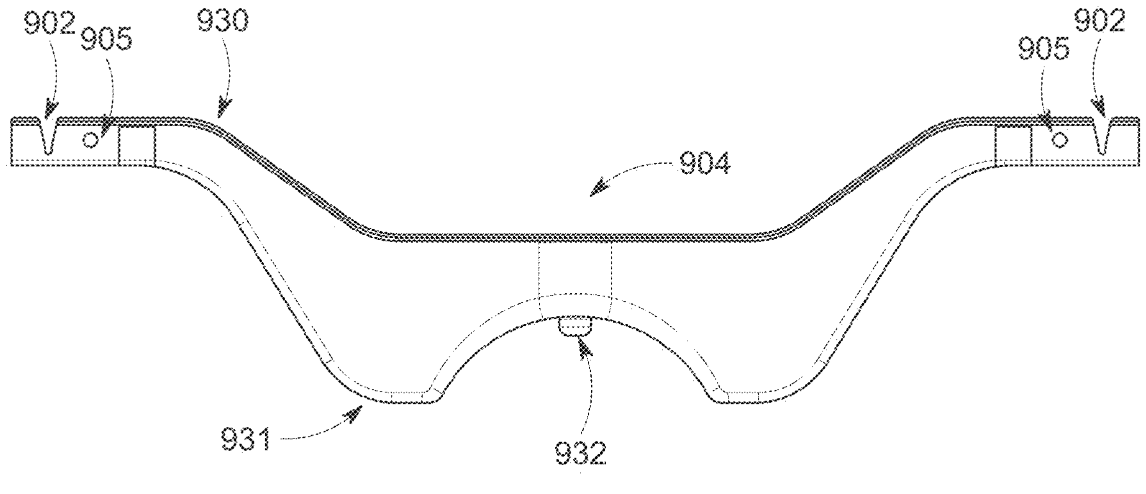
Figure 9E:
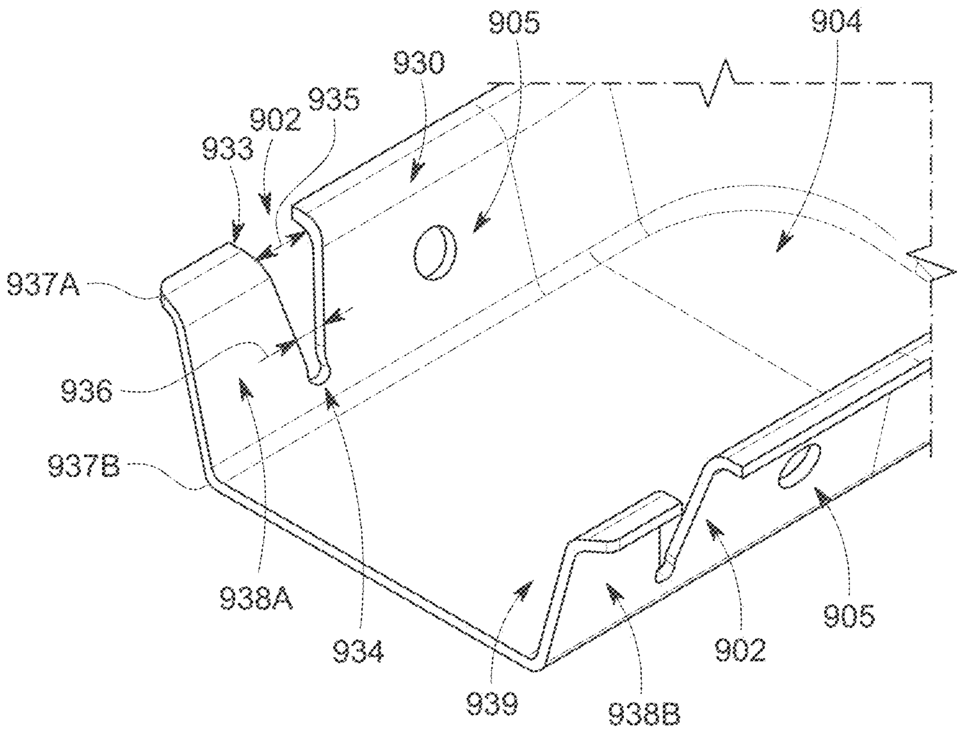

FIGS. 9C and 9D are, respectively, perspective and elevational views of the rail 904 in isolation, and FIG. 9E is a close-up, perspective view of the alignment slot 902 at the rail 904 and adjacent rail coupling aperture 905.

The rail 904 can include a first rail side 930 and a second rail side 931 that is opposite the first rail side 930. For example, the orientation illustrated here can have the first rail side 930 as a top side of the rail 904 and the second rail side 931 as a bottom side of the rail 904. The second rail side 931 can configured to interface with torque tube 14, and the first rail side 930 can include the alignment slot 902. For example, as illustrated here, the second rail side 931 can include a torque tube interface portion 932 that is configured to sit at torque tube 14. The alignment slot 902 can be configured to receive the protruded guide structure 901 at the solar module frame 908 to couple the solar module frame 908 to the rail 904.

The illustrated embodiment of the rail 904 here includes alignment slots at each of the first longitudinal side 920 and the second longitudinal side 921. For example, first longitudinal side 920 of rail 904 can include first and second alignment slots 904 spaced apart from one another along the first longitudinal side 920 of rail 904, and second longitudinal side 921 of rail 904 can include third and fourth alignment slots 904 spaced apart from one another along the second longitudinal side 921. First longitudinal side 920 can extend between the first rail side 930 and the second rail side 931, and second longitudinal side 921 can extend between the first rail side 920 and the second rail side 931 opposite the first longitudinal side 920. For instance, alignment slot 904 at first longitudinal side 920 and alignment slot 904 at second longitudinal side 921 can both be at one side of the torque tube interface 932 and be axially aligned across the rail at that side of the torque tube interface 932. Likewise, alignment slot 904 at first longitudinal side 920 and alignment slot 904 at second longitudinal side 921 can both be at another, opposite side of the torque tube interface 932 and be axially aligned across the rail at that opposite side of the torque tube interface 932. Thus, the rail 904 can include pairs of alignment slots at each of opposite sides of the torque tube interface, with each of the pairs of alignment slots being axially aligned with one another across the first rail side 930. As noted, each alignment slot 902 at the rail 904 can be configured to receive a respective protruded guide structure 901 at a solar module frame 908.

The rail 904 can further include one or more rail coupling apertures 905. For example, the rail 904 as illustrated here includes a first rail coupling aperture 905A adjacent to a first alignment slot 902A and a second rail coupling aperture 905B adjacent to a second alignment slot 902B. Rail 904 as illustrated here also includes a third rail coupling aperture 905C adjacent to a third alignment slot 902C and a fourth rail coupling aperture 905D adjacent to a fourth alignment slot 902D. Each of the first rail coupling aperture 905A, first alignment slot 902A, the second rail coupling aperture 905B, and the second alignment slot 902B can be at the first longitudinal side 920 with the adjacent first rail coupling aperture 905A and first alignment slot 902A spaced apart from the adjacent second rail coupling aperture 905B and the second alignment slot 902B. And each of the third rail coupling aperture 905C, third alignment slot 902C, the fourth rail coupling aperture 905D, and the fourth alignment slot 902D can be at the second longitudinal side 921 with the adjacent third rail coupling aperture 905C and third alignment slot 902C spaced apart from the adjacent fourth rail coupling aperture 905D and the fourth alignment slot 902D. Just as the alignment slots 902A and 902C at opposite sides of the rail 904 can be axially aligned, so too can the rail coupling aperture 905A and 905C, at opposite side of the rail 904, be axially aligned. Likewise, just as the alignment slots 902B and 902D at opposite sides of the rail 904 can be axially aligned, so too can the rail coupling aperture 905B and 905D, at opposite side of the rail 904, be axially aligned.

As illustrated for the example of the rail 904 shown here, alignment slot 902 can include an open inlet end 933 and a closed terminal end 934. The closed terminal end 934 can be at an opposite end of the alignment slot 902 from the open inlet end 933. The open inlet end 933 can have a greater diameter 935 than a diameter 936 at the closed terminal end 934. For example, as illustrated at FIG. 9E, the alignment slot 902 can taper (e.g., taper continuously) in diameter from diameter 935 at the open inlet end 933 to the diameter 936 at the closed terminal end 934. This tapering diameter at the alignment slot 902 can be useful in first receiving the protruded guide structure 901 at the open inlet end 933, with a relatively larger diameter, and then, upon further relative movement between the frame 908 and the rail 904, receiving the protruded guide structure 901 at or near the closed terminal end 934 where the protruded guide structure 901 can sit (e.g., as shown at FIG. 9B).

For some embodiments, the rail 904 can include one or more guiding sidewalls 938. For example, as shown for the illustrated embodiment of the rail 904, the rail 904 can include first guiding sidewall 938A at the side 930 and extending along at least a portion of the longitudinal side 920 and second guiding sidewall 938B at the side 930 and extending along at least a portion of the longitudinal side 921. The alignment slots 902A and 902B and the rail coupling apertures 905A and 905B can be at the first guiding sidewall 938A, and the alignment slots 902C and 902D and the rail coupling apertures 905C and 905D can be at the second guiding sidewall 938B. The rail 904 can define a channel 939 between the first and second guiding sidewalls 938A, 938B at the side 930. To help guide placement of a given frame 908 at the rail 904 (e.g., to help guide placement of a given protruded guide structure 901 at frame 908 at a corresponding alignment slot 902 at the rail 904), the respective guiding sidewall 938A, 938B can angle inward toward the channel 939 in a direction from a distal guiding sidewall end 937A toward a proximal guiding sidewall end 937B that is at the channel 939. Thus, frame side portion 903 can first be brought to interface with the distal guiding sidewall end 937A and then guided along the guiding sidewall 938A to bring the frame side portion 903 closer to the channel 939 as the protruded guide structure 901 of the frame 908 is moved along the alignment slot 902 toward the closed terminal end 934 of the alignment slot 902. Accordingly, the alignment slot 902 defined at the guiding sidewall 938 can likewise angle inward toward the channel 939 in a direction from the open inlet end 933 toward the closed terminal end 934.

Figure 9F:
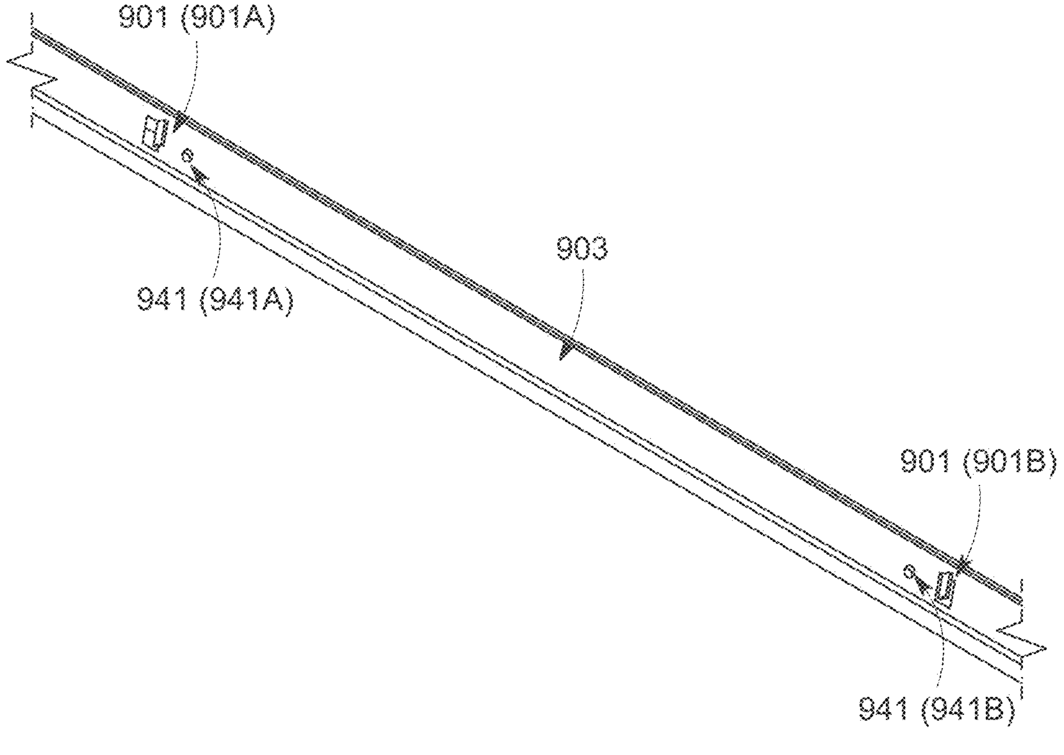
Figure 9G:
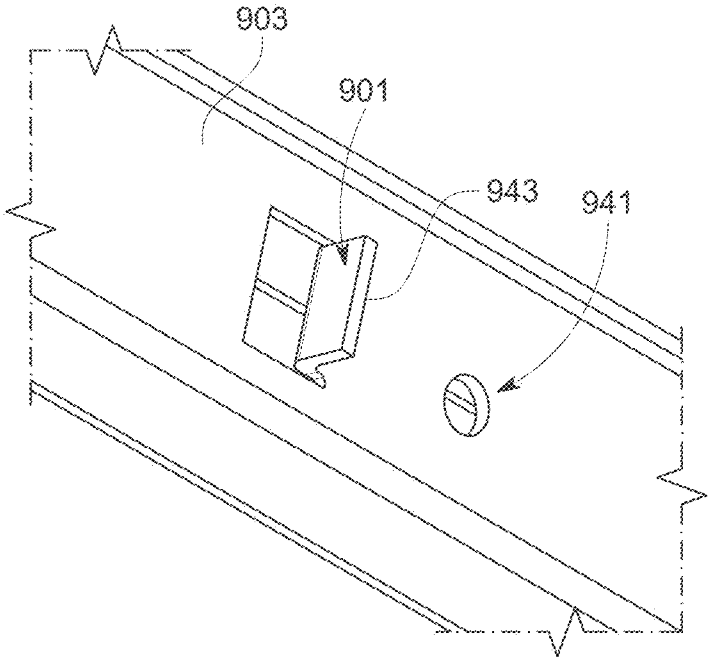
Figure 9H:
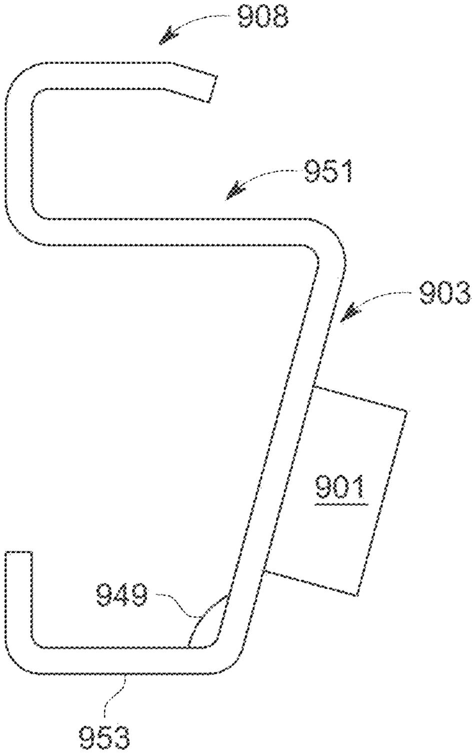

FIG. 9F is a perspective view of the solar module frame side portion 903 having the protruded guide structure 901, FIG. 9G is a close-up, perspective view of the protruded guide structure 901 at the solar module frame side portion 903, and FIG. 9H is an elevational view of a side profile of the solar module frame side portion 903 having the protruded guide structure 901.

As illustrated at FIG. 9F, the frame side portion 903 can include a pair of protruded guide structures 901, with a first protruded guide structure 901A of the pair spaced apart along the length of the frame side portion 903 from a second protruded guide structure 901B. In addition, the first frame side portion 903 can include a pair of frame coupling apertures 941, with a first frame coupling aperture 941A of the pair spaced apart along the length of the frame side portion 903 from a second frame coupling aperture 941B. The first protruded guide structure 901A can be adjacent to the first frame coupling aperture 941A, and the second protruded guide structure 901B can be adjacent to the second frame coupling aperture 941B.

The illustrated exemplary embodiment here shows the protruded guide structure 901 as including a locating tab 943. This locating tab 943 can extend out from the frame side portion 903. For the illustrated embodiment, such as shown at FIG. 9G, the locating tab 943 protruded outward from the frame side portion 903 at a generally perpendicular orientation to the frame side portion 903. For example, the locating tab 943 can be folded portion of the frame side portion 903 that extends out from the frame side portion 903 at the folded interface between the locating tab 943 and the base frame side portion 903. The locating tab 943 can be so formed by folding the locating tab at the folded interface in a direction toward the adjacent frame coupling aperture 941.

FIG. 9H shows a side profile of the frame 908 including the frame side portion 903. As noted, the frame 908 can include the frame side portion 903 having the protruded guide structure 901. As shown here, for embodiments where the rail 904 includes angled guiding sidewalls 938, frame side portion 903 can likewise be angled at angle 949 complementary to the angle of the guiding sidewalls 938 at the rail 904 (e.g., frame side portion 903 can be angled at angle 949 toward the alignment slot 902 at the interfacing guiding sidewall 938). For instance, where the guiding sidewalls 938 at the rail 904 taper inward toward the channel 939 moving along the guiding sidewalls 938 toward the channel 939, frame side portion 903 can have a corresponding angular orientation via angle 949 to generally flushly move the frame side portion 903 along the respective guiding sidewall 938 at the rail 904. In addition to the frame side portion 903, the frame 908 can include photovoltaic laminate receptacle 951 and base portion 953 opposite the receptacle 951. Thus, frame side portion 903 can be located between the receptacle 951 and the base portion 953, and frame side portion 903 can be at angle 949 relative to base portion 953 (e.g., angle 949 ranging from greater than ninety degrees to less than one hundred and eighty degrees, such as ranging from greater than ninety degrees up to one hundred and twenty degrees).

Figure 9I:
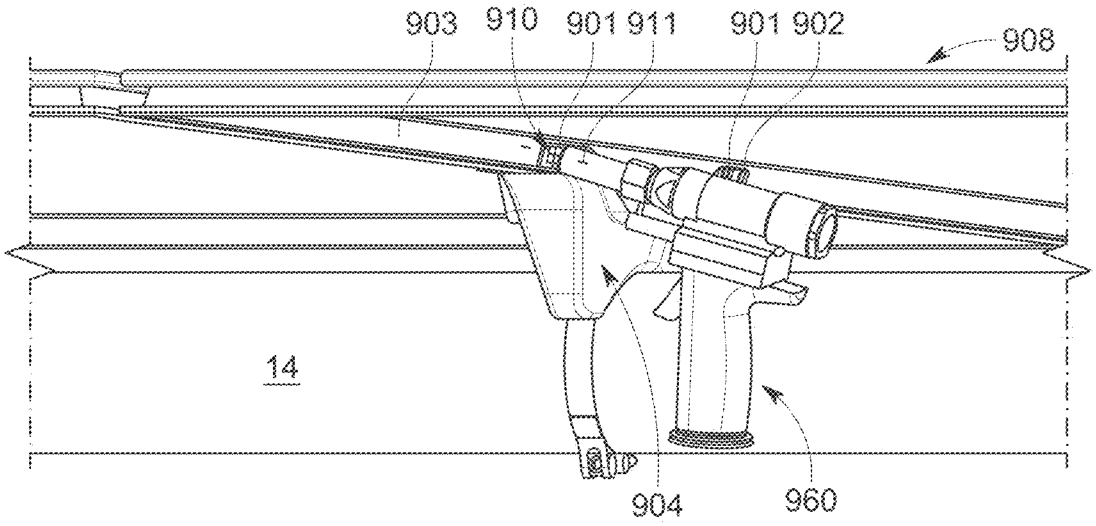

FIG. 9I is a perspective view of a fastening member 910 being placed through the solar module frame side portion 903 and the rail 904 along a fastening axis 911 that is generally perpendicular to the solar module frame side portion 903. As one example, the fastening member 910 can be a blind rivet that is set in place at the frame side portion 903 and the rail 904 using a rivet setting tool 960 that be placed underneath the solar module frame 908 and used to set the blind rivet along the fastening axis 911.

When the protruded guide structure 901 is engaged at the alignment slot 902, fastening member 910 can be placed through frame side portion 903 and the rail 904 to fasten the solar module frame 908 to the rail 904. Namely, when the protruded guide structure 901 is engaged at the alignment slot 902, frame coupling aperture 941 can be axially aligned with the rail coupling aperture 905 adjacent to the engaged protruded guide structure 901 and alignment slot 902. Thus, fastening member 910 can be inserted to extend through the aligned frame coupling aperture 941 and rail coupling aperture 905. For example, as seen at the example at FIG. 9I, the fastening member 910 can be placed through frame side portion 903 and the rail 904 along fastening axis 911 that is perpendicular to the frame side portion 903. For some embodiments, a second fastening member can similarly be inserted to extend through the other of the pair of aligned frame coupling aperture 941 and rail coupling aperture 905 adjacent to the other of the pair of protruded guide structures at that same longitudinal side of the rail 904.

Figure 9J:
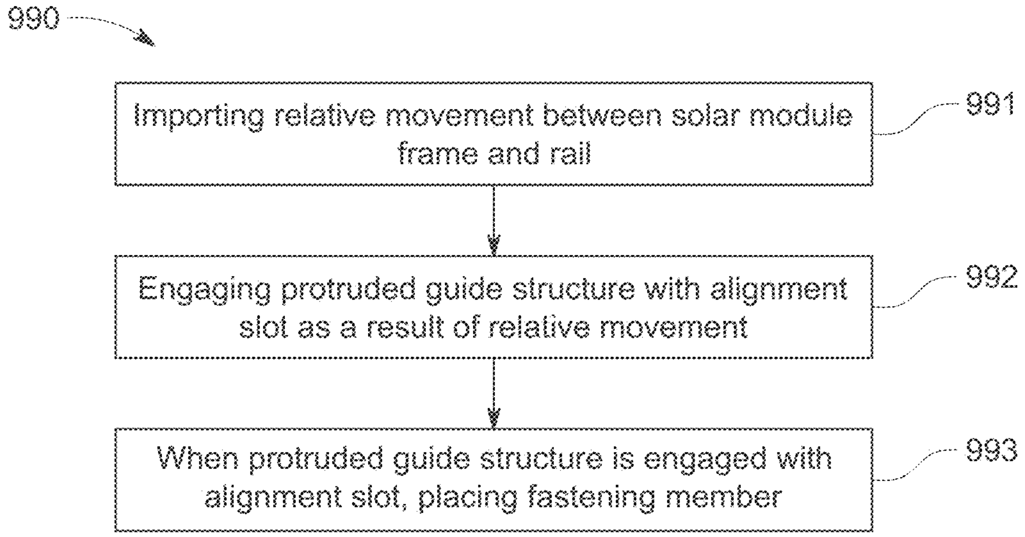

FIG. 9J illustrates a flow diagram of a method 990 for coupling at least one solar module frame to a rail at a solar tracker. For some examples of the method 990, any one or more (e.g., each) of the features of the solar module frame coupling assembly 900 disclosed previously herein can be utilized.

At step 991, the method 990 includes imparting relative movement between a first solar module frame and a rail. The first solar module frame includes a frame side portion that includes a protruded guide structure. The rail includes a first rail side interfacing with a torque tube of the solar tracker and a second rail side that is opposite the first rail side, where the second rail side includes an alignment slot. As one example, imparting relative movement between the first solar module frame and the rail can include moving the first solar module frame relative to the rail, such as sliding the first solar module frame relative to (e.g., along) the rail in an east-west direction.

At step 992, as a result of imparting relative movement at step 991 (e.g., in the cast-west direction) between the first solar module frame and the rail, the method 990 can include engaging the protruded guide structure at the frame side portion with the alignment slot at the second rail side. For example, the first solar module frame can be slid relative to the rail at step 991 until the protruded guide structure at the first solar module frame engages a complementary alignment slot at the rail. In some embodiments, this can include sliding the protruded guide structure at the frame side portion relative to the alignment slot at a guiding sidewall of the rail such that the protruded guide structure moves from an open inlet end of the alignment slot toward a closed terminal end of the alignment slot as angled frame side portion slides along the rail's corresponding angled guiding sidewall.

At step 993, when the protruded guide structure is engaged at the alignment slot at step 992, the method 990 can include placing a fastening member through frame side portion and the rail to fasten the first solar module frame to the rail (e.g., as shown at FIG. 9I). For example, as shown at the example of FIG. 9I, the fastening member can be placed through both the frame side portion and the rail along a fastening axis that is perpendicular to the frame side portion.

FIGS. 10A-10M illustrate another embodiment of a solar module frame coupling assembly 1000 having engageable protruded guide structure(s) 1001 and alignment slot(s) 1002. Specifically, FIGS. 10A-10L illustrate the solar module frame coupling assembly 1000, and FIG. 10M illustrates a flow diagram of an embodiment of a method 1090 for coupling a pair of solar module frames to a rail of a solar tracker.

Figure 10A:
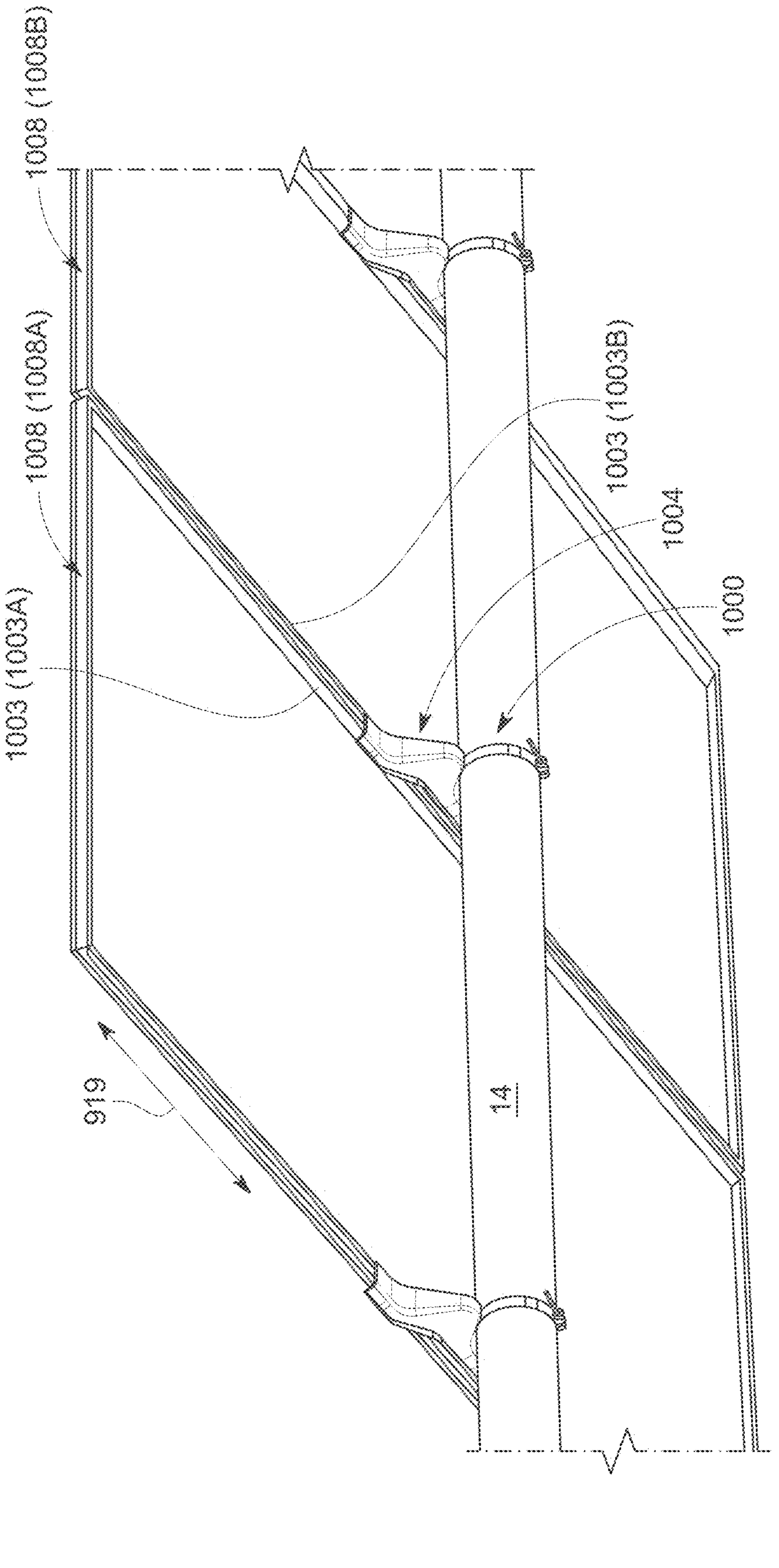
FIGS. 10A-10M illustrate another embodiment of a solar module frame coupling assembly having engageable protruded guide structure(s) and alignment slot(s).
Figure 10B:
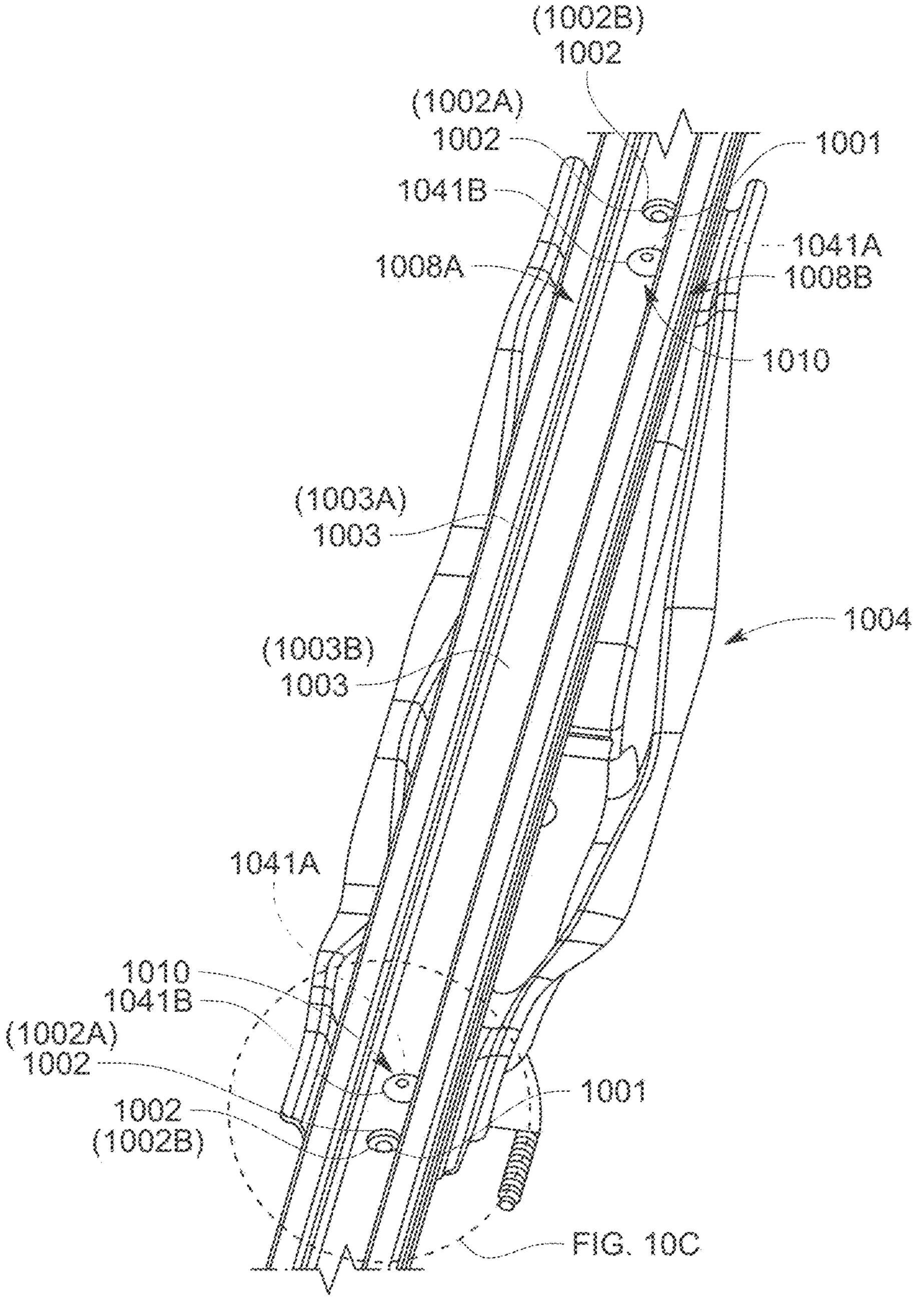
Figure 10C:
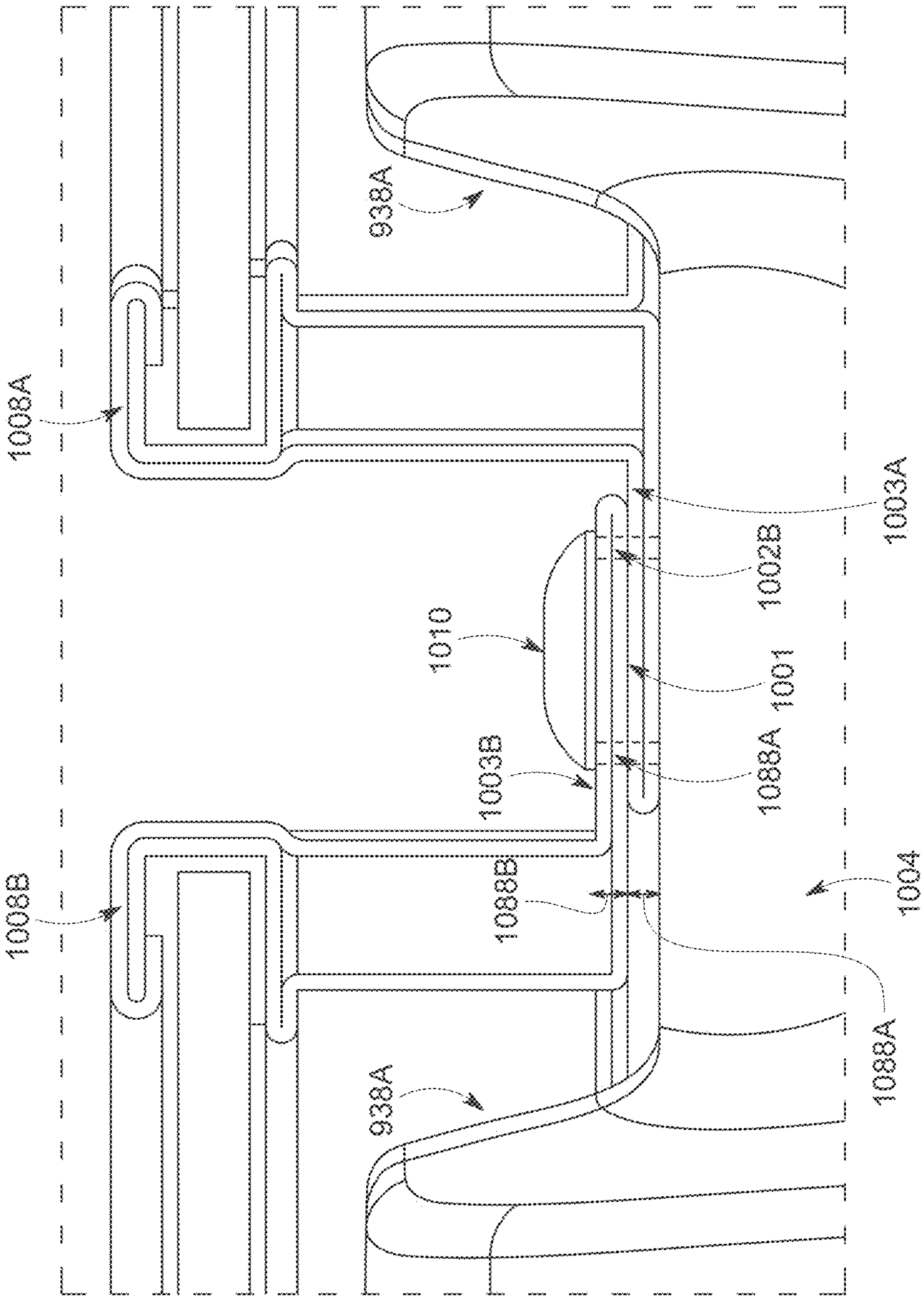

Referring to FIGS. 10A-10C, a perspective view of the solar module frame coupling assembly 1000 is illustrated at torque tube 14 of solar tracker 10. More specifically, FIG. 10A shows a perspective view of the solar module frame coupling assembly 1000 at the torque tube 14, FIG. 10B shows a close-up perspective view of two overlaid frame side portions 1003 at protruded guide structures 1001, and FIG. 10C shows a close-up elevational view of the indicated region at FIG. 10B showing the two overlaid frame side portions 1003 at a common protruded guide structure 1001 at a rail 1004.

The solar module frame coupling assembly 1000 can include at least one rail 1004 and at least one solar module frame 1008. For example, the solar module frame coupling assembly 1000 can include a pair of solar module frames that includes first solar module frame 1008A and second solar module frame 1008B along with rail 1004. The pair of solar module frames 1008A, 1008B can be coupled to the same rail 1004 to thereby help to secure the pair of solar module frames 1008A, 1008B to the torque tube 14 via the common rail 1004.

Each solar module frame 1008 can include a frame side portion 1003. For example, first solar module frame 1008A can include first frame side portion 1003A and second solar module frame 1008B can include second frame side portion 1003B. As shown for the exemplary embodiment here, the frame side portion 1003 can be a radial flange that extends radially outward from the solar module frame 1008. For instance, first frame side portion 1003A at first solar module frame 1008A can extend radially outward from a side of the first solar module frame 1008A in a direction toward the rail 1004, and second frame side portion 1003B at second solar module frame 1008B can extend radially outward from a side of the second solar module frame 1008B in a direction toward the rail 1004. As a result, when the first and second solar module frames 1008A, 1008B are placed at the rail 1004, the first and second frame side portions 1003A, 1003B can overlay one another, such as seen at FIGS. 10B and 10C. More specifically, the first and second solar module frames 1008A, 1008B can be placed one after the other at the protruded guide structure 1001 at the rail 1004 such that the first and second frame side portions 1003A, 1003B: (i) both engage the protruded guide structure 1001 at the rail 1004 and (ii) overlay one another at the protruded guide structure 1001 at the rail 1004.

The frame side portion 1003 can include at least one alignment slot 1002. The alignment slot 1002 can be configured to receive the protruded guide structure 1001 to couple the respective solar module frame 1008 to the rail 1004. For example, each of the frames 1008A, 1008B can include, at the respective frame side portions 1003A, 1003B, a pair of alignment slots 1002. As shown here, first frame 1008A can include a pair of alignment slots 1002A and second frame 1008B can include a pair of alignment slots 1002B. The alignment slots 1002A and 1002B of each of the respective pairs can be spaced apart from one other along the respective radial flange at the respective frame side portion 1003. For example, as seen at FIGS. 10B and 10C, when first and second solar module frames 1008A, 1008B are placed one after the other at protruded guide structure 1001 at the rail 1004 such that the first and second frame side portions 1003A, 1003B: (i) both engage the protruded guide structure 1001 at the rail 1004 and (ii) overlay one another at the protruded guide structure 1001 at the rail 1004, the pair of alignment slots 1002B at the frame side portion 1003B of the frame 1008B can be overlaid and aligned with the pair of alignment slots 1002A at the frame side portion 1003A of the frame 1008A.

Thus, by imparting relative movement between the solar module frame 1008A and the rail 104 to bring the alignment slots 1002A at the frame side portion 1003A into engagement with respective protruded guide structures 1001 and then by imparting relative movement between the solar module frame 1008B and the rail 104 to bring the alignment slots 1002B at the frame side portion 1003B into engagement with respective protruded guide structures 1001, the alignment slots 1002A at the frame side portion 1003A can be brought into alignment with the alignment slots 1002B at the frame side portion 1003B. This can cause frame coupling aperture 1041B at frame side portion 1003B to be brought into alignment with frame coupling aperture 1041A at frame side portion 1003A, and a fastening member 1010 can be driven through the aligned frame coupling apertures 1041A, 1041B at each of the frame side portions 1003A, 1003B.

Figure 10D:
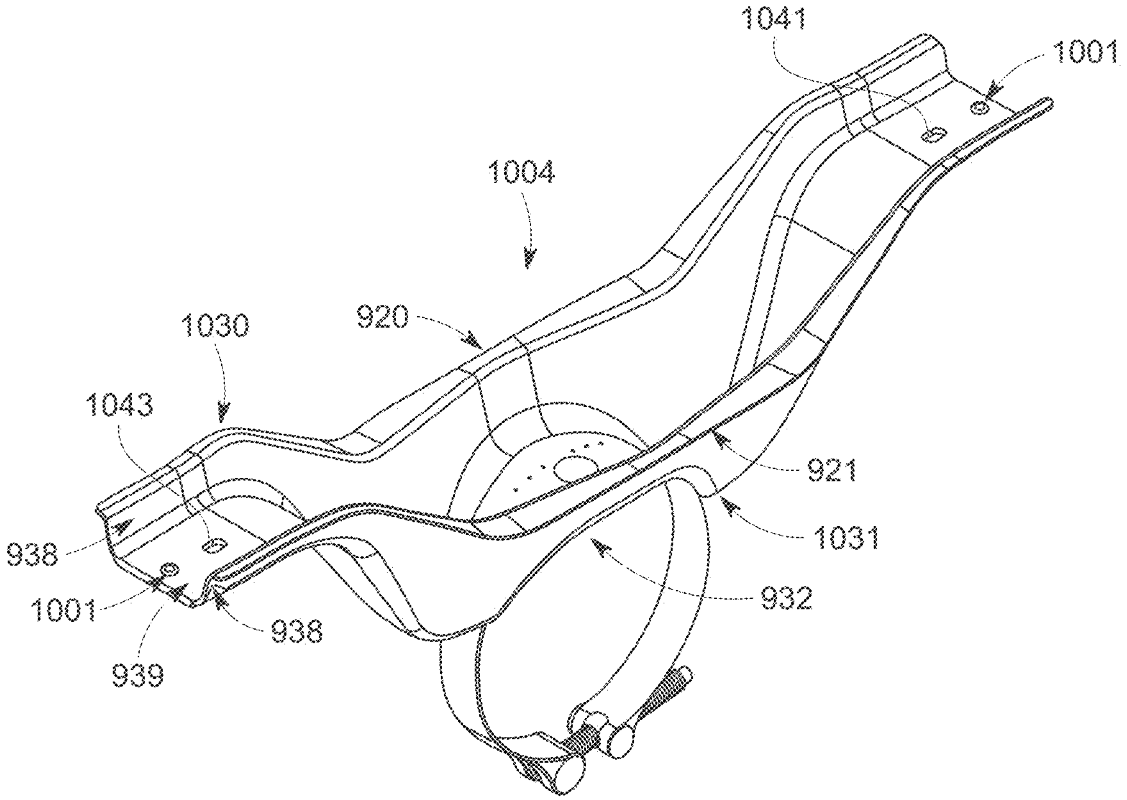
Figure 10E:
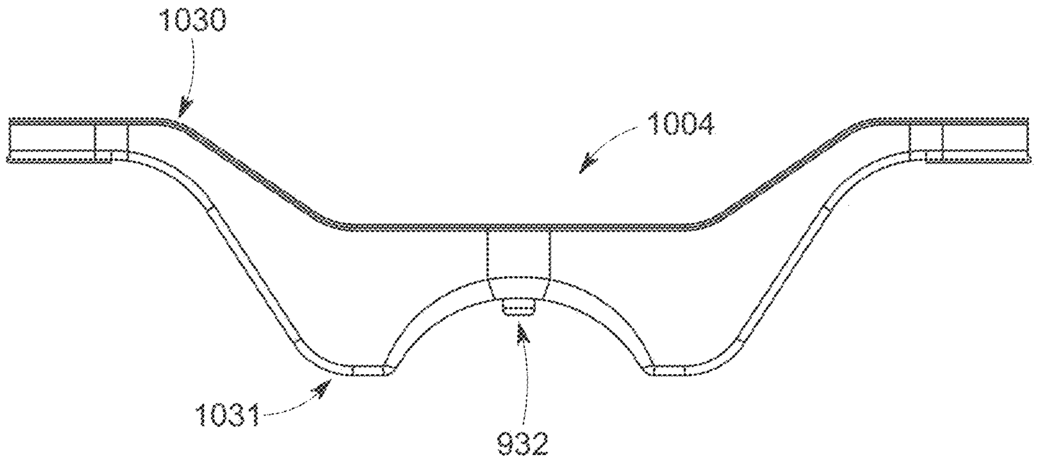
Figure 10F:
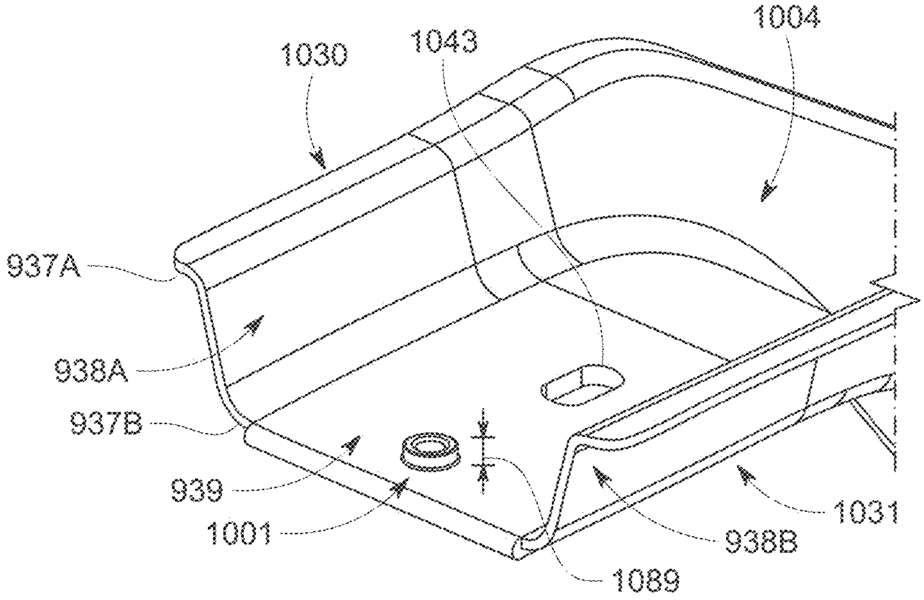

FIGS. 10D-10F are, respectively, perspective, elevational, and close-up perspective views of the rail 1004 in isolation. As noted, the rail 1004 can include one or more protruded guide structures 1001. The illustrated embodiment shows the protruded guide structure 1001 as a protruded structure of a geometry that is configured to be received at complementary geometry defined at the corresponding alignment slot 1002. Though in other embodiments, one or more of the protruded guide structures 1001 can have other geometric configurations that extend outward from channel 939 at rail 1004.

In addition, the rail 1004 can include a first rail side 1030 and a second rail side 1031 that is opposite the first rail side 1030. For example, the orientation illustrated here can have the first rail side 1030 as a top side of the rail 1004 and the second rail side 1031 as a bottom side of the rail 1004. The second rail side 1031 can configured to interface with torque tube 14, and the first rail side 1030 can include the protruded guide structure(s) 1001. For example, as illustrated here, the second rail side 1031 can include torque tube interface portion 932 that is configured to sit at torque tube 14. The protruded guide structure(s) 1001 can be configured to be received at the alignment slot(s) 1002 at one or more frame side portions 1003. For example, the second rail side 1031 of the rail 1004 can include a pair of protruded guide structures 1001 at opposite end portions of the second rail side 1031, and the pair of protruded guide structures 1001 can engage the frame side portion 1003A, at the alignment slots 1002A, and engage the frame side portion 1003B, at the alignment slots 1002B.

For some embodiments, the rail 1004 can include one or more guiding sidewalls 938. For example, as shown for the illustrated embodiment of the rail 1004, the rail 1004 can include first guiding sidewall 938A at side 1030 and extending along at least a portion of longitudinal side 920 and second guiding sidewall 938B at the side 1030 and extending along at least a portion of longitudinal side 921. The rail 1004 can define channel 939 between the first and second guiding sidewalls 938A, 938B at the side 1030. To help guide placement of a given frame 1008 at the rail 1004 (e.g., to help guide placement of a given alignment sot 1002 at frame 1008 at a corresponding protruded guide structure 1001 at the rail 1004), the respective guiding sidewall 938A, 938B can angle inward toward the channel 939 in a direction from distal guiding sidewall end 937A toward proximal guiding sidewall end 937B that is at the channel 939. Thus, frame side portion 1003A can first be brought to interface with the distal guiding sidewall end 937A and then guided along the guiding sidewall 938A to bring the frame side portion 1003A closer to the channel 939 as the alignment slot 1002A of the frame 1008A is moved along the guiding sidewall 938A toward the protruded guide structure 1001 at the channel 939. Thus, guiding sidewall 938A can be configured to bring one frame side portion 1003A closer toward the channel 939 and the protruded guide structure 1001 as the frame side portion 1003A is moved downward along the guiding sidewall 938A toward the torque tube 14, and then guiding sidewall 938B can be configured to bring another frame side portion 1003B closer toward the channel 939 and the protruded guide structure 1001 as that another frame side portion 1003B is moved downward along the guiding sidewall 938B toward the torque tube 14 to land the another frame side portion 1003B overlaid at the first frame side portion 1003A at the protruded guide structure 1001.

The protruded guide structure(s) 1001, the first guiding sidewall 938A, and the second guiding sidewall 938B can each extend outward from a surface of the channel 939 in a same direction. As illustrated here, the protruded guide structure(s) 1001, the first guiding sidewall 938A, and the second guiding sidewall 938B can each extend outward from the surface of the channel 939 in a same direction away from second rail side 1031 and away from torque tube 14. The protruded guide structure(s) 1001 can extend out from the surface of the channel 939 a distance 1089 which can be less than a distance the first and second guiding sidewalls 938A, 938B extend out from the surface of the channel 939. In particular, the protruded guide structure can extend out from the surface of the channel 939 the distance 1089 that is equal to or greater than the sum of a length 1088A of the alignment slot 1002A (shown, e.g., at FIG. 10C) at the frame portion 1003A and a length 1088B of the alignment slot 1002B (shown, e.g., at FIG. 10C) at the frame portion 1003B. For such embodiments where the protruded guide structure extends out from the surface of the channel 939 the distance 1089 that is generally equal to the sum of the length 1088A of the alignment slot 1002A and the length 1088B of the alignment slot 1002B, a distal end of the protruded guide structure 1001 opposite the channel 939 can be generally flush with a distal end at the frame side portion 1003B overlaying the frame side portion 1003A. Yet more specifically, as illustrated here, the protruded guide structure can extend out from the surface of the channel 939 the distance 1089 that is: (i) equal to or greater than the sum of length 1088A of the alignment slot 1002A at the frame portion 1003A and length 1088B of the alignment slot 1002B at the frame portion 1003B, and (ii) less than the distance the first and second guiding sidewalls 938A, 938B extend out from the surface of the channel 939.

FIGS. 10G-J are, respectively, a perspective view of frame side portion 1003 engaged at a pair of protruded guide structures 1001 at the rail 1004, an exploded assembly view of solar module frame 1008 having a pair of frame side portions 1003 and a pair of frame radial portions 1009, an elevational view of one of the frame side portions 1003, and an elevational view of one of the frame radial portions 1009. The frame portions 1003 can form longitudinal side portions of the frame 1008 and the frame radial portions 1009 can form radial end portions of the frame such that assembling together the pair of frame portions 1003 to the pair of frame radial portions 1009 can act to bound photovoltaic cells 1002.

Figure 10G:
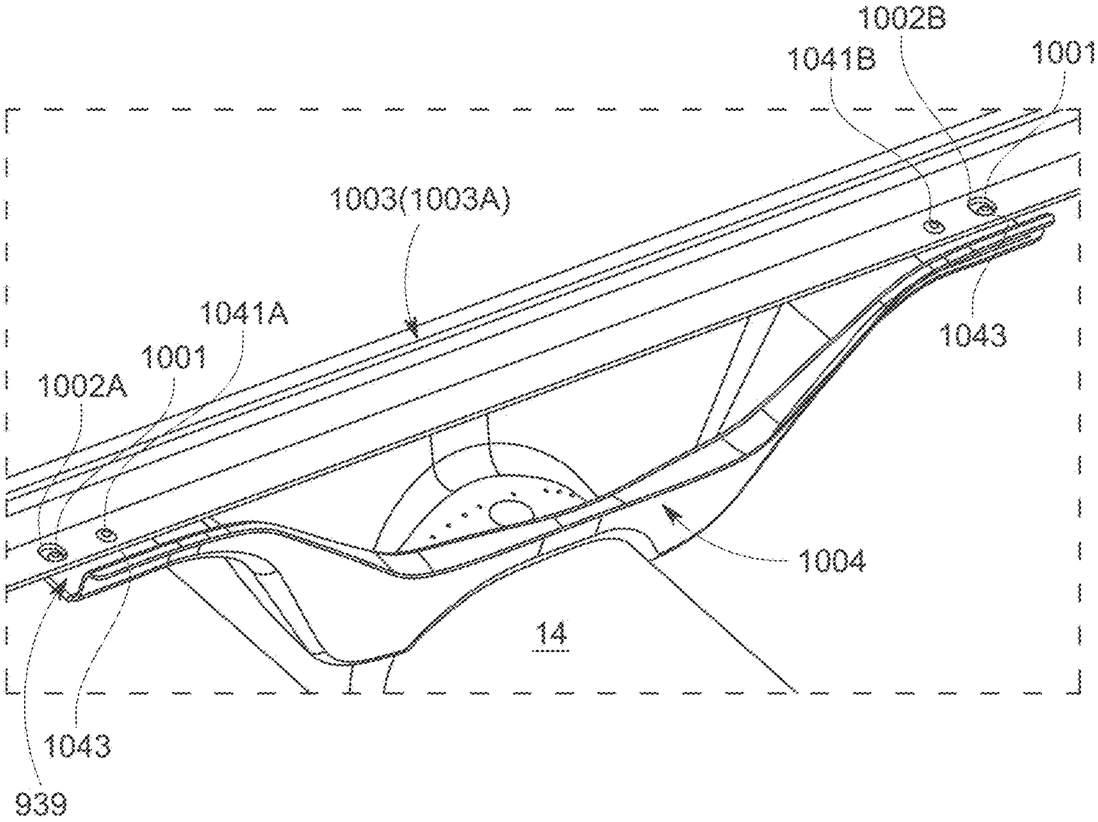
Figure 10H:
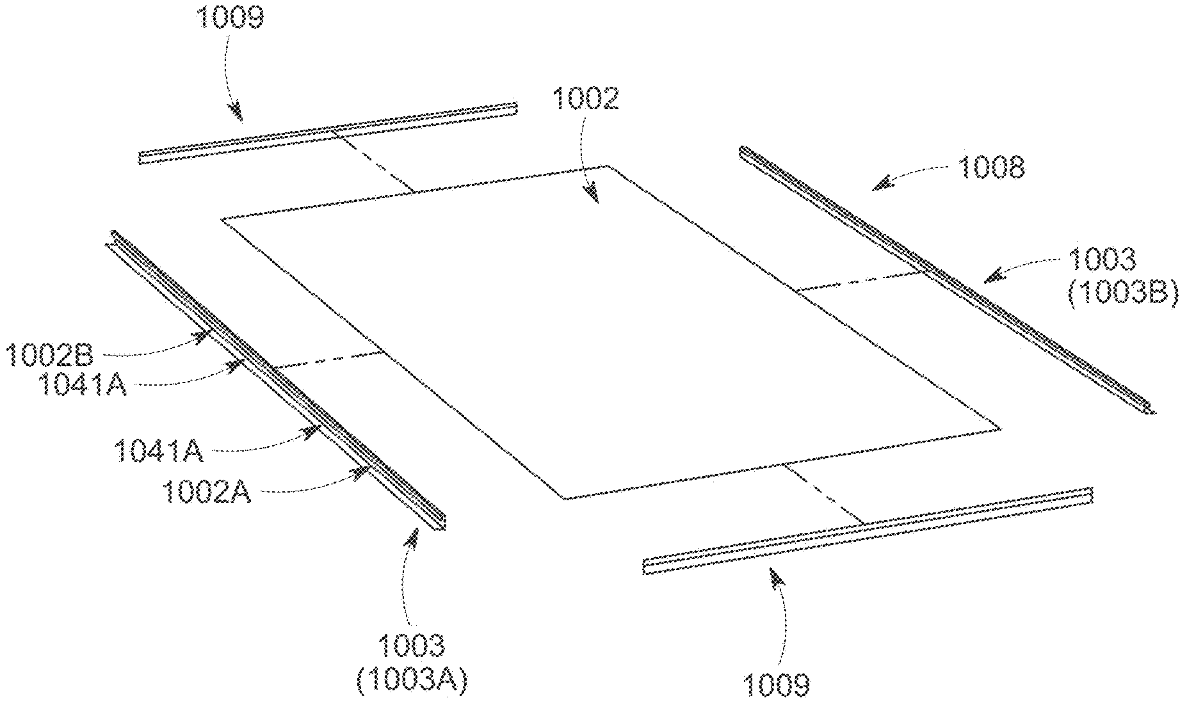
Figure 10I:
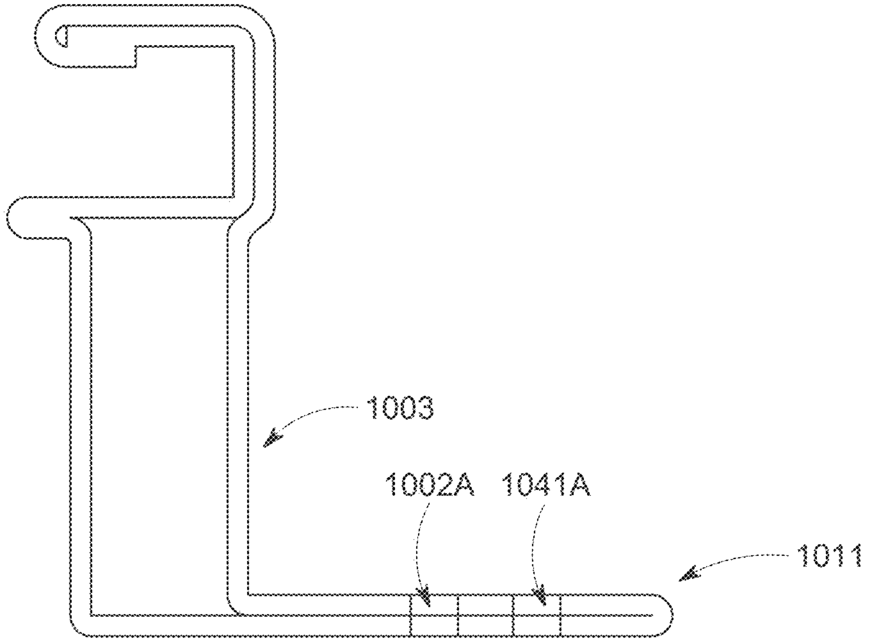
Figure 10J:
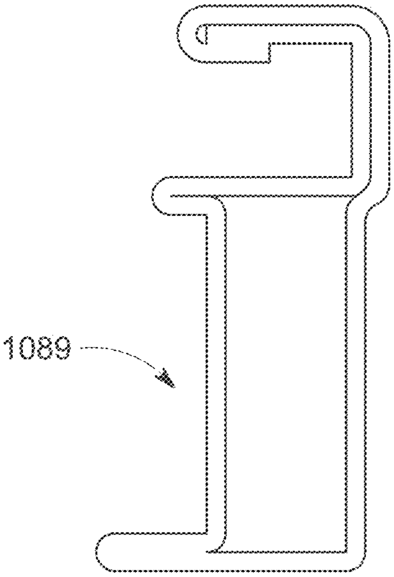

One or both frame side portions 1003 can include one or more alignment slots 1002 and one or more frame coupling apertures 1041. For example, each of the one or more alignment slots 1002 and one or more frame coupling apertures 1041 can be included at radial flange 1011 of the frame side portion 1003. For example, as illustrated at FIG. 101, the radial flange 1011 at the frame side portion 1003 can be formed as a doubled walled flange (e.g., a single material piece folded over to from the doubled walled flange at the radial flange 1011). Rail 1004 can include one or more rail coupling apertures 1043, and when the protruded guide structure 1001 at the rail 1004 is brought into engagement with the corresponding alignment slot 1002, the frame coupling aperture 1041 at the radial flange 1011 can be brought into alignment with a corresponding rail coupling aperture 1043 at the rail 1004, such as seen at FIG. 10G. This can be repeated for a second solar module frame 1008 to overlay such second solar module frame over the other solar module frame already placed at the rail 1004. Namely, when the protruded guide structure 1001 at the rail 1004 is brought into engagement with the corresponding alignment slot 1002 at the second solar module frame, the frame coupling aperture 1041 at the radial flange 1011 of the second solar module frame can be brought into alignment with the same, corresponding rail coupling aperture 1043 at the rail 1004 at which the frame coupling aperture 1041 at the radial flange 1011 of the first solar module frame is aligned. This can then facilitate placement of fastener 1010 though the aligned pairs of frame coupling apertures 1041 of the overlaid radial flanges 1011 and through the co-aligned rail coupling apertures 1043 at rail 1004.

Figure 10K:
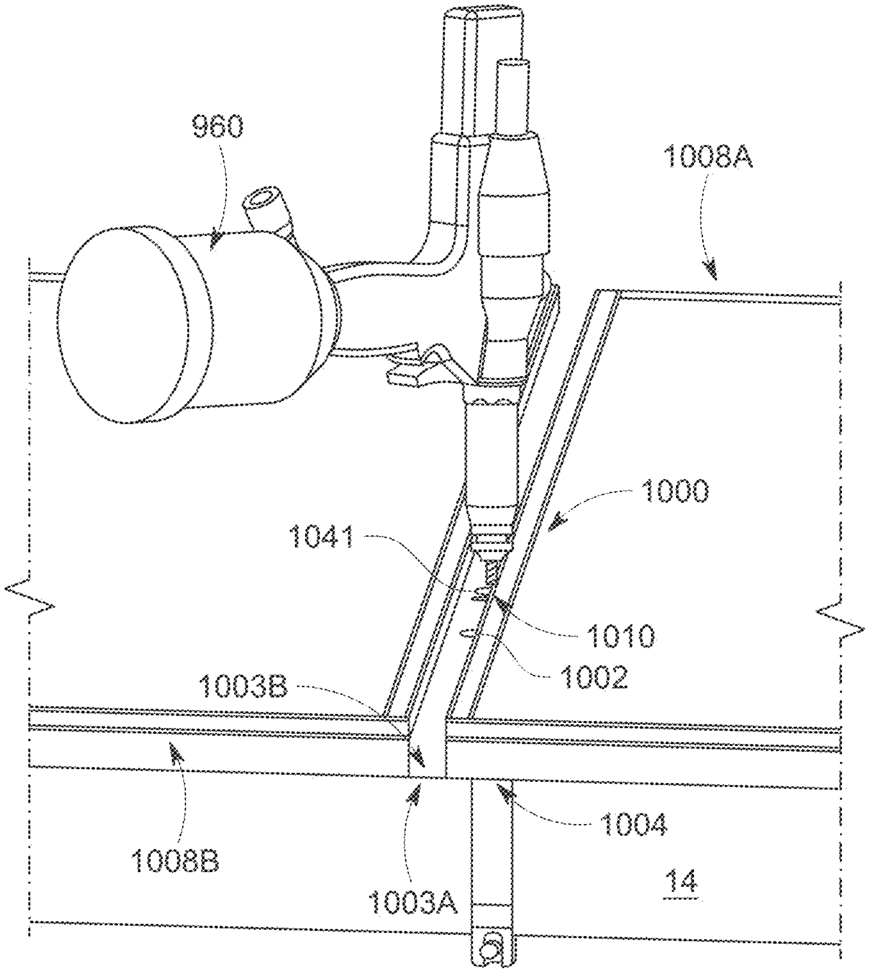

FIG. 10K is a perspective view of fastening member 1010 being placed through a pair of overlaid solar module frame side portions 1003A, 1003B and rail 1004 along a fastening axis 1081 that extends in a direction from above the torque tube 14 and frame coupling assembly 1000. Thus, the frame coupling assembly 1000 can be useful in providing for a coupling orientation that accommodates driving fastener 1010 into the frame coupling assembly 1000 from above solar module frames 1008A, 1008B, which can help to increase the efficiency of solar module frame installation at a solar tracker.

Figure 10L:
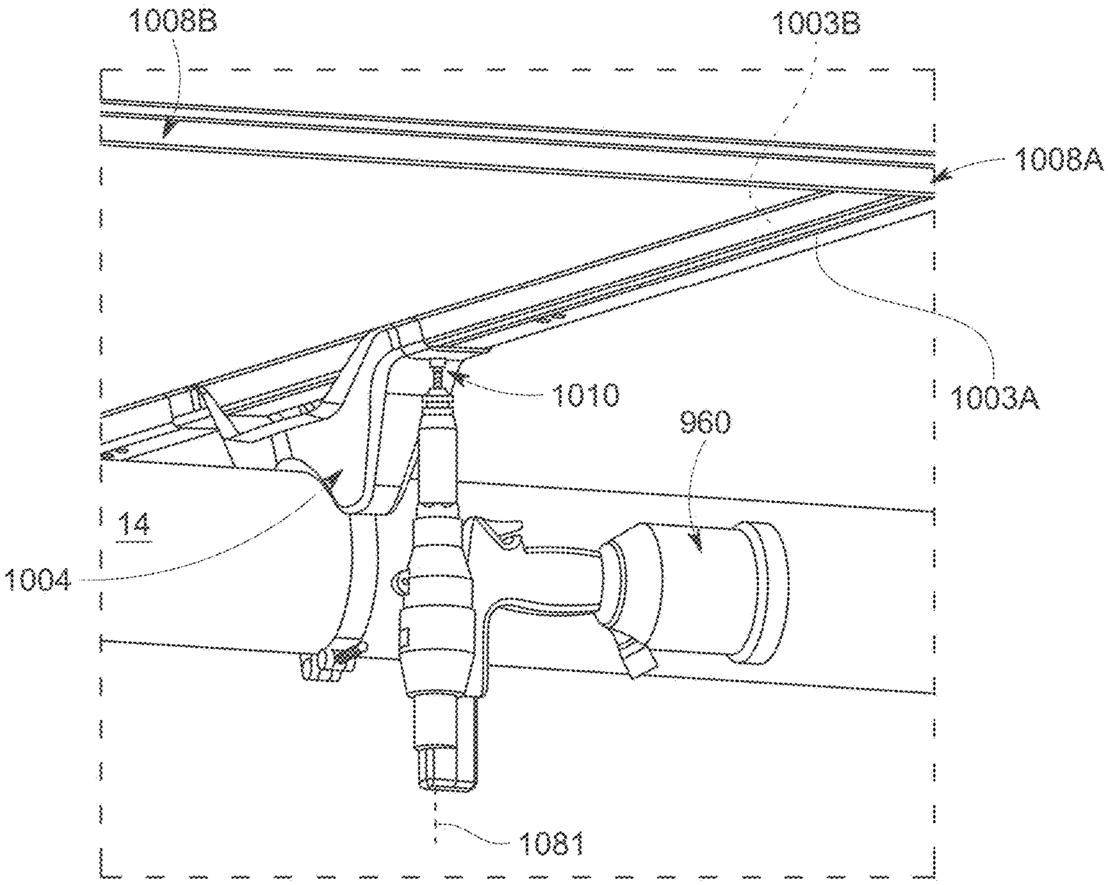
Figure 10M:
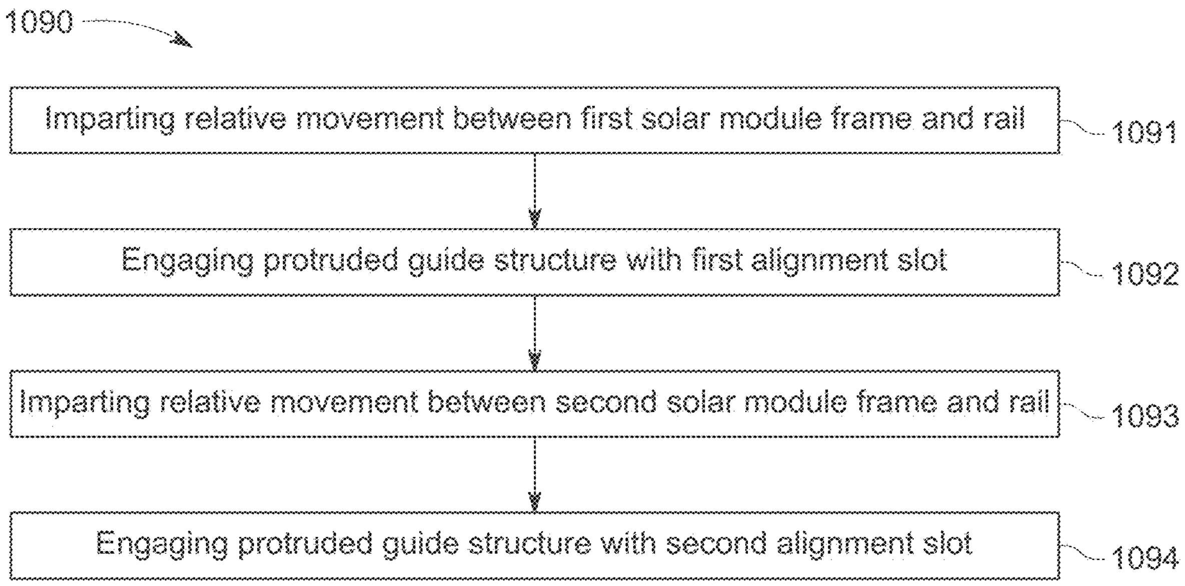

FIG. 10L is a perspective view of fastening member 1010 being placed through a pair of overlaid solar module frame side portions 1003A, 1003B and rail 1004 along fastening axis 1081 that extends in a direction from below the torque tube 14 and frame coupling assembly 1000. Thus, the frame coupling assembly 1000 can be useful in providing for a coupling orientation that accommodates driving fastener 1010 into the frame coupling assembly 1000 from below solar module frames 1008A, 1008B, which can help to increase the efficiency of solar module frame installation at a solar tracker.

FIG. 10M is a flow diagram of an embodiment of a method 1090 for coupling a pair of solar module frames to a rail at a solar tracker. For instance, the method 1090 can be executed using one or more of the features of the solar module frame coupling assembly 1000 illustrated at FIGS. 10A-10L and described elsewhere herein.

At step 1091, the method 1090 includes relative movement, in an east-west direction, between a first solar module frame and the rail. The first solar module frame can include a first frame side portion that has a first alignment slot. The rail can include a first rail side interfacing with a torque tube of the solar tracker and a second rail side that is opposite the first rail side. The second rail side can include a protruded guide structure.

At step 1092, the method 1090 includes, as a result of imparting relative movement, in the east-west direction, between the first solar module frame and the rail at step 1091, engaging the protruded guide structure with the first alignment slot.

At step 1093, the method 1090 includes, after engaging the protruded guide structure with the first alignment slot at step 1092, imparting relative movement, in the cast-west direction, between a second solar module frame and the rail. The second solar module frame can include a second frame side portion that has a second alignment slot.

At step 1094, the method 1090 includes, as a result of imparting relative movement, in the east-west direction, between the second solar module frame and the rail at step 1093, engaging the protruded guide structure with the second alignment slot to overlay the second frame side portion at the first frame side portion.

Some embodiments of the method 1090 can further include a step of placing a fastening member through second frame side portion, through the first frame side portion, and into the rail to fasten the first solar module frame and the second solar module frame to the rail. For example, when the protruded guide structure is engaged at the first alignment slot and the second alignment slot and when the second frame side portion overlays the first frame side portion (e.g., by executing step 1094), the fastening member can be placed through second frame side portion, through the first frame side portion, and into the rail to fasten the first solar module frame and the second solar module frame to the rail.

Various examples have been described. These and other examples are within the scope of the following claims.

What is claimed is:

1. A solar module coupling assembly comprising:

a solar module frame comprising a frame side portion, the frame side portion comprising a protruded guide structure and a frame coupling aperture; and a rail comprising a first guiding sidewall extending along a first longitudinal side of the rail, a second guiding sidewall extending along a second longitudinal side of the rail opposite the first longitudinal side, and a channel between the first guiding sidewall and the second guiding sidewall, each of the first and second guiding sidewall having a proximal guiding sidewall end intersecting the channel and a distal guiding sidewall end forming a free end of the respective first and second guiding sidewall, the first guiding sidewall comprising a first rail coupling aperture and a first alignment slot that extends along the first guiding sidewall from the distal guiding sidewall end, the second guiding sidewall comprising a second rail coupling aperture and a second alignment slot that extends along the second guiding sidewall from the distal guiding sidewall end, wherein each of the first guiding sidewall and the second guiding sidewall angle inward toward the channel such that the first guiding sidewall and the second guiding sidewall are spaced closer together between respective proximal guiding sidewall ends than between respective distal guiding sidewall ends, wherein the protruded guide structure is receivable at the first alignment slot with the frame coupling aperture aligned with the first rail coupling aperture to couple the solar module frame to the rail.

2. The assembly of claim 1, wherein the protruded guide structure is a first protruded guide structure, and wherein the frame side portion further comprises a second protruded guide structure that is spaced apart from the first protruded guide structure along the frame side portion, and wherein the first alignment slot is configured to receive the first protruded guide structure, wherein the second alignment slot is configured to receive the second protruded guide structure to couple the solar module frame to the rail.

3. The assembly of claim 2, wherein the frame coupling aperture is a first frame coupling aperture adjacent to the first protruded guide structure and the frame side portion further comprises a second frame coupling aperture adjacent to the second protruded guide structure, wherein the first rail coupling aperture is adjacent to the first alignment slot and the second rail coupling aperture is adjacent to the second alignment slot, and wherein, when the first alignment slot receives the first protruded guide structure and the second alignment slot receives the second protruded guide structure, the first frame coupling aperture is axially aligned with the first rail coupling aperture and the second frame coupling aperture is axially aligned with the second rail coupling aperture.

4. The assembly of claim 1, further comprising:

a fastening member extending through the first frame coupling aperture and the first rail coupling aperture to couple the solar module frame to the rail.

5. The assembly of claim 1, wherein the protruded guide structure comprises a locating tab that extends out from the frame side portion, and wherein the first alignment slot comprises an open inlet end and a closed terminal end, the closed terminal end being opposite the open inlet end, the open inlet end having a greater diameter than the closed terminal end.

6. The assembly of claim 5, wherein the locating tab extends out perpendicular to the frame side portion.

7. The assembly of claim 6, wherein the locating tab extends out from the frame side portion in a direction generally parallel to the a longitudinal axis of a torque tube to which the rail is secured.

8. The assembly of claim 5, wherein the alignment slot tapers in diameter from the open inlet end to the closed terminal end.

9. The assembly of claim 5, wherein the first alignment slot tapers in diameter along the first guiding sidewall as the first guiding sidewall angles inward toward the channel.

10. The assembly of claim 9, wherein the first alignment slot angles inward toward the channel along the first guiding sidewall.

11. The assembly of claim 1, wherein the first alignment slot extends along the first guiding sidewall in a direction from the free end toward the proximal guiding sidewall end.

12. The assembly of claim 11, wherein the rail comprises a torque tube interface portion at a bottom side of the rail and adapted to contact a torque tube, and wherein the first alignment slot extends along the first guiding sidewall in the direction perpendicular to the torque tube interface portion.

* * * * *